(12) United States Patent
Hejna, Jr.

(10) Patent No.: US 7,536,300 B2
(45) Date of Patent: *May 19, 2009

(54) METHOD AND APPARATUS TO DETERMINE AND USE AUDIENCE AFFINITY AND APTITUDE

(75) Inventor: Donald J. Hejna, Jr., Los Altos, CA (US)

(73) Assignee: Enounce, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/406,142

(22) Filed: Apr. 17, 2006

(65) Prior Publication Data

US 2006/0190809 A1   Aug. 24, 2006

Related U.S. Application Data

(63) Continuation of application No. 09/398,612, filed on Sep. 16, 1999, now Pat. No. 7,043,433, which is a continuation-in-part of application No. 09/169,031, filed on Oct. 9, 1998, now Pat. No. 6,374,225.

(51) Int. Cl.
*G10L 21/00* (2006.01)
(52) U.S. Cl. ............... 704/211; 704/270; 704/E15.045
(58) Field of Classification Search .................. 704/211, 704/270; 725/100, 104
See application file for complete search history.

(56) References Cited

U.S. PATENT DOCUMENTS

| 5,396,577 | A | 3/1995 | Oikawa et al. ............... 704/260 |
| 5,630,013 | A | 5/1997 | Suzuki et al. ............... 395/2.25 |
| 5,694,521 | A | 12/1997 | Shlomot et al. ............. 395/2.71 |
| 5,717,818 | A | 2/1998 | Nejime et al. ................. 395/2.2 |
| 5,752,228 | A | 5/1998 | Yumura et al. ............... 704/260 |

(Continued)

FOREIGN PATENT DOCUMENTS

WO    WO98/25405    6/1998

(Continued)

OTHER PUBLICATIONS

B. Moghaddam et al., Beyond Eigenfaces: Probabilistic Matching for Face Recognition, 3rd *IEEE Int'l Conf. On Auto. Face & Gest. Rec.*, Nara Japan, Apr. 1998 pp. 1-6.

(Continued)

*Primary Examiner*—Angela A Armstrong
(74) *Attorney, Agent, or Firm*—Michael B. Einschlag

(57) ABSTRACT

Embodiments of the present invention provide method and apparatus for determining audience affinity and/or aptitude in portions of media works and for developing information that represent measures of the audience affinity and/or aptitude. Further embodiments of present invention provide method and apparatus for utilizing the information to create altered media works and/or to present the altered media works to an audience. One embodiment of the present invention is a method for inferring audience affinity or aptitude with regard to content or properties of portions of a media work which includes: (a) presenting the media work to an audience; (b) obtaining user input regarding presentation rates for the portions of the media work; (c) correlating content or properties of the portion with the presentation rates; and; (d) associating audience affinity or aptitude with the correlated content or properties.

9 Claims, 24 Drawing Sheets

U.S. PATENT DOCUMENTS

| | | | |
|---|---|---|---|
| 5,806,023 A | 9/1998 | Satyamurti | 704/211 |
| 5,813,862 A | 9/1998 | Merzenich et al. | 434/185 |
| 5,842,172 A * | 11/1998 | Wilson | 704/503 |
| 5,859,662 A | 1/1999 | Cragun et al. | 348/13 |
| 5,893,062 A * | 4/1999 | Bhadkamkar et al. | 704/270 |
| 5,924,068 A | 7/1999 | Richard et al. | 704/260 |
| 6,036,496 A * | 3/2000 | Miller et al. | 434/156 |
| 6,098,046 A | 8/2000 | Cooper et al. | 704/503 |
| 6,370,688 B1 * | 4/2002 | Hejna, Jr. | 725/101 |
| 6,598,228 B2 * | 7/2003 | Hejna, Jr. | 725/91 |
| 6,622,171 B2 * | 9/2003 | Gupta et al. | 709/231 |
| 6,801,888 B2 * | 10/2004 | Hejna, Jr. | 704/211 |
| 6,934,759 B2 * | 8/2005 | Hejna, Jr. | 709/231 |
| 7,043,433 B2 * | 5/2006 | Hejna, Jr. | 704/270 |
| 7,100,188 B2 * | 8/2006 | Hejna, Jr. | 725/100 |
| 7,299,184 B2 * | 11/2007 | Hejna, Jr. | 704/270 |

FOREIGN PATENT DOCUMENTS

| | | |
|---|---|---|
| WO | WO98/44483 | 10/1998 |
| WO | WO 98/44483 | * 10/1998 |

OTHER PUBLICATIONS

T. Darrell et al., Active Face Tracking and Pose Estimation in an Interactive Room, *IEEE Conf. On Comp. Vision & Pattern Recognition*, San Francisco, Jun. 1996.

R. Agarwal, Semantic Feature Extraction from Technical Texts with Limited Human Intervention, A Ph.D dissertation submitted to Mississippi State University May 1995.

* cited by examiner

FIG. 7

7100 — FOR A FREE PRODUCT GUIDE AND BROCHURE CALL 1-800-555-1212 AND SPEAK WITH AN INSURANCE SPECIALIST ABOUT YOUR PARTICULAR SITUATION.

FIG. 20

```
(
((well-known)  (2.00))
((familiar)    (1.50))
((comfortable) (1.10))
((unfamiliar)  (0.65))
)
```

APTITUDE PRESENTATION-RATE
ASSOCIATION DATA STRUCTURE

FIG. 21

```
(
((onomotopia)          (unfamiliar))
(((the) (and) (but))   (well-known))
((photo-lithography)   (unfamiliar))
((valence orbital)     (unfamiliar))
((turbidity)           (familiar))
((water quality)       (well-known))
((filtration)          (comfortable))
((titration)           (unfamiliar))
)
```

CONCEPTUAL APTITUDE ASSOCIATION
DATA STRUCTURE

METHOD AND APPARATUS TO DETERMINE AND USE AUDIENCE AFFINITY AND APTITUDE

This is a continuation of a patent application entitled "Method and Apparatus to Determine and User Audience Affinity and Aptitude" having U.S. Ser. No. 09/398,612 which was filed on Sep. 16, 1999 and which issued as U.S. Pat. No. 7,043,433 on May 9, 2006, which is a continuation-in-part of a patent application entitled "Method and Apparatus to Prepare Listener-Interest-Filtered Works" having U.S. Ser. No. 09/169,031 which was filed on Oct. 9, 1998 and which issued as U.S. Pat. No. 6,374,225 on Apr. 16, 2002, the entireties of both prior applications are hereby incorporated by reference.

TECHNICAL FIELD OF THE INVENTION

The present invention pertains to creation and presentation of media works to audiences including, without limitation, audio and audio-visual works. In particular, the present invention pertains to creation and presentation of media works in accordance with audience affinity and/or aptitude and to determinations of audience affinity and/or aptitude.

BACKGROUND OF THE INVENTION

Presently known methods for Time-Scale Modification ("TSM") enable digitally recorded audio to be modified so that a perceived articulation rate of spoken passages, i.e., a speaking rate, can be modified dynamically during playback. Typical applications of such TSM methods include, but are not limited to, speed reading for the blind, talking books, digitally recording lectures, slide shows, multimedia presentations and foreign language learning. In a typical such application, referred to herein as a Listener-Directed Time-Scale Modification application ("LD-TSM"), a listener can control the speaking rate during playback of a previously recorded speaker. This enables the listener to "speed-up" or "slow-down" the articulation rate and, thereby, the information delivery rate provided by the previously recorded speaker. As is well known to those of ordinary skill in the art, the use of the TSM method in the above-described LD-TSM application enables the sped-up or slowed-down speech or audio to be presented intelligibly at the increased or decreased playback rates. Thus, for example, a listener can readily comprehend material through which he/she is fast-forwarding.

In a typical LD-TSM system, input from the listener can be specified in a number of different ways. For example, input can be specified through the use of key presses (button pushes), mouse movements, or voice commands, all of which are referred to below as "keypresses." As a result, one can readily appreciate that an LD-TSM system enables a listener to adjust the information delivery rate of a digital audio medium to suit his/her interests and speed of comprehension.

As one can readily appreciate from the above, in order to optimize the use of such an LD-TSM system, there is a need for determining how listeners interact with audio media that provide TSM. In particular, the actual information delivery rate selected by a listener depends on diverse factors such as intelligibility of a speaker, listener interest in the subject matter, listener familiarity with the subject matter, whether the listener is transcribing the content, and the general amount of time the listener has allotted for receiving the contents of the material.

Prior art methods for determining listener interest in portions of speech and/or audio are inherently inaccurate. Specifically, these methods involve detecting fast-forward and rewind patterns of, for example, a cassette tape produced by button pushes. The use of such fast-forward or rewind patterns suffers from various drawbacks. For example, the listener often alternates between fast-forwarding and rewinding over a particular piece of audio material because the information is either not presented, or is unintelligible while fast-forwarding or rewinding. In addition, whenever a playback location is advanced, this either interrupts playback while advancing through the audio material or presents unintelligible versions of the audio material ("chipmunk like" sounds for speed-up, etc.). As such, current methods of determining listener interest are of little use for determining an optimal information delivery rate.

As one can readily appreciate from the above, a need exists in the art for a method and apparatus for determining audience (listener) affinity (for example, interest) in portions of media works. In addition, a need exists in the art for a method and apparatus for using the audience (listener) affinity to create and/or to present the altered media works to an audience.

SUMMARY OF THE INVENTION

Embodiments of the present invention advantageously satisfy the above-identified need in the art and provide method and apparatus for determining audience (listener) affinity and/or aptitude in portions of media works and for developing information that represent measures of the audience (listener) affinity and/or aptitude. In addition, further embodiments of present invention provide method and apparatus for utilizing the information to create altered media works and/or to present the altered media works to an audience.

One embodiment of the present invention is a method for inferring audience affinity or aptitude with regard to content or properties of portions of a media work which comprises: (a) presenting the media work to an audience; (b) obtaining user input regarding presentation rates for the portions of the media work; (c) correlating content or properties of the portion with the presentation rates; and; (d) associating audience affinity or aptitude with the correlated content or properties. Another embodiment of the present invention is a method of utilizing audience affinity or aptitude associated with content or properties to present a media work which comprises: (a) detecting content or properties in a portion of the media work; (b) associating a presentation rate of the portion with the detected content or properties; and (c) presenting the portion at the presentation rate. Yet another embodiment of the present invention is a method of utilizing audience affinity or aptitude associated with content or properties to present a media work which comprises: (a) detecting content or properties in portions of the media work; (b) associating a presentation order with the detected content or properties; and (c) presenting the media work in accordance with the presentation order.

Yet another embodiment of the present invention is a method of testing aptitude of a audience for content or properties of portions of a media work which comprises: (a) presenting the media to the audience; (b) obtaining user input regarding presentation rates for portions of the media work; and (c) correlating the presentation rates with the aptitude for the content or properties of the portions. Yet another embodiment of the present invention is a method of presenting media works which comprises: (a) accessing information identifying a media work and a time to retrieve the media work; (b) retrieving the identified media work at the time; (c) accessing presentation rate information for use in altering the presentation rate of the media work; and (d) altering the presentation rate of the media work. Yet another embodiment of the present invention is a method of presenting a media work which comprises: (a) detecting properties in a portion of the media work; (b) associating a presentation rate of the portion with the detected properties; (c) presenting the portion at the presentation rate; and (d) wherein the properties comprise indicia of actions of objects.

BRIEF DESCRIPTION OF THE FIGURE

FIG. 7 shows a display of a transcript of an audio or audio visual work;

FIG. 20 shows a representation of a simple AptPRA data structure;

FIG. 21 shows a representation of a simple CAptA data structure;

DETAILED DESCRIPTION

Figure 13:
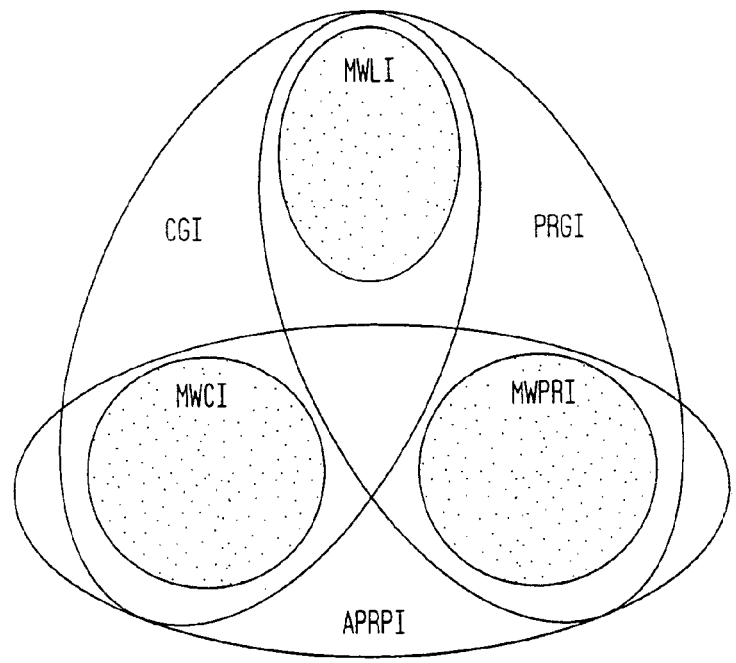
FIG. 13 shows a Venn Diagram of three types of information: Media Work Location Information ("MWLI"); Media Work Content Information ("MWCI"); and Media Work Presentation Rate Information ("MWPRI")

For ease of understanding the hierarchical and conceptual relationships of the terms and definitions used herein, a Venn diagram is provided for reference. FIG. 13 shows three types of information: Media Work Location Information ("MWLI"); Media Work Content Information ("MWCI"); and Media Work Presentation Rate Information ("MWPRI"). As also shown in FIG. 13, there are three conceptual groupings which may be comprised of one or more of the types of information they enclose: Content Guidance Information ("CGI"); Presentation Rate Guidance Information ("PRGI"); and Audience Presentation Rate Preference Information ("APRPI").

Figure 14:
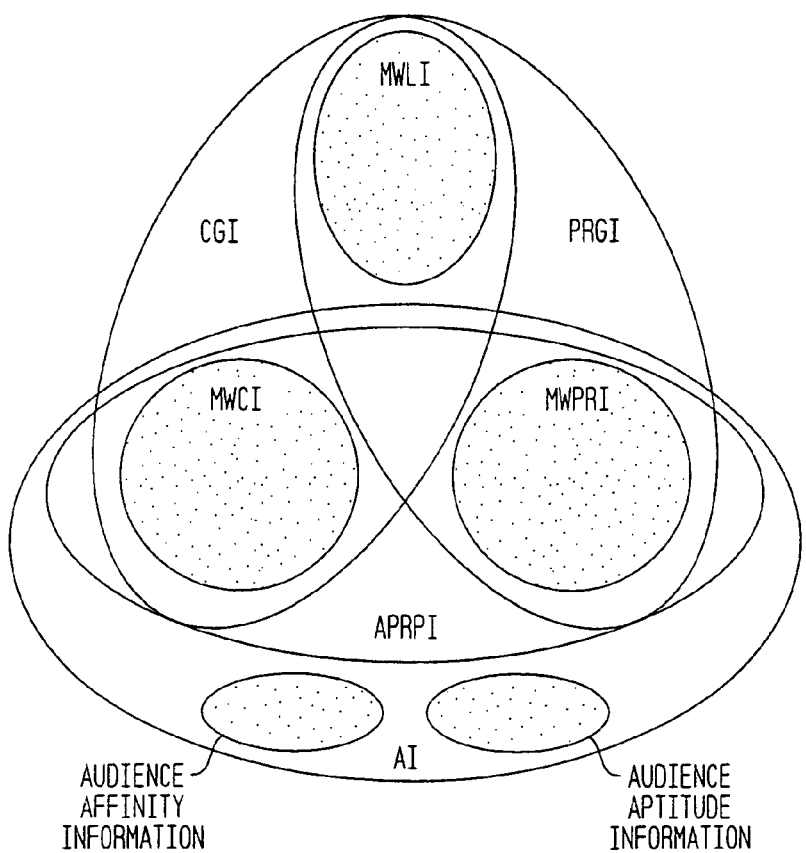
FIG. 14 shows a Venn Diagram containing the components of FIG. 13 and contains two additional types of information: Audience Affinity Information; and Audience Aptitude Information.

FIG. 14 shows a Venn diagram containing the components of FIG. 13 and contains two additional types of information: Audience Affinity Information; and Audience Aptitude Information. Also shown in FIG. 14 is Audience Information ("AI") which is a conceptual grouping of information that encompasses: Audience Affinity. Information; Audience Aptitude Information; and Audience Presentation Rate Preference Information ("APRPI").

Figure 15:
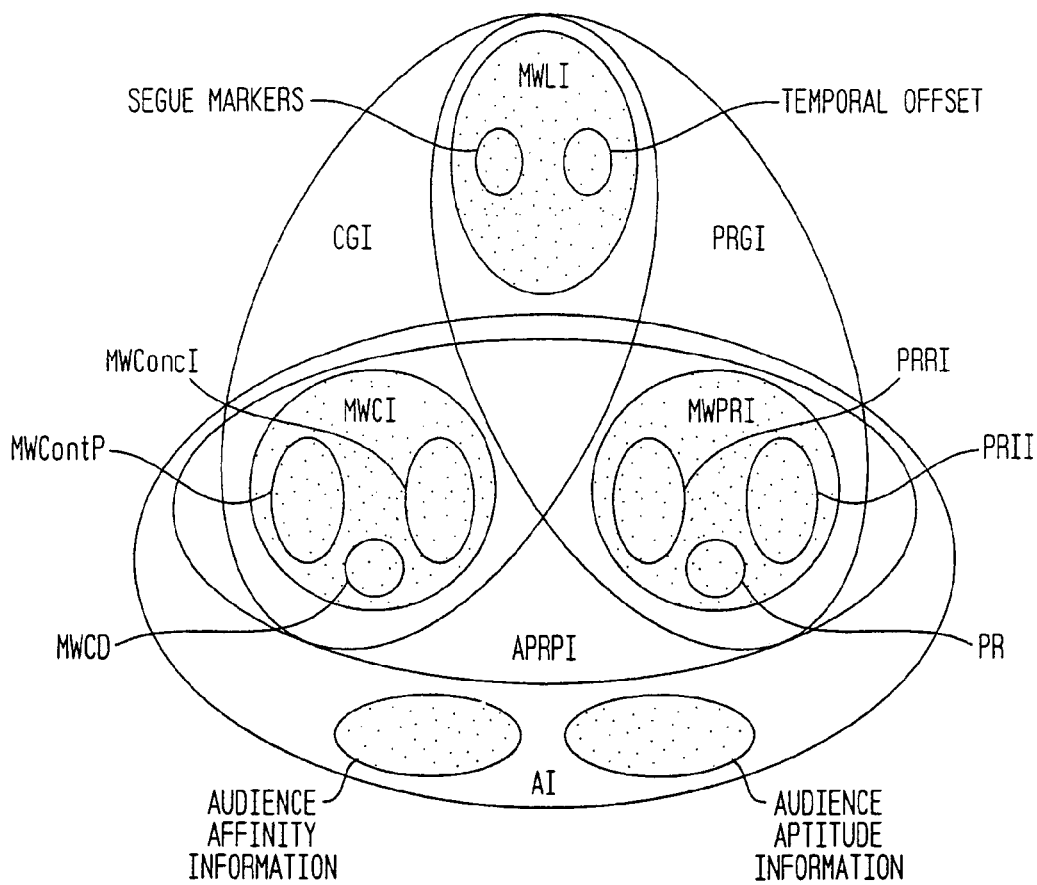
FIG. 15 shows a Venn Diagram containing the components of FIG. 14 and additionally some of the various types of information which are contained in the encompassing classes and forms of the previous figures.

FIG. 15 shows a Venn diagram containing the components of FIG. 14 and additionally some of the various types of information which are contained in the encompassing classes and forms of the previous figures.

Figure 17:
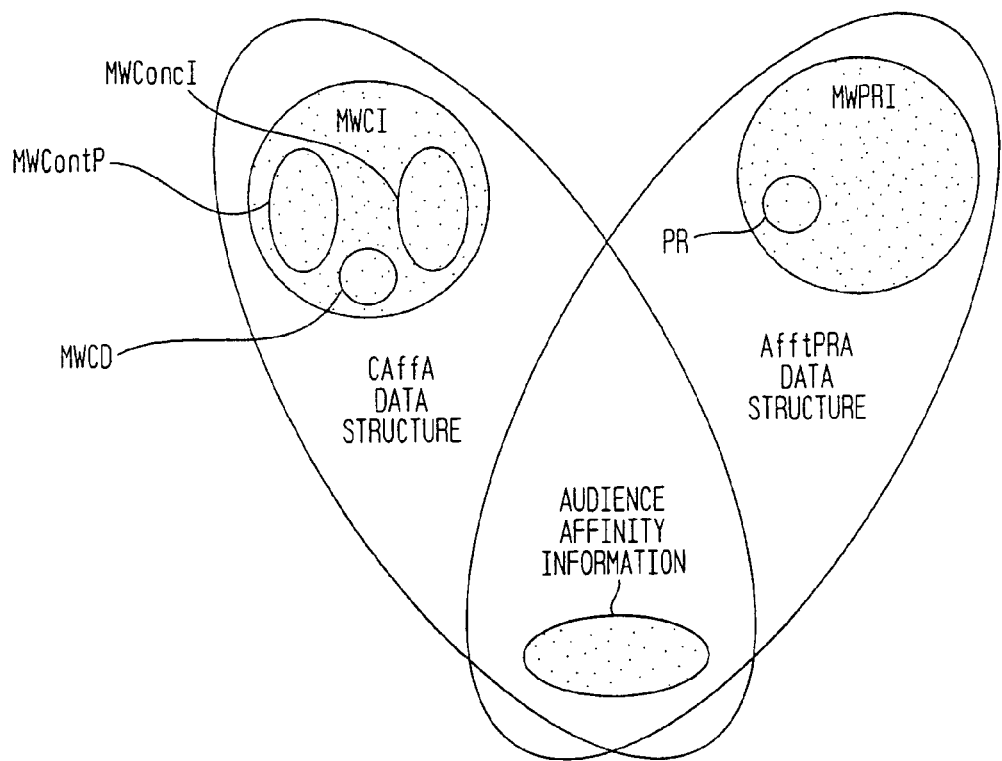
FIG. 17 shows a Venn diagram of the relationship of the components of an AffPRA data structure and a pair comprised of a Conceptual Affinity Association data structure ("CAffA" data structure) and an AffPRA data structure)

Definitions:

Affinity Presentation Rate Association data structure: An Affinity Presentation Rate Association data structure ("AffPRA" data structure) comprises Audience Affinity Information ("AAffI") and Media Work Presentation Rate Information ("MWPRI") associated therewith. FIG. 17 shows a Venn diagram of the relationship of the components of an AffPRA data structure and a pair comprised of a Conceptual Affinity Association data structure ("CAffA" data structure) and an AffPRA data structure). A specific example of the AffPRA data structure can be developed in a manner similar to that discussed below for an Aptitude Presentation Rate Association data structure ("AptPRA" data structure) in conjunction with FIG. 21 where affinity entries replace the aptitude entries of FIG. 21.

Figure 18:
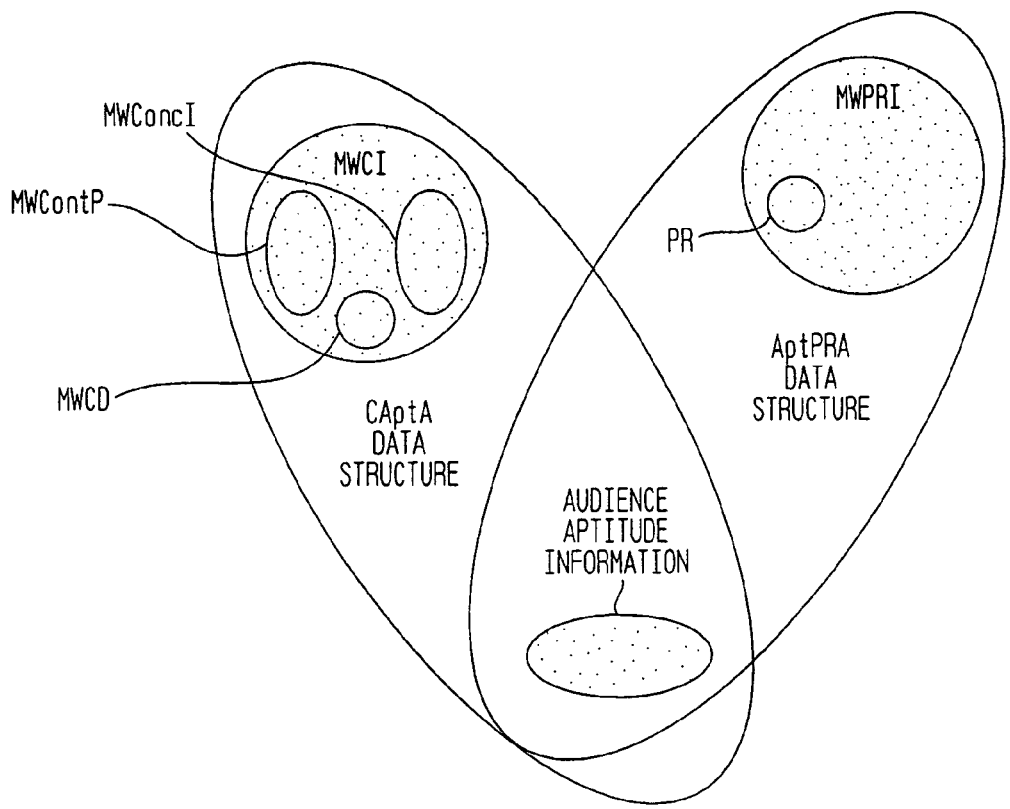
FIG. 18 shows a Venn diagram of the relationship of components of an AptPRA data structure and a pair comprised of a Conceptual Aptitude Association data structure ("CAptA" data structure) and an AptPRA data structure)

Aptitude Presentation Rate Association data structure: An Aptitude Presentation Rate Association data structure ("AptPRA" data structure) comprises Audience Aptitude Information ("AAptI") and Media Work Presentation Rate Information ("MWPRI") associated therewith. FIG. 18 shows a Venn diagram of the relationship of components of an AptPRA data structure and a pair comprised of a Conceptual Aptitude Association data structure ("CAptA" data structure) and an AptPRA data structure). FIG. 20 shows a representation of a simple AptPRA data structure (for illustrative purposes) where data such as "well-known," "familiar," and so forth represent measures of aptitude, and data such as 2.0, 1.50, and so forth represent Presentation Rates ("PR") for Media Work Segments ("MWS") to which the measures of aptitude apply.

Audience: An Audience comprises one or more listeners and/or viewers of a Media Work ("MW").

Audience Affinity/Aptitude Analysis: An Audience Affinity/Aptitude Analysis ("AAA Analysis") is a method used to determine, infer, or analyze an Audience member's affinity or aptitude for concepts, content, properties (for example, grammatical constructs), and the like. The method entails, without limitation, giving off-line tests, tests or queries using a web page, a job resume, gathering statistics based on predetermined criteria (for example, difficulties often encountered by people with particular native languages in distinguishing certain sounds in other languages). The output of said method is a measure of affinity and/or aptitude for particular concepts, content, properties (for example, grammatical constructs) which may appear in Media Works ("MW"). The output of the method is: (a) a pair comprised of a Conceptual Aptitude Association data structure ("CAptA" data structure) and an Aptitude Presentation Rate Association data structure ("AptPRA" data structure) and (b) a pair comprised of a Conceptual Affinity Association data structure ("CAffA" data structure) and an Affinity Presentation Rate Association data structure ("AffPRA" data structure). When the pairs are used in combination in accordance with the present invention, Presentation Rate ("PR") information is obtained, which PR information is desired by an Audience for specified content and/or properties of an MW.

Audience Affinity/Aptitude Application: An Audience Affinity/Aptitude Application ("AAA Application") is a method that uses information produced in part by an Audience Affinity/Aptitude Analysis ("AAA Analysis") to direct apparatus such as the apparatus shown in FIG. 22, to change the Presentation Rate ("PR") for all or portions of a Media Work ("MW"). In essence, the output from the AAA Application is an altered MW and, optionally, a presentation of the altered MW to an Audience. In accordance with the present invention, the presentation may be made using Media Work Communication Technology ("MWCT").

Audience Affinity Information: Audience Affinity Information ("AAffI") comprises an indicium of affinity of an Audience (defined, for example, by Audience interest or entertainment value to an Audience) for content properties, concepts, and the like. It should be understood that the indicium may include an algorithm that, when executed, provides the indicium, or an identifier of the indicium, which identifier may be used to obtain the indicium in accordance with any one of a number of methods that are well known to those of ordinary skill in the art including, without limitation, from local or distributed data bases, where distribution includes distribution over webs of interconnected computer or communication networks.

Audience Aptitude Information: Audience Aptitude Information ("AAptI") comprises an indicium of aptitude (defined, for example, by Audience familiarity or Audience fluency) with respect to content properties, concepts and the like. It should be understood that the indicium may include an algorithm that, when executed, provides the indicium or an identifier of the indicium, which identifier may be used to obtain the indicium in accordance with any one of a number of methods that are well known to those of ordinary skill in the art including, without limitation, from local or distributed data bases, where distribution includes distribution over webs of interconnected computer or communication networks.

Audience Presentation Rate Preference Analysis: An Audience Presentation Rate Preference Analysis ("APRP" Analysis) is a method of determining Audience's preferred Presentation Rate ("PR") for content contained in all or portions of a Media Work ("MW") that is carried out using the apparatus shown in FIG. 23. In essence, the output from the APRP Analysis is one or more of: (a) a Conceptual Presentation Rate Association data structure ("CPRA" data structure) and (b) Presentation Rate Guidance Information ("PRGI").

Audience Presentation Rate Preference Information: Audience Presentation Rate Preference Information ("APRPI") is information that is comprised of Media Work Content Information ("MWCI") and Media Work Presentation Rate Information ("MWPRI"). As shown in FIG. 14, and in accordance with the present invention, APRPI is used to represent the preferred Presentation Rate ("PR") for concepts contained in Media Works ("MW").

Audience Presentation Rate Request: An Audience Presentation Rate Request ("APRR") includes input from an Audience which is comprised of: (a) Media Work Content Information ("MWCI") and Media Work Presentation Rate Information ("MWPRI") associated therewith or (b) MWPRI and, optionally, Media Work Location Information ("MWLI") associated therewith. In cases in which the Audience comprises more than one member, APRR may refer to input from a number of Audience members, for example, and without limitation, the majority of a predetermined cross-section of Audience members, which input from the Audience members may be processed or correlated to provide the APRR.

Conceptual Affinity Association data structure: A Conceptual Affinity Association data structure ("CAffA" data structure) comprises Media Work Content Information ("MWCI") and Audience Affinity Information ("AAffI") associated therewith. FIG. 17 shows a Venn diagram of the relationship of components of an AffPRA data structure and a pair comprised of a CAffA data structure) and an Affinity Presentation Rate Association data structure ("AffPRA" data structure). A specific example of the CAffA data structure can be developed in a manner similar to that described below for a Conceptual Aptitude Presentation Rate Association data structure ("CAptA" data structure) in conjunction with FIG. 21 where affinity entries replace aptitude entries of FIG. 21. Note that a Presentation Rate ("PR") for a given concept may be obtained by performing two de-references: (a) indexing the CAffA data structure with the concept to obtain an affinity metric for the concept; and (2) indexing the AffPRA data structure with the affinity metric to obtain a PR.

Conceptual Aptitude Association data structure: A Conceptual Aptitude Association data structure ("CAptA" data structure) comprises Media Work Content Information ("MWCI") and Audience Aptitude Information ("AAptI") associated therewith. FIG. 18 shows a Venn diagram of the relationship of components of an AptPRA data structure and a pair comprised of a CAptA data structure) and an Aptitude Presentation Rate Association data structure ("AptPRA" data structure). FIG. 21 shows a representation of a simple CAptA data structure (for illustrative purposes) where data such as "onomatopoeia," "filtration," and so forth represent conceptual information, and data such as "well-known," "familiar," and so forth represent measures of aptitude. Note that a Presentation Rate ("PR") for a given concept may be obtained by performing two de-references: (a) indexing the CAptA data structure with the concept to obtain an aptitude metric for the concept; and (2) indexing the AptPRA data structure with the aptitude metric to obtain a PR.

Concept Guidance Information: Concept Guidance Information ("CGI") is information that is used to determine a Presentation Rate ("PR") for one or more of: (a) an entire Media Work ("MW") and (b) one or more portions of the MW. In accordance with the present invention, CGI comprises Media Work Content Information ("MWCI") and, optionally, Media Work Location Information ("MWLI"). In addition, MWCI may be comprised of Media Work Concept Information ("MWConcI") and Media Work Content Properties ("MWContP"). Although MWLI and MWCI are specified as two sets of information, their representation can be in any form, including a format wherein the information is intermixed.

Conceptual Order Association data structure: A Conceptual Order Association data structure ("COA" data structure) comprises Concept Guidance Information ("CGI") and associated Presentation Order Information ("POI") and, optionally, one or more of the following: (a) Presentation Order Rule Information ("PORI"); and (b) Time-Stamp Information ("TSI"). Although CGI, POI, PORI, and TSI are specified as independent sets of information, their representation can be in any form, including a format wherein the information is intermixed. Further, in accordance with the present invention, the COA data structure may include algorithms which, for example, combine CGI, POI, PORI, and TSI to determine an order to be used for presenting MWs. The ordering obtained by utilizing the COA data structure can be determined by any number of criteria, including without limitation: content information, origin or originator of the MW, source of the MW, and priority levels associated with the MW.

Figure 19:
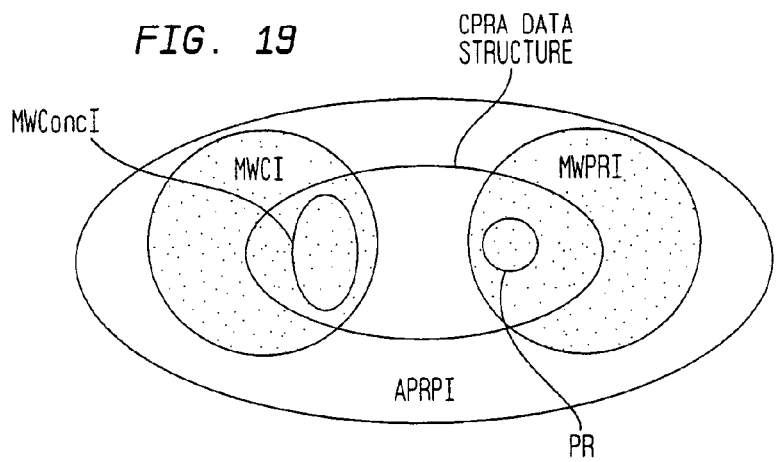
FIG. 19 shows a general representation of a CPRA data structure.

Conceptual Presentation Rate Association data structure: A Conceptual Presentation Rate Association data structure ("CPRA" data structure) comprises Media Work Content Information ("MWCI") and associated Media Work Presentation Rate Information ("MWPRI") and, optionally, one or more of the following: (a) Presentation Rate Rule Information ("PRRI"); and (b) Time-Stamp Information ("TSI"). Although MWCI, MWPRI, PRRI, and TSI are specified as independent sets of information, their representation can be in any form, including a format wherein the information is intermixed. Further, in accordance with the present invention, the CPRA data structure may include algorithms which, for example, combine MWCI, MWPRI, PRRI, and TSI to determine a Presentation Rate ("PR") to be used for presenting a particular portion of the MW. For example, a PR associated with a predetermined concept could be computed as a function of the number of times the concept has appeared in an MW so that a first occurrence of the concept is presented using a first PR whereas subsequent occurrences of the concept are presented using increased PRs for faster playback. FIG. 19 shows a general representation of a CPRA data structure.

Figure 19A:
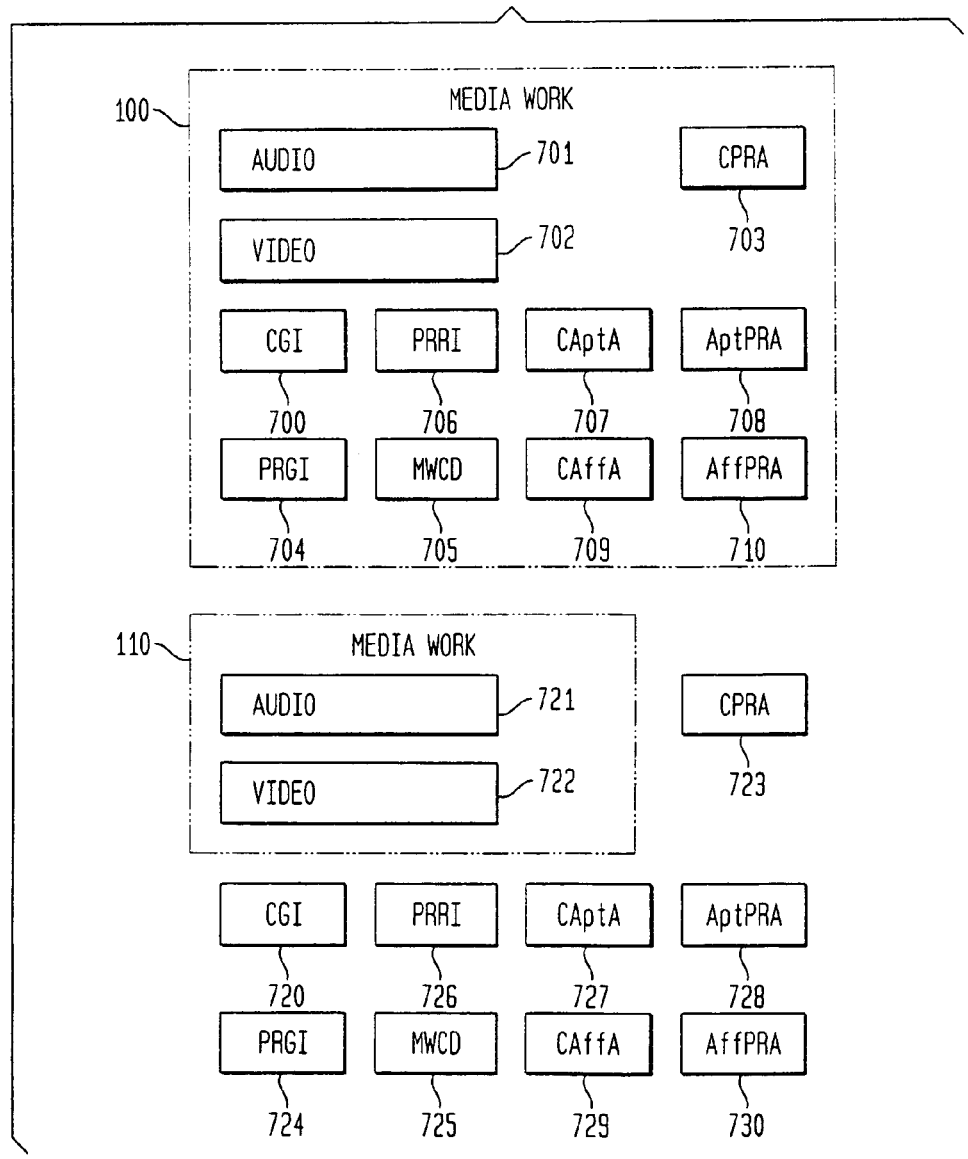
FIG. 19A shows general representations of an MW.

Media Work: A Media Work ("MW") may comprise, without limitation, one or more of text, pictures, audio, for example, a speech, an audio-visual work, for example, a movie or instructional video tape. In accordance with the present invention, the Media Work ("MW") may be formatted in any analog or digital format. In addition, an MW includes a collective MW which comprises a number of MWs. In further, an MW includes a MW created by combing an MW (a Target MW) and a set of reference information which can be used to reference portions of the Target MW. For example, the reference information may comprise hyperlinks to segments of an MW. The MW may also comprise, or be associated with (on a logical basis), without limitation, one or more of: (a) a Conceptual Presentation Rate Association data structure ("CSA" data structure); (b) Presentation Rate Guidance Information ("PRGI"); (c) Media Work Content Data ("MWCD"); (d) Presentation Rate Rule Information ("PRRI"); (e) a pair comprised of a Conceptual Aptitude Association data structure ("CAptA" data structure) and an Aptitude Presentation Rate Association data structure ("AptPRA" data structure); (f) a pair comprised of a Conceptual Affinity Association data structure ("CAffA" data structure) and an Affinity Presentation Rate Association data structure ("AffPRA" data structure); and (g) any components of the foregoing. As used herein, information, such as data, are associated on a logical basis if they can be accessed from a system such as a computer system, a network of distributed computer systems, a web of any kind, so as to be used together on any basis. FIG. 19A shows general representations of an MW, i.e., MW 100 and MW 110. As shown in FIG. 19A, MW 100 comprises audio 701 and/or video 702, and, optionally, one or more of: (a) CPRA data structure 703; (b) PRGI 704; (c) MWCD 705; (d) PRRI 706; (e) a pair comprised of CAptA data structure 707 and AptPRA data structure 708; (f) a pair comprised of CAffA data structure 709 and AffPRA data structure 710; and (g) any of the components of the foregoing. As further shown in FIG. 19A, MW 110 comprises audio 711 and/or video 712, and, optionally, one or more of: (a) logically associated CPRA data structure 713; (b) logically associated PRGI 714; (c) logically associated MWCD 715; (d) logically associated PRRI 716; (e) a pair comprised of logically associated CAptA data structure 717 and logically associated AptPRA data structure 718; (f) a pair comprised of logically associated CAffA data structure 719 and AffPRA data structure 720; and (g) any of the components of the foregoing. In the simplest case, MW 100 comprises audio 701 and/or video 702.

Media Work Communication Technology: A Media Work Communication Technology ("MWCT") is any technology used to store, present, and/or transfer a Media Work ("MW") to an Audience. Thus, a MWCT may comprise, without limitation, televisions, VCRs, digital storage devices, analog recording media, broadcast or distribution apparatus, or one or more of text, pictures, audio, for example, a speech, an audio-visual work, for example, a movie or instructional video tape, a digital storage device, such as a hard-disk or Random Access Memory, and includes networks (distributed or otherwise).

Media Work Concept Information: Media Work Concept Information ("MWConcI") may comprise one or more of: (a) concept information, for example, in the form of keywords; (b) abstract information; (c) summary information; (d) paraphrase information; (e) scene information; (f) scene change information; (g) speaker information (for example, and without limitation, dialogue, speaker identity, and so forth); (h) hyperlink or other demarcation or indexing labels conveying information; and (i) the like which relates to all, or a portion, of the MW. In a particular example, MWConcI includes any type of information which reflects upon one or more aspects of the content of the foregoing such as, without limitation, conceptual tags and the like. For example, MWConcI may comprise a keyword, a string of words, or a phrase that expresses a concept such as "stock market," "wall street," and "financial."). It should be understood that MWConcI may include an algorithm that, when executed, provides the MWConcI or an identifier of the MWConcI, which identifier may be used to obtain the MWConcI in accordance with any one of a number of methods that are well known to those of ordinary skill in the art including, without limitation, from local or distributed data bases, where distribution includes distribution over webs. In addition, MWConcI may include codes which are processed using look-up tables, rules, algorithms or the like.

Media Work Content Data: Media Work Content Data ("MWCD") is information that has been generated from all or a portion of a Media Work ("MW"). For example, and without limitation, MWCD comprises a transcript, closed captioning, an abridgment, an index of ideas, concepts and the like which appear in the MW, and optionally any of the foregoing combined or associated with Media Work Location Information ("MWLI").

Media Work Content Information: Media Work Content Information ("MWCI") may be comprised of Media Work Concept Information ("MWConcI") and/or Media Work Content Properties ("MWContP"). It should be noted that MWCI is a location independent representation of the concepts or properties contained in the MW and may be paired with MWLI to form CGI.

Media Work Content Properties: Media Work Content Properties ("MWContP") may comprise information such as, without limitation: (a) a number of syllables in words spoken in a Media Work ("MW"); (b) a number of letters in a word; (c) a number of letters present in one syllable; (d) a number of distinct items, for example, the number of people or objects, in, for example, a frame of presentation material such as a video frame; (e) an aptitude metric determined, for example, by a criterion such as complexity; (f) grammatical structure of portions of the MW, and (g) an indicium of the rate of occurrence, temporal proximity, or time-interval of any of the previous items. It should be understood that MWContP may include an algorithm that, when executed, provides the MWContP or an identifier of the MWContP, which identifier may be used to obtain the MWContP in accordance with any one of a number of methods that are well known to those of ordinary skill in the art including, without limitation, from local and distributed data bases, where distribution includes distribution over webs of interconnected computer or communications networks. In addition, MWContP may include codes which are processed using look-up tables, rules, algorithms or the like.

Media Work Location Information: Media Work Location Information ("MWLI") is information that identifies, or can be used to identify, one or more of an entire Media Work ("MW") and one or more portions of the MW. MWLI includes one or more of the following, without limitation: (a) information that specifies a temporal proximity of a value being presented and a portion of the MW (for example, a temporal proximity indicator may specify that a predetermined Presentation Rate ("PR"), perhaps one in a table thereof, is to become active for predetermined Media Work Segments ("MWS"); as a further example, the predetermined PR may be presumed to be active until a new value is obtained, or for a specified duration, after which a default value takes effect); (b) information that comprises a timestamp identifying a portion of the MW; (c) information that comprises an audio sample count or an identifier of a portion of the MW (used advantageously with an MW that comprises audio); (d) information that comprises video frame counts or an identifier of a portion of the MW (used advantageously with an MW that comprises video); (e) information that comprises word counts in the MW (used advantageously with an MW that comprises Media Work Content Data ("MWCD"), for example, a transcript; or in accordance with embodiments of the present invention that comprise a transcript generator to generate such a transcript); (f) information that comprises segment identifiers that identify region(s) of the MW; (g) information that comprises segues or scene change identifiers that identify portion(s) of the MW (used advantageously with an MW that comprises video); (h) information that comprises update messages that cause predetermined PRs, for example, the next value in Presentation Rate Guidance Information ("PRGI"), to become fetched or to be "active," i.e., used for a predetermined duration or portion of the MW; (i) information that comprises timing marks; (j) information providing indications of portions of the Media work (for example, and without limitation, pointers) to which they or portions thereof pertain; (k) information that comprises time values that are absolute, i.e., wall-clock, or time values that are relative (for example, a title of an MW and time values which are referenced from an origin of the MW and, thereby identify one or more portions of the MW); and (l) information that comprises combinations of any or all of (a) through (k).

Media Work Presentation Rate Information: Media Work Presentation Rate Information ("MWPRI") is information that specifies, or can be used to determine, a Presentation Rate ("PR") for one or more of the entire MW and one or more portions of the MW. It should be understood that MWPRI may include an algorithm that, when executed, provides the MWPRI or an identifier of the MWPRI, which identifier may be used to obtain the MWPRI in accordance with any one of a number of methods that are well known to those of ordinary skill in the art including, without limitation, local and distributed data bases, where distribution includes distribution over webs. In addition MWPRI may comprise Presentation Rate Insistence Information ("PRII") that is used in accordance with algorithms to determine a Presentation Rate ("PR").

Media Work Segment: A Media Work Segment ("MWS") comprises all or a portion of a Media Work ("MW").

Presentation Order Information ("POI"): Presentation Order Information ("POI") comprises information that can be used to obtain an order for presenting information in a Media Work ("MW"). For example, ordering for a composite MW comprised of several MWs, such as the continuous playback of several voice mail messages, or ordering MWS from within a single MW. The information may be an identifier of a source of the order information which can be obtained using Media Work Communication Technology ("MWCT").

Presentation Order Rule Information ("PORI"): Presentation Order Rule Information ("PORI") comprises information that is used to process Presentation Order Information ("POI"). In accordance with this aspect of the present invention, PORI may also comprise identifiers, for example, information used to retrieve PORI which is stored in processor memory, or data structures (locally or in a network or distributed in a network) in the form of look-up tables, rules and/or algorithms. In accordance with the present invention, PORI can be separate from a Conceptual Order Association data structure ("COA" data structure) and can, for example, be transmitted to an embodiment of the present invention, for example, at a specific hour each day, or between programs, to configure the embodiment in a manner which will be described in detail below.

Presentation Rate: A Presentation Rate ("PR") comprises a information that can be used to obtain a rate at which a Media Work ("MW") is presented to an Audience. The information may be an identifier of a source of the rate which can be obtained using Media Work Communication Technology ("MWCT").

Figure 16:
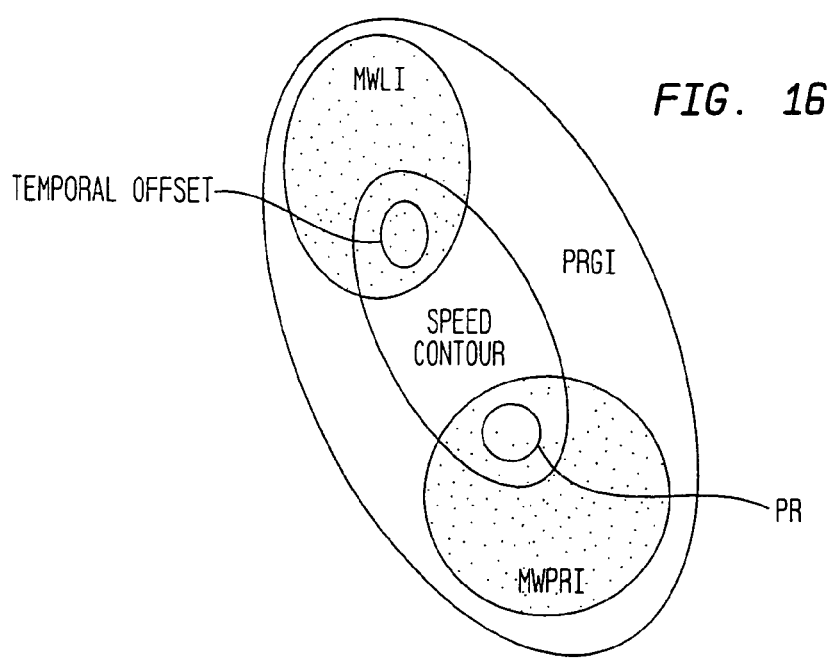
FIG. 16 shows a general representation of Presentation Rate Guidance Information ("PRGI") and a subset thereof that corresponds to a Speed Contour.

Presentation Rate Guidance Information: Presentation Rate Guidance Information ("PRGI") is information that is used to determine Presentation Rates ("PR") for one or more of: (a) an entire MW and (b) one or more portions of the MW. In accordance with the present invention, PRGI may comprise Media Work Presentation Rate Information ("MWPRI") and, optionally, one or more of the following: (a) Media Work Location Information ("MWLI"); (b) Presentation Rate Rule Information ("PRRI"); (c) Time-Stamp Information ("TSI"). Although MWPRI, MWLI, PRRI, and TSI are specified as independent sets of information, their representation can be in any form, including a format wherein the information is intermixed. Further, in accordance with the present invention, PRGI may include algorithms which, for example, combine MWPRI, MWLI, PRRI, and TSI to determine a PR (for example, PR can depend on the portion of the MW). In its simplest form, PRGI comprises MWPRI. As a particular example, MWPRI may comprise a single value, for example, a number, that represents a predetermined PR. As an additional particular example, MWPRI may comprise a single value, for example a number, that represents an increment, a decrement, or a scale factor that is applied to a PR obtained from the audio and/or audio-visual portion of the MW (sometimes referred to as the "normal playback rate") to determine the rate or speed at which the portion of the MW work to which it applies is presented to the Audience. FIG. 16 shows a general representation of PRGI and a subset thereof that corresponds to a Speed Contour.

Presentation Rate Insistence Information: Presentation Rate Insistence Information ("PRII") is used in accordance with algorithms to determine a Presentation Rate ("PR"). In accordance with the present invention, PRII may comprise information that specifies priorities associated with utilization of Media Work Presentation Rate Information ("MWPRI"). As a particular example, PRII may be comprised of, for example, information that indicates priority levels such as, for example, "mandatory," "strongly-encouraged," "suggested," and "optional." As a further particular example, PRII may be comprised of, for example, a number on a standard scale. As a still further particular example, PRII may be comprised of a single value, for example, a number, that represents an increment, a decrement, or a scale factor that is applied to a predetermined value of PRII or a to a presently used PRII. As still another example, PRII may be comprised of, for example, a series of pairings of numbers in which one number of the pair represents a priority level and the other number of the pair represents a particular Audience, for example, an age group, such that different Audience segments receive different priority levels for the same MWS.

Presentation Rate Rule Information: Presentation Rate Rule Information ("PRRI") comprises information that is used to process Presentation Rate Guidance Information ("PRGI") and/or Concept Guidance Information ("CGI"). PRRI may be included as a part of a Media Work ("MW"), CGI, and/or PRGI. In accordance with this aspect of the present invention, PRRI may also comprise identifiers, for example, information used to retrieve PRRI which is stored in processor memory, or data structures (locally or in a network or distributed in a network) in the form of look-up tables, rules and/or algorithms. In accordance with the present invention, PRRI can be separate from an MW, PRGI or CGI and can, for example, be transmitted to an embodiment of the present invention, for example, at a specific hour each day, or between programs, to configure the embodiment in a manner which will be described in detail below. In accordance with the present invention, PRRI may also be used to process PRII.

Presentation Volume Association data structure: A Presentation Volume Association data structure ("PVA" data structure) comprises Media Work Content Information ("MWCI"), and an indicium of the volume to be used for particular information in the CGI and, optionally, one or more of the following: (a) rule information; (b) an algorithm; and (b) Time-Stamp Information ("TSI"). It should be understood that the indicium may include an algorithm that, when executed, provides the indicium, or an identifier of the indicium, which identifier may be used to obtain the indicium in accordance with any one of a number of methods that are well known to those of ordinary skill in the art including, without limitation, from local or distributed data bases, where distribution includes distribution over webs of interconnected computer or communication networks.

Speed Contour: A Speed Contour comprises a subset of general Presentation Rate Guidance Information ("PRGI"). FIG. 16 shows a general representation of Presentation Rate Guidance Information ("PRGI") and a subset thereof that corresponds to a Speed Contour.

Time-Stamp Information: Time-Stamp Information ("TSI") is used to insure that a Conceptual Presentation Rate Association data structure ("CPRA" data structure) or Presentation Rate Guidance Information ("PRGI") is utilized in a logical manner in light of the time of presentation. In accordance with the present invention, certain aspects of PRGI or a CPRA data structure may be ignored, or altered, in light of TSI and the time of presentation. As a particular example, Presentation Rate Insistence Information ("PRII") may be ignored if TSI indicates that an associated PRGI or CSA data structure was received, for example, four (4) days ago. As an example, by ignoring PRII for time sensitive material in a Media Work ("MW"), for example, advertisements for a sale which takes place on a certain date, an Audience member would be allowed to fast-forward through material in the MW that is no longer relevant at the time of presentation. As a further particular example, TSI may comprise an expiration date for the effectiveness of the PRII. This enables material of a time sensitive nature to be presented with a restricted presentation rate during presentations of the MW which occur before the expiration date contained in the TSI. If an MW is presented after the expiration date contained in the TSI, the outdated PRII may be ignored, overridden, or altered to allow Audience members to skip or fast-forward through that portion of the MW.

User Input: User Input ("UI"), in one embodiment, is comprised of Media Work Content Information ("MWCI") and Media Work Presentation Rate Information ("MWPRI") associated therewith. In another embodiment, UI is comprised of MWPRI and, optionally, MWLI associated therewith.

General Embodiments of the Present Invention

There are two general aspects to the present invention. In a first aspect of the present invention, a Media Work ("MW") is altered in accordance with one or more sources of alteration information. This first aspect may further include presentation of the altered MW using Media Work Communication Technology ("MWCT") to an Audience and/or storage of the altered MW.

In a second aspect of the present invention, the Presentation Rate ("PR") of one or more of an entire MW or one or more portions of a MW is altered in response to Audience input, and the alterations are correlated with criteria (information and/or information properties) to create one or more of the following: (a) a Conceptual Presentation Rate Association data structure ("CPRA" data structure); (b) Presentation Rate Guidance Information ("PRGI"), for example a Speed Contour; and (c) any of several representations of Audience affinity or aptitude for various information or information properties in the MW (as will be explained in detail below, the manner in which the PRs are altered by the Audience members serve as a proxy for Audience affinity and/or Audience aptitude).

In accordance with the present invention, output from the second aspect of the present invention may be used as input to the first aspect of the present invention to present previously unperceived MWs. Advantageously, analyzing Audience input in accordance with the present invention to determine Audience affinity and aptitude, enables one to anticipate Audience response to previously unperceived MWs comprised of information and information properties to which Audience affinity and aptitude has been determined. This enables one to prepare information for use in presenting the unperceived MWs that will track Audience affinity and aptitude by causing the unperceived MWs to slow down and/or speed up in accordance with the analyzed affinity and aptitude. Of course, the second aspect of the present invention further includes presenting the unperceived MW using the results previously generated by the same or a different Audience to refine or adjust the derived Audience affinity and aptitude results.

Figure 22:
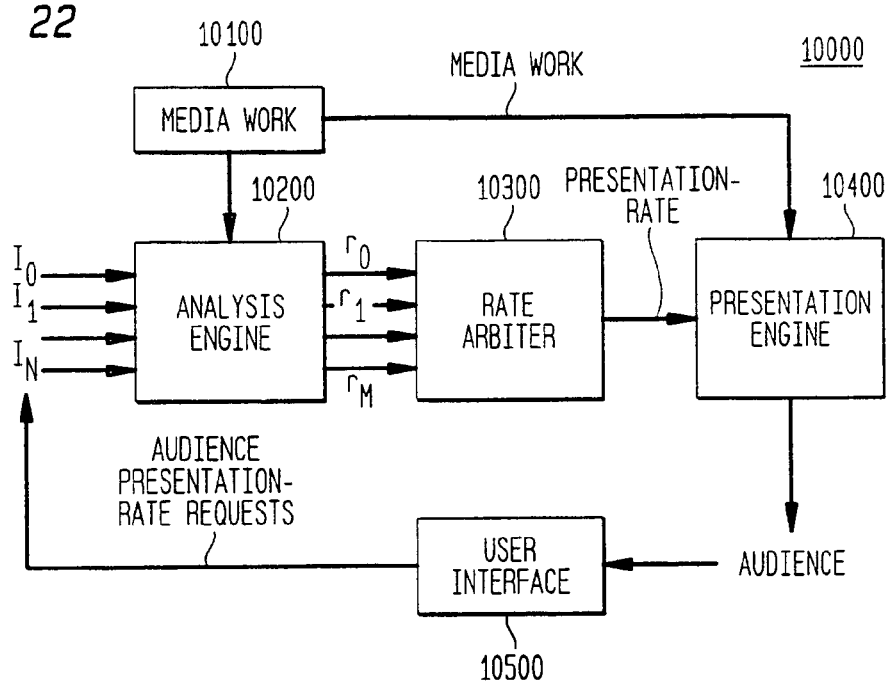
FIG. 22 shows an embodiment of the present invention that operates in accordance with a method which is referred to herein as an Audience Affinity/Aptitude Application ("AAA Application")

FIG. 22 shows embodiment 10000 of the present invention that operates in accordance with a method which is referred to herein as an Audience Affinity/Aptitude Application ("AAA Application"). In essence, the output from the AAA Application is an altered Media Work ("MW") and, optionally, (a) a presentation of the altered MW to an Audience; and (b) storage of the altered MW. In accordance with the present invention, the presentation may be may using Media Work Communication Technology ("MWCT"). As shown in FIG. 22, Analysis Engine 10200 receives the following as input: (a) MW 10100 and (b) information from a variety of sources (denoted $I_0, I_1, \ldots, I_N$). Analysis Engine 10200 analyzes the inputs in a manner which will be described in detail below, and produces, as output, a variety of Presentation Rates ("PR") (denoted as $r_0, r_1, \ldots, r_M$) for a particular Media Work Segment ("MWS") to be presented. The PRs (denoted $r_0, r_1, \ldots, r_M$) correspond to PRs obtained by analyzing the various sources ($I_0, I_1, \ldots, I_N$) in light of MW 10100 (note that in general, N does not equal M because one or more of the sources may comprise algorithms or rules for combining information to determine a PR).

PRs (denoted $r_0, r_1, \ldots, r_M$) are applied as input to Rate Arbiter 10300. In accordance with the present invention, and in a manner that will be described in detail below, Rate Arbiter 10300 analyzes the inputs to produce as output a single PR (such analysis occurs in accordance with predetermined rules and algorithms). The PR output from Rate Arbiter 10300 is applied as input to Presentation Engine 10400 along with at least an MWS of MW 10100 to which the PR pertains. In response, in accordance with the present invention, Presentation Engine 10400 alters the MWS of MW 10100 in accordance with the input PR to which it pertains, and stores the altered MWS and/or presents it to the Audience member or transmits it using Media Work Communication Technology ("MWCT") to further Audiences or for distribution. Note that as shown in FIG. 22, feedback from Audience members (in the form of Audience Presentation Rate Requests ("APRR")) may serve as one of the sources of information input to Analysis Engine 10200. The feedback from the Audience member would be entered by means of user interface apparatus 10500 and applied as input to Analysis Engine 10200 using various means well known to those of ordinary skill in the art and described below for collecting user-input and correlating it with MWS.

In accordance with the present invention, Presentation Engine 10400 comprises apparatus for creating and presenting alternative works of MW 10100 using PRs. For example, in accordance with the present invention, a Time-Scale Modification ("TSM") method is used, for example, a method disclosed in U.S. Pat. No. 5,175,769 (the '769 patent), which '769 patent is incorporated by reference herein, the inventor of the present invention also being a joint inventor of the '769 patent. As one of ordinary skill in the art can readily appreciate, whenever embodiment 10000 presents an alternative of MW 10100 and MW 10000 comprises an audio-visual work, Presentation Engine 10400 speeds up or slows down visual information to match the PR selected for audio in the audio-visual work. To do this in a preferred embodiment, the video signal is "Frame-subsampled" or "Frame-replicated" in accordance with any one of the many methods known to those of ordinary skill in the prior art to maintain synchronism between the audio and visual portions of the audio-visual work. Thus, if one speeds up the audio and samples are requested at a faster rate, the frame stream is subsampled, i.e. frames are skipped. In alternative embodiments, Presentation Engine 10400 may further display text on a screen, and utilize scrolling rates, and possibly one or more of the following methods to alter the PR perceived by an Audience member: (a) provide transient movement of text highlighting, (b) provide contrasting fonts, and (c) provide different color text. These alterations would direct the viewer's eyes to the specific region or text of the MWS at the desired rate. For example, and without limitation, the text highlighting may highlight various words in a text page for different durations, for example using a grammatical criteria, briefly highlighting articles, while highlighting nouns and subjects of sentences for longer durations.

In the most general sense, Analysis Engine 10200 may comprise one or more analysis engines, each of which analysis engines analyzes one or more of the following: (a) MW 10100; (b) a Conceptual Presentation Rate Association data structure ("CPRA" data structure); (c) Presentation Rate Guidance Information ("PRGI"); (d) Media Work Content Data ("MWCD"); (e) Content Guidance Information ("CGI"); (f) Presentation Rate Rule Information ("PRRI"); (g) a pair comprised of a Conceptual Aptitude Association data structure ("CAptA" data structure) and an Aptitude Presentation Rate Association data structure ("AptPRA" data structure); (h) a pair comprised of a Conceptual Affinity Association data structure ("CAffA" data structure) and an Affinity Presentation Rate Association data structure ("AffPRA" data structure); and (i) Audience Presentation Rate Request ("APRR"). It should be clear to those of ordinary skill in the art, that in particular embodiments: (a) Analysis Engine 10200 will not comprise each of the analysis engine components required to analyze each of the inputs set forth above; and (b) some or all of the optional inputs will not be utilized.

Figure 23:
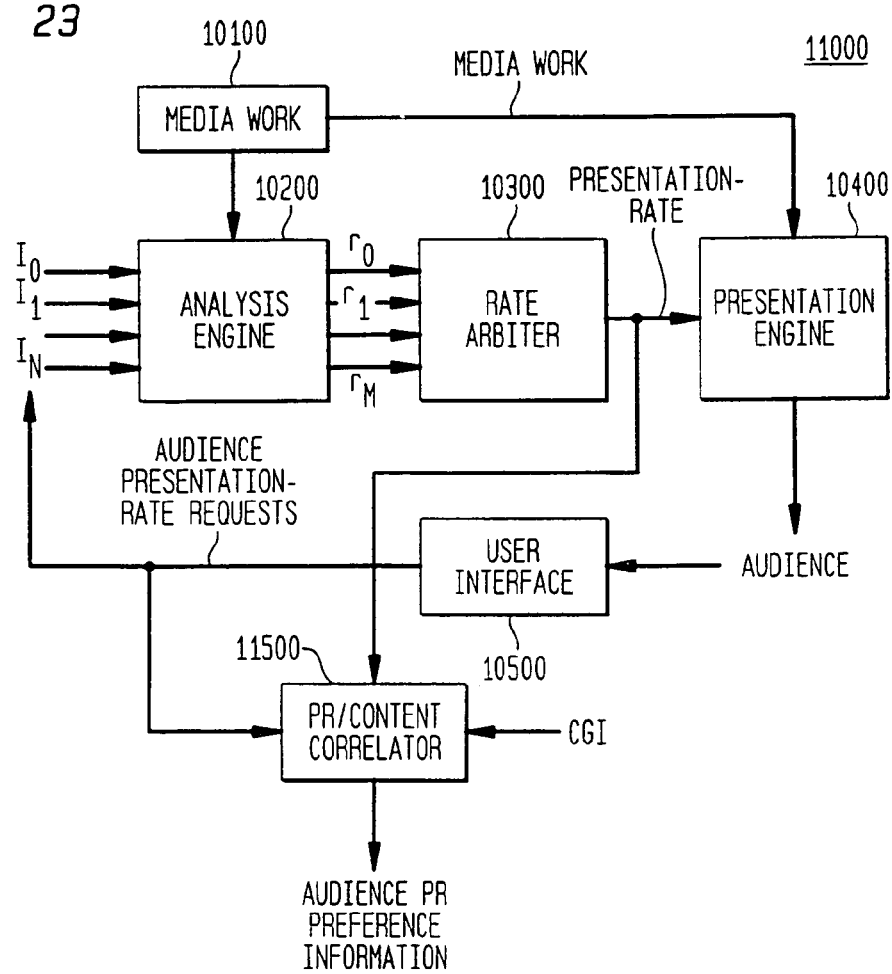
FIG. 23 shows an embodiment of the present invention that operates in accordance with a method that is referred to herein as an Audience Presentation Rate Preference Analysis ("APRP" Analysis)

FIG. 23 shows embodiment 11000 of the present invention that operates in accordance with a method that is referred to herein as an Audience Presentation Rate Preference Analysis ("APRP" Analysis). In essence, the output from the APRP Analysis is one or more of: (a) a Conceptual Presentation Rate Association data structure ("CPRA" data structure); (b) Presentation Rate Guidance Information ("PRGI"); and (c) any of several representations of Audience affinity or aptitude for various information or information properties in the MW.

As shown in FIG. 23, embodiment 11000 utilizes embodiment 10000 shown in FIG. 22 to alter Media Work 10100 and to present the altered MW to the Audience. However, embodiment 11000 contains PR/Content Correlator 11500 which receives, as input: (a) PRs output from Rate Arbiter 10300, (b) Content Guidance Information ("CGI") corresponding to the segment of MW 10100 being presented to the Audience, and (c) Audience input. PR/Content Correlator 11500 performs one or more of the following tasks. In task 1, PR/Content Correlator 11500 pairs: (a) PRs produced as a result of the Audience input arbitrated with all of the other information source inputs (there may be no arbitration if there were no other information source inputs, i.e., the only input was Audience input) with (b) an MWS identifier (for example, time offset or location in MW 10100) to which it pertains, and produces, as output, Presentation Rate Guidance Information ("PRGI") 11600. In task 2, PR/Content Correlator 11500 pairs: (a) PRs produced as a result of the Audience input arbitrated with all of the other information source inputs (there may be no arbitration if there were no other information source inputs, i.e., the only input was Audience input) with (b) the CGI corresponding to the segment of MW 10100 being presented to the Audience, and produces, as output, one or more of the following: (a) CPRA data structure 11700; and (b) any of several representations of Audience affinity or aptitude for various information or information properties in the MWS to which it pertains. As will be described in detail below, in accordance with the present invention, the representations of Audience affinity or aptitude produced by PR/Content Correlator 11500 will be used to guide the selection of PRs when presenting new MWs for training purposes or entertainment.

Specific Embodiments of the Present Invention

Embodiments of a first aspect of the present invention pertain to method and apparatus for receiving Audience (this may also be referred to herein as listener and/or viewer) input regarding desired Presentation Rate (this may also be referred to herein as speed or playback rate) for portions of a Media Work ("MW") (this may also be refereed to herein as speech, audio, and/or audio-visual work) and for developing a "Speed Contour" or a "Conceptual Playback Rate Association" data structure (this may also be referred to herein as a "Conceptual Speed Association" data structure) which represents the Audience (the listener or viewer) input. The Audience (listener) input serves as a proxy for the Audience's (the listener's or viewer's) affinity for (this may also be referred to herein as interest in) and/or the Audience's (listener's) aptitude for (this may also be referred to herein as ability to comprehend) the MW (speech, audio, and/or audio-visual work) and will be referred to herein as Audience Affinity or Audience Aptitude (this may also be referred to herein as "listener interest"). For example, an Audience member (the listener or viewer) might want to slow down some portion of the MW (the speech, audio, and/or audio-visual work) if the Audience member (the listener or viewer) was interested in enjoying it more fully or if the Audience member (the listener or viewer) was having difficulty comprehending the portion, or if the Audience member (the listener or viewer) was transcribing information contained in the portion. Further embodiments of the first aspect of the present invention pertain to a method and apparatus for replaying an MW (speech, audio and/or audio-visual work) in accordance with the Speed Contour or Conceptual Presentation Rate Association data structure to produce a new work which is referred to herein as an altered MW (this may also be referred to herein as a "listener-interest-filtered" work ("LIF" work)). As will be described in detail below, the altered MW (LIF work) is useful in, for example, education, advertising, news delivery, public safety announcements and the like.

Generation of a Speed Contour and a Conceptual Presentation Rate Association Data Structure In accordance with the present invention, embodiments of a first aspect of the present invention generate a Speed Contour, which Speed Contour is optionally stored for later use. The embodiments that generate a Speed Contour represent a specific embodiment of the method and apparatus described above in conjunction with FIG. 23. After describing the embodiments that generate the Speed Contour, a description of the correspondence to the method and apparatus shown in FIG. 23 will be set forth.

Figure 1:
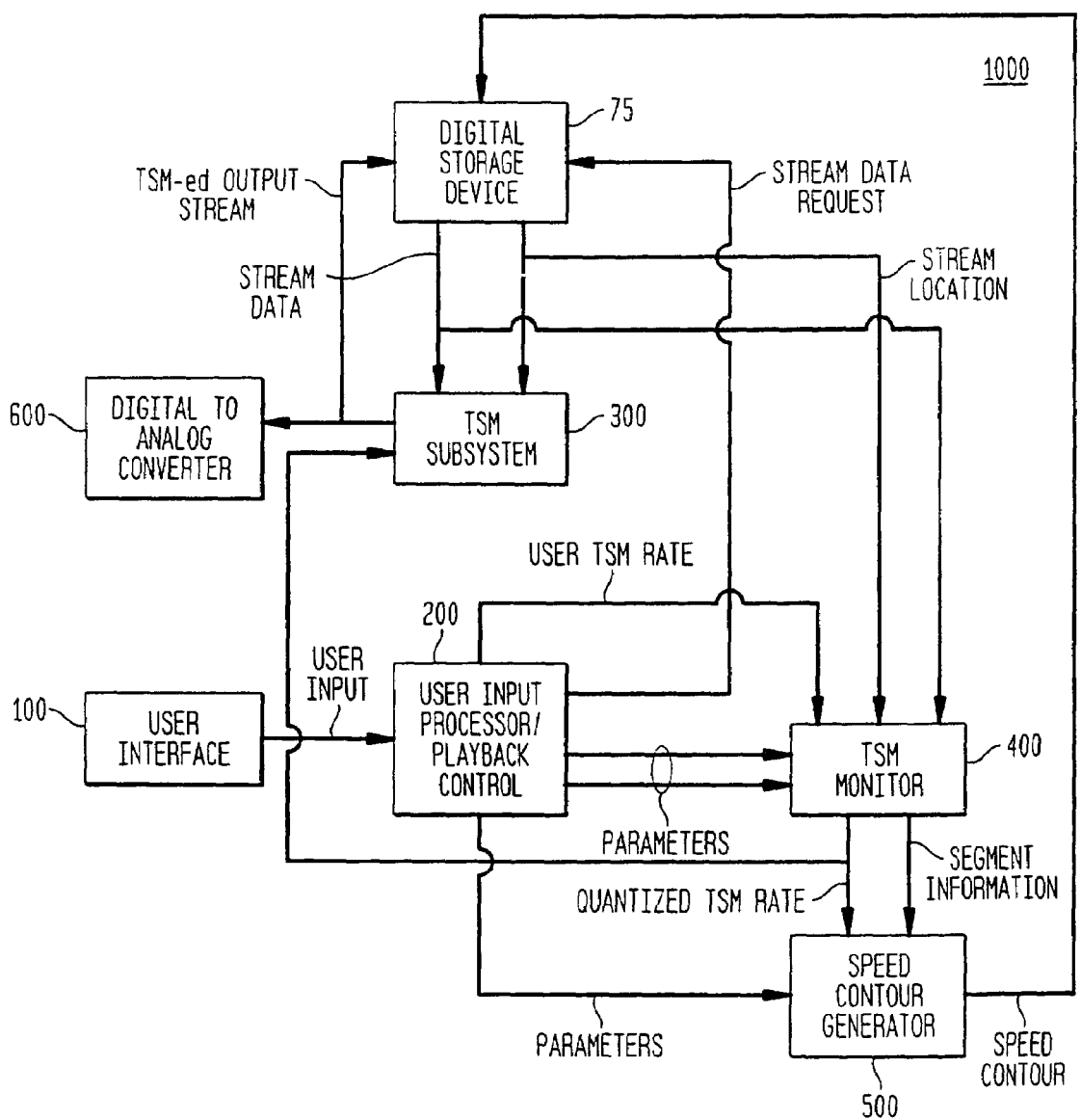
FIG. 1 shows a block diagram of an embodiment of a first aspect of the present invention which generates a Speed Contour for an audio or audio-visual work.

FIG. 1 shows a block diagram of embodiment 11000 of a first aspect of the present invention that generates a Speed Contour for an MW (audio or audio-visual work). As shown in FIG. 1, embodiment 1000 comprises User Interface 100 ("UI 100") which receives input from an Audience member (this may also be referred to herein as a user). UI 100 provides output signals which indicate input from the Audience member (the user). The Audience input is interpreted by User Input Processor/Playback Control 200 ("UIP/PC 200") of embodiment 1000 to indicate the following options selected by the Audience member (the user): (a) select a file to play, which file corresponds to a particular MW (audio or audio-visual work) (the selected file can be input to embodiment 1000 directly or it can be a file that has been stored by embodiment 1000); (b) initiate presentation (playback) of the selected file; (c) halt presentation (playback) of the selected file; (d) pause presentation (playback) of the selected file; (e) modify the Presentation Rate ("PR") (this may also be referred to herein as the Time-Scale Modification ("TSM") rate or the playback rate or the speed), of a portion of the MW (the audio or audio-visual work) being presented (this may also be referred to as played); or (f) specify parameters Interval_Size, Speed_Change_Resolution, Average_or_Overwrite, and Log_Repeats that are used by the apparatus in a manner that will be explained in detail below in generating the Speed Contour. There exist many apparatus which are well known to those of ordinary skill in the art for receiving input from an Audience member (a user). For example, it is well known to those of ordinary skill in the art that commercially available equipment exists for detecting: (a) the pressing of a key; (b) the activation of a switch on a mouse; (c) the movement of a slider or position indicator; and (d) Audience member (user) speech commands and, in response, for sending digital data representing the keypress, the switch activation, the movement of the slider or position indicator, or the speech commands to a processing unit. Embodiments of the present invention include receiving inputs using Media Work Communication Technology ("MWCT") in the broadest sense.

UIP/PC 200 receives the Audience member (the user) input from UI 100 and (a) converts the Audience member (the user) input to numeric values; (b) interprets the Audience member (the user) input to set the values of parameters and to control the creation, use, modification or overriding of the Speed Contour; and (c) directs accessing and loading of a data stream from an MW (an audio or audio-visual work) by sending a stream data request to Digital Storage Device 75 or other MW (audio or audio-visual work) data source (to perform presentation (playback) control). In the case of Digital Storage Device 75, UIP/PC 200 may request access to a file of digital data representing an MW (an audio or audio-visual work) stored in a file-system on the device. To direct accessing and loading of a data stream from an MW (an audio or audio-visual work), UIP/PC 200 interprets the Audience member (the user) input and the location of digital samples representing the MW (the audio or audio-visual work) stored on Digital Storage Device 75 to compute presentation (playback) positions for the selected file at a particular sample.

Digital Storage Device 75 receives the following as input: (a) stream data requests from UIP/PC 200; and optionally (b) Time-Scale Modified output from TSM Subsystem 300; and optionally (c) a stream of data representing the Speed Contour from Speed Contour Generator 500. Digital Storage Device 75 produces the following as output: (a) a stream of data representing an MW (an audio or audio-visual work) and (b) a stream of location information, for example position in a file, of the data stream being output. There are many methods well known to those of ordinary skill in the art for utilizing digital storage devices, for example a "hard disk drive", to store and retrieve general purpose data. Embodiments of the present invention include storing information on local or distributed devices and retrieving information therefrom using MWCT in the broadest sense.

The MW (the audio or audio-visual work) is typically stored in digital form on Digital Storage Device 75. There exist many commercially available apparatus which are well known to those of ordinary skill in the art for use as a digital storage device such as, for example, a CD-ROM, a digital tape, a magnetic disc. Digital storage device 75 receives data requests from UIP/PC 200 in accordance with methods which are well known to those of ordinary skill in the art to provide a stream of digital samples representing the audio and/or audio-visual work. In alternative embodiments, the audio or audio-visual work is stored in analog form on an analog storage device. In such an alternative embodiment, a stream of analog signals is input to an apparatus, not shown, for transforming the analog samples into digital samples. There exist many commercially available apparatus which are well known to those of ordinary skill in the art for receiving an input analog signal such as a voice signal and for sampling the analog signal at a rate which is at least the Nyquist rate to provide a stream of digital signals which may be converted back into an analog signal without loss of fidelity. The digital samples are then transmitted to TSM Subsystem 300.

TSM Subsystem 300 receives as input: (a) a stream of samples representing portions of the MW (the audio or audio-visual work) from Digital Storage Device 75; (b) stream location information from Digital Storage Device 75 used to identify the position in the data stream of the samples being sent, for example, a sample count or time value; and (c) a desired PR (TSM rate or playback rate) from Time-Scale Modification Monitor 400 ("TSM Monitor 400"). Output from TSM Subsystem 300 is applied as input to: (a) Digital to Analog Converter/Audio and/or Audio-Visual Playback Device 600 ("DA/APD 600") and, optionally, to (b) Digital Storage 75 for storage of the Time-Scale Modified output, i.e. the altered MW (the LIF work), if desired. DA/APD 600 is apparatus which is well known in the art for receiving digital samples and constructing an MW (an audio or audio-visual work). In accordance with the present invention, the output of TSM Subsystem 300 is a stream of digital samples representing an MW (an audio or audio-visual work) whose PR (playback rate), supplied from TSM Monitor 400, provides feedback to the Audience member (the user) about his/her input PR (TSM rate) specification. In particular, the Audience member (the user) listens to the Time-Scale Modified output and can change the PR (TSM rate or playback rate), by providing further input using UI 100. Specifically, if the Audience member (the user) wishes to speed up or slow down a portion of the MW (the audio or audio-visual work) just played, the Audience member (the user) can provide input using UI 100 to rewind the MW (the audio or audio-visual work) to a desired portion and replay it again with a modified PR (TSM rate or playback rate). In this manner, the Audience member (the user) determines a desired PR (TSM rate or playback rate), for each portion of the MW (the audio or audio-visual work). TSM Subsystem 300 modifies the input stream of data in accordance with well known TSM methods to produce, as output, a stream of samples that represents a Time-Scale Modified signal. In a preferred embodiment of the present invention, the TSM method used is a method disclosed in U.S. Pat. No. 5,175,769 (the '769 patent), which '769 patent is incorporated by reference herein, the inventor of the present invention also being a joint inventor of the '769 patent. As one of ordinary skill in the art can readily appreciate, whenever embodiment 1000 presents (provides playback for) an MW (audio-visual work), TSM Subsystem 300 speeds up or slows down visual information to match the audio in the audio-visual work. To do this in a preferred embodiment, the video signal is "Frame-subsampled" or "Frame-replicated" in accordance with any one of the many methods known to those of ordinary skill in the prior art to maintain synchronism between the audio and visual portions of the MW (the audio-visual work). Thus, if one speeds up the audio and samples are requested at a faster rate, the frame stream is subsampled, i.e. frames are skipped.

TSM Monitor 400 receives the following as input to guide embodiment 1000 in generating a Speed Contour: (a) Audience (user) input that has been translated by UIP/PC 200 to a desired PR (TSM rate or playback rate), which desired PR (TSM rate or playback rate) may indicate a change of PR (TSM rate or playback rate) for a portion of the input MW (the input audio or audio-visual work) being perceived; (b) a stream of samples representing portions of the MW (the audio or audio-visual work) from Digital Storage Device 75; (c) current stream location information from Digital Storage Device 75 used to identify the position in the stream of the samples being sent, for example, a sample count or time value of the beginning of the group of samples transferred from Digital Storage Device 75; and (d) parameters Interval_Size and Speed_Change_Resolution from UIP/PC 200.

As discussed above, a Speed Contour is information, for example, in the form of a stream of data, that represents a desired PR (TSM rate or playback rate) for an MW (an audio or audio-visual work) for some or all points of the work. In practice, the time resolution required for embodiment 1000 to reproduce the desired PR (TSM rate or playback rate) for an MW (an audio or audio-visual work) varies slowly compared with the sampling rate of the digital signal which comprises the MW (the audio or audio-visual work). As a result, and in accordance with a preferred embodiment of the present invention, the Speed Contour comprises a single PR (a single TSM value) which is associated with a particular group of samples of the MW (the audio or audio-visual work) that correspond to a particular segment of that MW. Alternatively, one could associate a PR (TSM value) with each sample of the input MW (audio or audio-visual work.

In practice the resolution required for reproducing the PR (TSM rate or playback rate) is limited. Thus, in a preferred embodiment of the present invention, instead of using a range of continuous PRs (TSM rates or playback rates), the PRs (TSM rates) are quantized into fixed intervals and the values of these quantized levels used to represent the PRs (TSM rates). This will be explained further below.

Two parameters guide the described embodiment of TSM Monitor 400:

1. Interval_Size: this parameter determines the time interval, given in terms of a number of samples of the input MW (the input audio or audio-visual work), that should elapse between analysis of changes in the PR (TSM rate or playback rate).
2. Speed_Change_Resolution: this parameter indicates the difference in amount between the quantized levels used to represent the PR (TSM rate or playback rate).

TSM Monitor 400 uses the parameter Interval_Size to segment the input digital stream and to determine a single PR (TSM rate) for each segment of the input digital stream, for example, the PR (TSM rate) at the beginning or end of the segment or a mathematical average of the PRs (TSM rates) over the segment. Note, the length of each segment is given by the value of the Interval_Size parameter.

TSM Monitor 400 uses the parameter Speed_Change_Resolution to determine appropriate PRs (TSM rates) to pass to TSM Subsystem 300 and to Speed Contour Generator 500. The input PR (TSM rate) desired by the Audience member (the user) is converted to one of the quantized levels in a manner which is well known to those of ordinary skill in the art. This means that the output PR (TSM rate or playback rate) can change only if the input desired PR (TSM rate) changes by an amount that exceeds the difference between quantized levels, i.e., Speed_Change_Resolution. As a practical matter then, parameter Speed_Change_Resolution filters small changes in PR (TSM rate or playback rate) that would occur if the Audience member (the user) changed the PR (TSM rate or playback rate) by a small amount and then immediately changed it back to its previous value. The parameters Interval_Size and Speed_Change_Resolution can be set as predetermined parameters for embodiment 1000 in accordance with methods which are well known to those of ordinary skill in the art or they can be entered and/or varied by receiving Audience (user) input through UI 100 in accordance with methods which are well known to those of ordinary skill in the art. However, the manner in which these parameters are set and/or varied are not shown for ease of understanding the present invention.

TSM Monitor 400 produces, as output, a pair of values for each segment of the input stream specified by Interval_Size: (a) one of the pair of values represents location information in the input digital stream for the segment and (b) the other of the pair of values represents the PR (TSM rate or playback rate) requested by the Audience member (the user) for that segment. The pair of values is applied as input to Speed Contour Generator 500 and the other of the pair of values which represents the PR (the TSM rate) is applied as input to TSM Subsystem 300.

Figure 2:
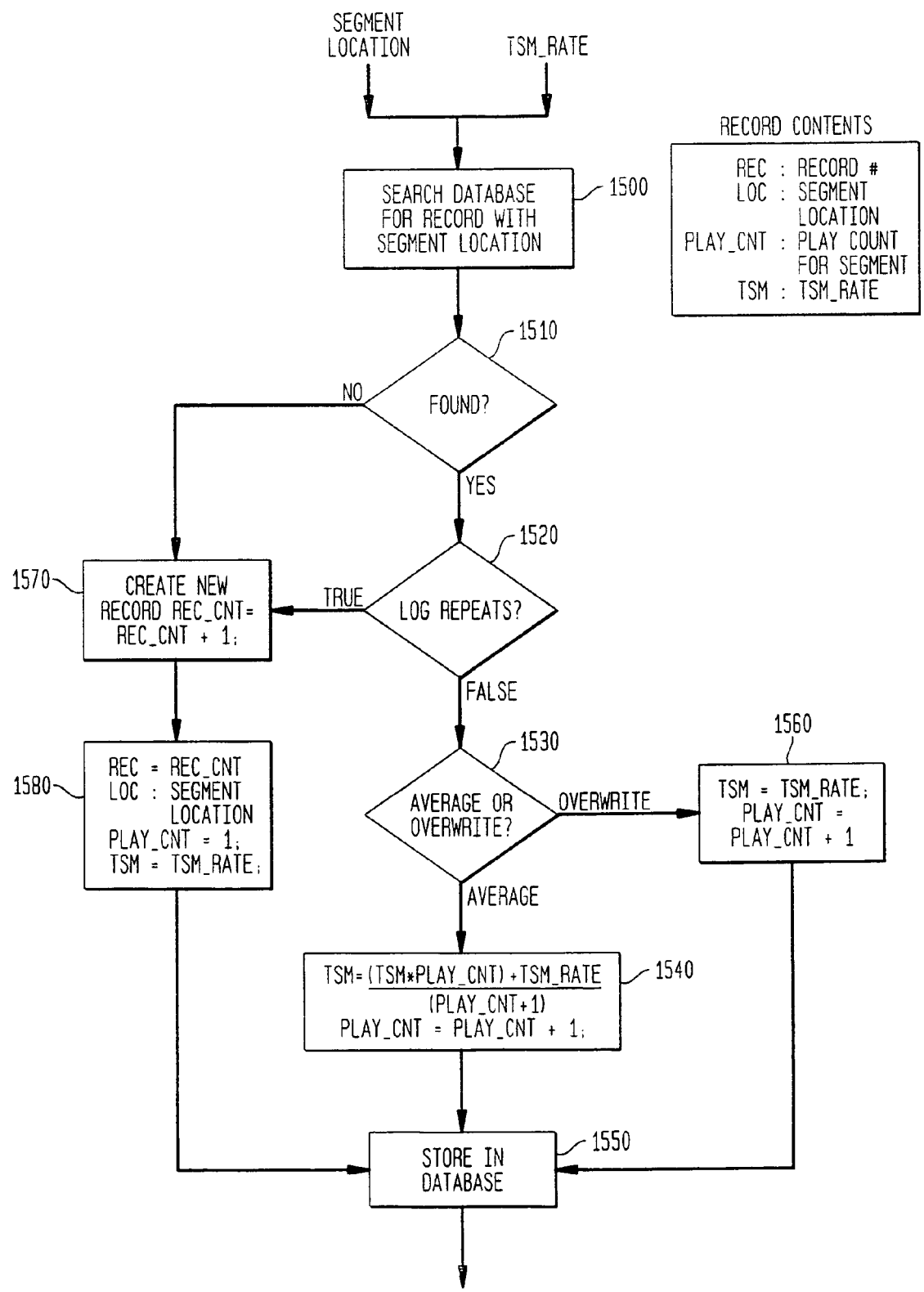
FIG. 2 shows a flowchart of an algorithm used in one embodiment of a Speed Contour Generator shown in FIG. 1.

Speed Contour Generator 500 accepts as input: (a) one of the pair of values that represents location information in the input digital stream for a segment from TSM Monitor 400; (b) the other of the pair of values that represents the PR (TSM rate or playback rate) for the segment from TSM Monitor 400; and (c) and parameters Average_or_Overwrite and Log_Repeats from UIP/PC 200. Speed Contour Generator 500 uses a database or scratch-pad memory to maintain a list of records; each record stores information pertaining to the PR (TSM rate) and stream position information for the PR (the TSM rate). FIG. 2 shows a flowchart of an algorithm used in one embodiment of Speed Contour Generator 500 to generate the Speed Contour. The following fields are used in the records used by the embodiment:

1. Rec: a unique number identifying each record and its allocation/creation order.
2. Loc: a data field containing stream location information for a segment of the input stream.
3. Play_Cnt: a data field containing the number of times a segment has been played. Play_Cnt is set to 1 when a record is created.
4. TSM: a data field representing the PR (the TSM rate) for the segment.

In addition to the above-defined data fields, two parameters guide Speed Contour Generator 500 in generating a Speed Contour:

1. Average_or_Overwrite: this parameter specifies how information should be logged if the Audience member (the user) "rewinds" or moves the playback location manually (i.e., with a mouse, slider or position indicator) so that a region of the input MW (the input audio or audio-visual work) previously presented (played) is presented again (replayed). If the value of the parameter is "Average", the PR (the TSM rate or playback rate) for the repeated segment is calculated by averaging the PR (the TSM rate or playback rate) specified each time the segment was played. If the value of the parameter is "Overwrite", only the last PR (the last TSM rate or playback rate) specified for the repeated segment is used for the repeated segment in the Speed Contour.
2. Log_Repeats: this parameter is a Boolean variable which, if true, directs Speed Contour Generator 500 to record PRs (TSM rates) each time a section of the input MW (the input audio or audio-visual work) is played by the Audience member (the user). The PR (the TSM rate or playback rate) is stored each time the segment is played.

The parameters Average_or_Overwrite and Log_Repeats can be set as predetermined parameters for embodiment 1000 in accordance with methods which are well known to those of ordinary skill in the art or they can be entered and/or varied by receiving user input through UI 100 in accordance with methods which are well known to those of ordinary skill in the art. However, the manner in which these parameters are set and/or varied are not shown for ease of understanding the present invention.

As shown in FIG. 2, segment location and PR (TSM rate) are applied as input to box 1500. At box 1500, a search is performed to locate any records in the database that contain identical segment location values. Control is then transferred to box 1510. At box 1510 a decision is made. If a record containing identical segment location information is found, the record is noted and control is transferred to box 1520. If no such record is found, control is transferred to box 1570.

At box 1570, a new record in the database is created and an internal variable Record_Count is updated to reflect the count of records in the database (The internal variable Record_Count is initialized to 0 at the start of generation of each new Speed Contour.). Then, control is transferred to box 1580. At box 1580, data values are stored in fields of the newly created record and control is transferred to box 1550.

At box 1520 a decision is made. If a parameter Log_Repeats is true, control is transferred to box 1570, and if the parameter Log_Repeats is false, control is transferred to box 1530. At box 1530 a decision is made. If the value of parameter Average_or_Overwrite equals "Average" control is transferred to box 1540. If the value of parameter Average_or_Overwrite equals "Overwrite" control is transferred to box 1560.

At box 1540, data in fields TSM and Play_Cnt are replaced. As shown in FIG. 2, the previous value of Play_Cnt is used in computing a mathematical average of the PRs (the TSM rates), and Play_Cnt is incremented. Then, control is transferred to box 1550. At box 1560, the data in fields TSM and Play_Cnt are replaced. As shown in FIG. 2, the current PR (TSM rate) overwrites the previous one and Play_Cnt is incremented. Then, control is transferred to box 1550.

At box 1550, the newly created or modified record is stored in the database. Control is then suspended until new data values arrive at Speed Contour 500, at which time control is transferred to box 1500. Upon completion of presentation (playback) of an MW (audio or audio-visual work), the database is scanned and the PRs (TSM rates or playback rates) for each segment of the input signal are extracted and used to construct the Speed Contour. Note that when no segments are repeated and the MW (audio or audio-visual work) is presented (played) in its entirety, the Speed Contour is obtained by sorting the database records in ascending order according to their allocation order stored in the Rec data field. Note also that the Speed Contour may be stored for later use in accordance with any one of the many methods which are well known to those of ordinary skilled in the art to store such a digital stream of data. For example, the Speed Contour may be stored on Digital Storage Device 75, or on some other storage medium, or is transmitted to another system via a transmission device such as a modem.

Although FIG. 1 shows embodiment 1000 to be comprised of separate modules, in a preferred embodiment, UI 100, UIP/PC 200, TSM Subsystem 300, TSM Monitor 400, and Speed Contour Generator 500 are embodied as software programs or modules which run on a general purpose computer such as, for example, a personal computer. Furthermore, Digital Storage Device 75 is embodied as a disk drive or Random Access Memory and Digital to Analog Converter 600 is embodied as a typical accessory to a general purpose computer such as a soundcard on a personal computer. It should be well known to one of ordinary skill in the art, in light of the detailed description above, how to implement these programs or modules in software.

The following describes how embodiment 1000 shown in FIG. 1 corresponds to embodiment 11000 shown in FIG. 23. TSM Subsystem 300 and Digital to Analog Converter 600 correspond to Presentation Engine 10400; TSM Monitor 400 corresponds to Analysis Engine 10200; and Speed Contour Generator 500 corresponds to PR/Content Correlator 11500.

Figure 3:
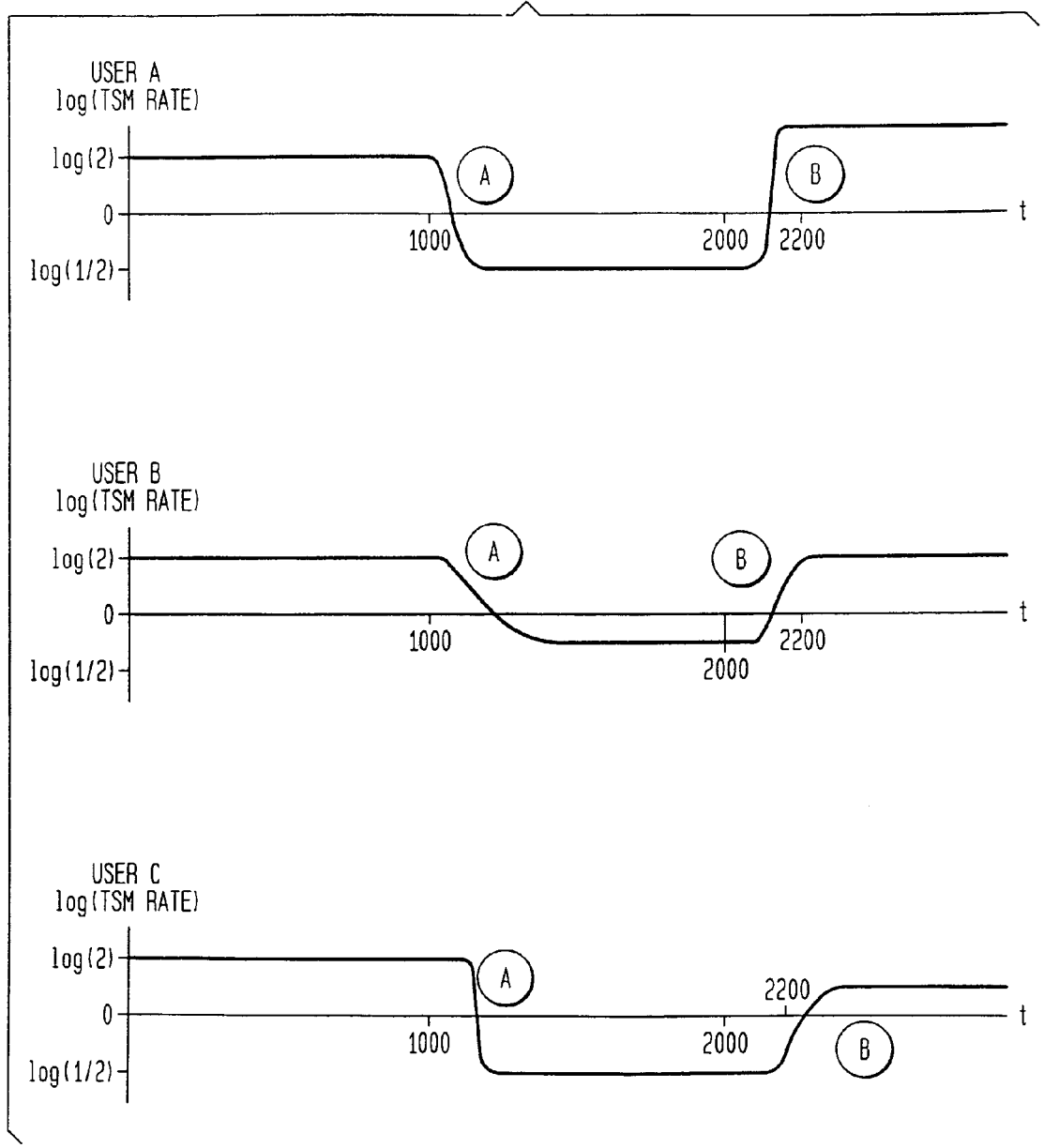
FIG. 3 shows, in graphical form, Speed Contours for several different listening sessions of the same audio or audio-visual work.

In accordance with one embodiment of the present invention, the data represented in a Speed Contour for a particular Audience member (user) can be presented in a graphical format to display the PRs (TSM rates or playback rates) selected by an Audience member (user) or by an Audience (groups of users) to help identify similarities or differences. In one embodiment, PR (TSM rate) is displayed on the vertical axis of a two-dimensional graph and segment number or time-value is displayed on the horizontal axis. FIG. 3 shows, in graphical form, Speed Contours for several different presentations (listening sessions) of the same MW (audio or audio-visual work). Note that by displaying these Speed Contours in a graphical format, information about Audience Affinity or Audience Aptitude (user interest, user comprehension, and user confusion) can be inferred. For example, note that all three Audience members (users) slowed down the PR (the TSM rate or playback rate) at segment 1000 (marked A in FIG. 3) and then sped up the PR (the TSM rate or playback rate) at approximately the same segment 2200 (marked B in FIG. 3) in the MW (the audio or audio-visual work). From this it can be inferred that the Audience members (users) had a greater affinity for (were more interested in) the material being presented in the interval between segments 1000 and 2200, or that the complexity of the material changed in such a manner that the PR (TSM rate or playback rate) for the prior segments was too rapid for the Audience aptitude (i.e., for comfortable and complete comprehension) of the subject matter in that interval. It should be well known to those of ordinary skill in the art how to provide a graphical display of Speed Contours which are stored in accordance with embodiment 1000 described above and how to store such Speed Contours for several Audience members (users) and/or for several sessions for the same Audience member (user) with associated identification information to enable retrieval of the information related to particular ones of the stored Speed Contours in accordance with methods that are well known to those of ordinary skill in the art.

Figure 4:
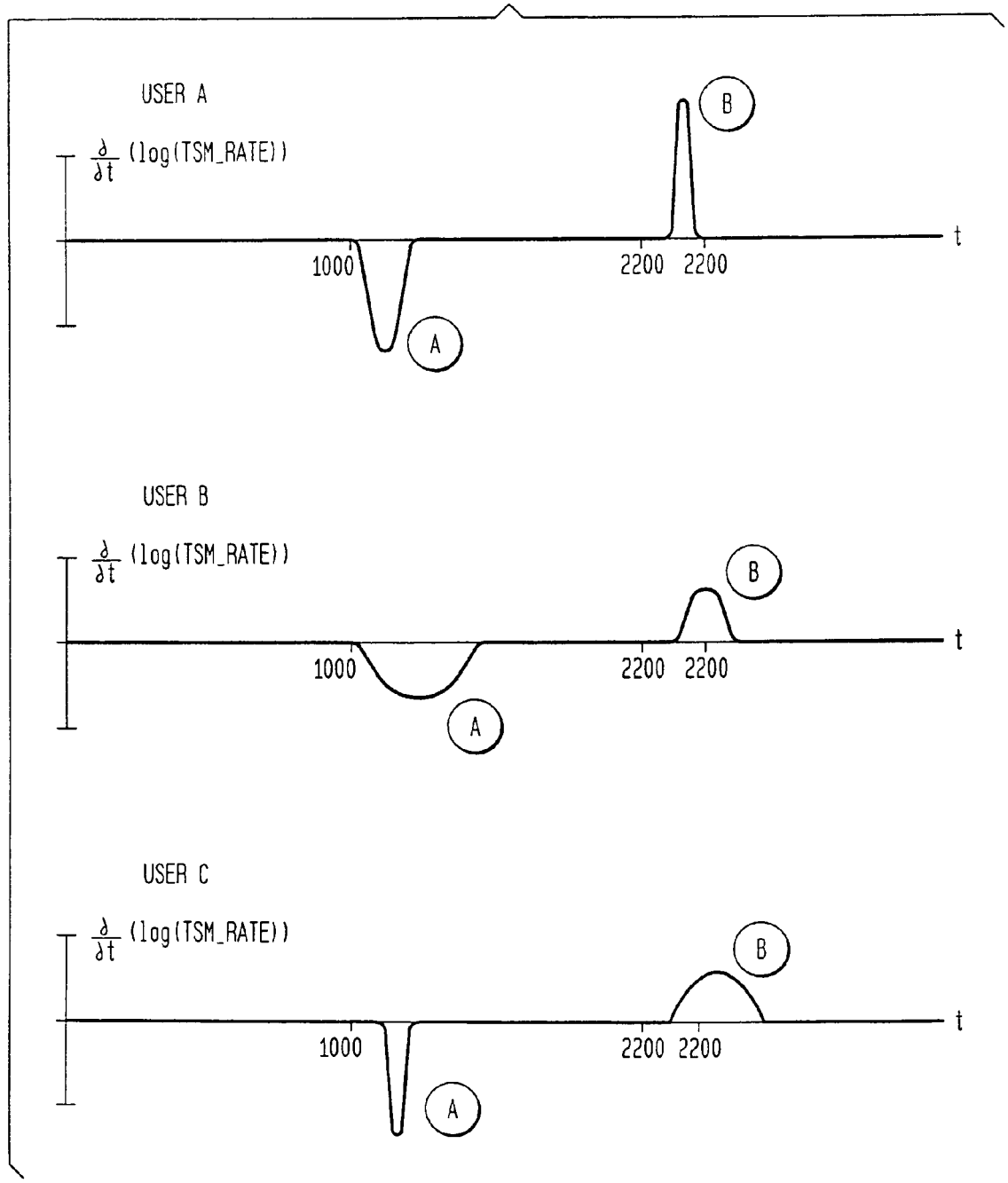
FIG. 4 shows, a graphical representation of Speed Contours produced using the first mathematical derivative of the TSM rate, or the playback rate, specified by the users for several different listening sessions of the same audio or audio-visual work.

An alternative embodiment of the present invention has identical components to those described above (and shown in FIG. 1) in conjunction with embodiment 1000 except for Speed Contour Generator 500. In this alternative embodiment of the present invention, Speed Contour Generator 500 outputs a Speed Contour which comprises the derivative of PR (TSM rate or playback rate) for each segment of the input MW (the input audio or audio-visual work). FIG. 4 shows, a graphical representation of Speed Contours produced using the first mathematical derivative of the PR (the TSM rate or the playback rate) specified by the Audience members (users) for several different presentations (listening sessions) of the same MW (audio or audio-visual work). In the two dimensional graphs shown in FIG. 4, the first derivative of the PR (TSM rate) is displayed on the vertical axis and time is displayed on the horizontal axis. The same data displayed in FIG. 3 was used to create the Speed Contour comprised of derivative of PR for each Audience member (user). As can be seen in FIG. 4, the Speed Contour comprised of derivative of PR indicates changes in PRs (TSM rates or playback rates) that are requested by Audience members (users) in a pronounced manner that is relatively easy to observe. Furthermore, one can readily appreciate that the Speed Contour that comprises derivatives of PR comprises less data than a Speed Contour that comprises the PRs since there are relatively few PR (TSM rate or playback rate) changes, and only segments associated with non-zero derivative PRs (TSM rates) need be stored. It should be clear to those of ordinary skill in the art how to modify the algorithm illustrated in FIG. 2 to determine a Speed Contour comprised of derivative PRs using methods which are well known to those of ordinary skill in the art or to derive a Speed Contour comprised of derivatives of PR from a Speed Contour comprised of PRs.

The term Average Speed Contour refers to a Speed Contour obtained for a particular MW (audio or audio-visual work) by averaging several Speed Contours generated by use of an embodiment of the present invention, for example, embodiment 1000 described in detail above, when a particular Audience member (user) listens to the MW (audio or audio-visual) passage several times. The value of the PR (TSM rate or playback rate) for a particular segment of the Average Speed Contour is obtained by computing the mathematical average of the PR (TSM rate or playback rate) in each of the several Speed Contours for the corresponding segment of the MW (audio or audio-visual work). It should be well known to those of ordinary skill in the art how to store Speed Contours which are generated in accordance with embodiment 1000 described above for several Audience members (users) and/or for several sessions for the same Audience member (user) with associated identification information to provide retrieval of the information related to particular ones of the stored Speed Contours in accordance with methods that are well known to those of ordinary skill in the art. Furthermore, it should be well known to those of ordinary skill in the art how to compute an Average Speed Contour from any number of stored Speed Contours. One use of the Average Speed Contour is by those producing commercial or informational MWs (audio or audio-visual works) in which information, for example a telephone number, will be transcribed by Audience members (listeners). To determine an optimal information delivery rate which best enables the Audience member (listener) to successfully transcribe the desired information, one would generate an Average Contour using Speed Contours generated by a representative Audience member (user) in the projected Audience. Another use of the Average Speed Contour is by those desiring to provide information at a maximum delivery rate for an MW (an audio or audio-visual work), which maximum delivery rate will enable Audience members (listeners) to comprehend the information being delivered. For example, those producing commercials would use a rapid PR (speaking rate, or information delivery rate) to convey as much information as possible in a given time-slot. An Audience member (a listener) using the embodiment of the present invention could reduce the PR (TSM rate) for segments of the MW (the audio or audio-visual work) in which the PR (the speaking rate) was too rapid for the Audience member's aptitude (the listener's comprehension or educational level).

The term Democratic Speed Contour refers to a Speed Contour obtained for a particular MW (audio or audio-visual work) by averaging several Speed Contours or several Average Speed Contours obtained from different Audience members (users) while obtaining a presentation (listening) to that particular MW (audio or audio-visual work). The value of the PR (TSM rate or playback rate) for a particular segment of the Democratic Speed Contour is obtained by computing the mathematical average of the PR (TSM rate or playback rate) in each of the several Speed Contours (each, for example, from a different Audience member (listener)) for the corresponding segment of the MW (audio or audio-visual work). It should be well known to those of ordinary skill in the art how to store Speed Contours which are generated in accordance with embodiment 1000 described above for several Audience members (users) and/or for several sessions for the same Audience member (user) with associated identification information to provide retrieval of the information related to particular ones of the stored Speed Contours in accordance with methods that are well known to those of ordinary skill in the art. One use of the Democratic Speed Contour is by persons delivering information. To determine an optimal information delivery rate which best enables a particular demographic group of Audience members (listeners) to utilize the information, one would generate a Democratic Contour using Speed Contours generated by members of the particular demographic group of Audience members (listeners). For example, the embodiment may be used to provide a Democratic Contour that takes advantage of the fact that Audience members (listeners) from one part of a country may require a slower PR (information delivery rate) when obtaining a presentation from (listening to) a speaker with an accent from another part of the country. In another use of a Democratic Contour, information about a particular demographic Audience (listener group) is obtained, for example, by questionnaire. Then, target Audiences are selected on the basis of responses to the questionnaire. For example, a group may be subdivided into a sub-group of Audience members (listeners) who use a personal computer at work and a sub-group of Audience members (listeners) who do not. Then an optimal PR (information delivery rate) regarding a computer software product is obtained from a Democratic Speed Contour generated by each Audience sub-group. In this way, the optimal PR (information delivery rate) of a commercial or an informational MW (audio or audio-visual work) may be obtained for a particular demographic Audiences (groups of listeners).

As was described above, a Speed Contour comprises a subset of PRGI. As a result, and in accordance with the present invention, PRGI may be comprised of averages of PRGIs obtained to represent averaged input from the same or different Audience members. As such, one would have an Average PRGI and a Democratic PRGI. Similarly one would have: (a) an Average and Democratic Conceptual Presentation Rate Association data structure ("CPRA" data structure); (b) an Average and Democratic Aptitude Presentation Rate Association data structure ("AptPRA" data structure); and (c) an Average and Democratic Affinity Presentation Rate Association data structure ("AffPRA" data structure).

Figure 5:
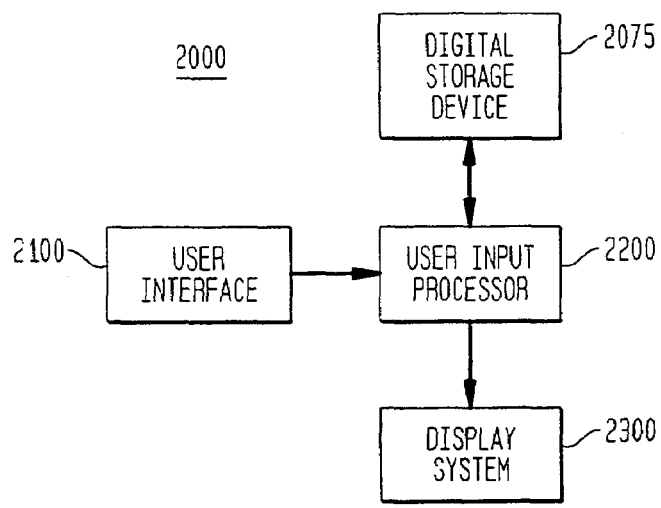
FIG. 5 shows a block diagram of an embodiment of a second aspect of the present invention which generates a Speed Contour for an audio or audio-visual work wherein user input and a word map of an audio or audio-visual work are used to provide a Speed Contour.

FIG. 5 shows a block diagram of embodiment 2000 of a second aspect of the present invention which generates a Speed Contour for an MW (an audio or audio-visual work) wherein Audience member (user) input and a word map of an MW (an audio or audio-visual work) are used to provide a Speed Contour. In such embodiments, the Speed Contour can be created even without having the Audience member (user) listen to the MW (the audio or the audio portion of the audio-visual work). In accordance with the second aspect of the present invention, rather than sampling PR (TSM rates or playback rates) as was described above in conjunction with the first aspect of the present invention, the Speed Contour is obtained using an editor which displays and manipulates the Speed Contour in response to Audience member (user) input.

As shown in FIG. 5, embodiment 2000 comprises User Interface 2100 ("UI 2100") which receives input from an Audience member (a user). There exist many apparatus which are well known to those of ordinary skill in the art for receiving input from an Audience member (a user), see the relevant description above regarding embodiment 1000.

Figure 6:
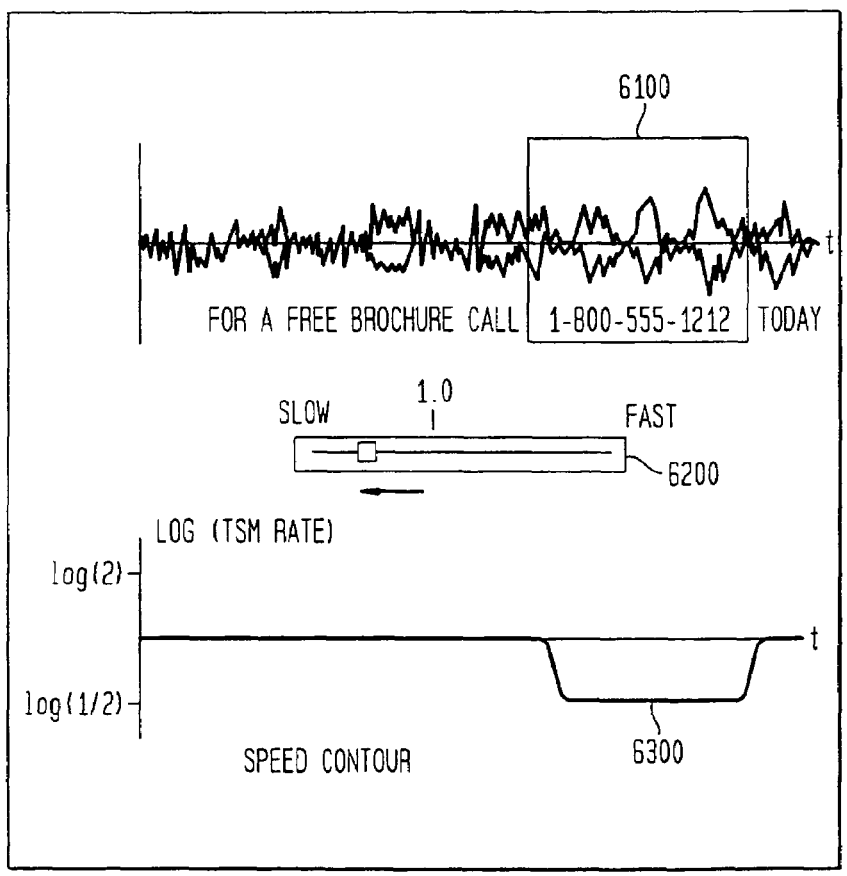
FIG. 6 shows, in graphical form, a two dimensional graph that displays a speech waveform and corresponding text for an audio or audio-visual work.

As is further shown in FIG. 5, embodiment 2000 comprises User Input Processor 2200 ("UIP 2200") which receives Audience member (user) input from UI 2100 and data or signals from an input MW (an input audio or audio-visual work) that is stored on Digital Storage Device 2075. In response, UIP 2200 generates and outputs data to produce a two dimensional graph, for example, with: (a) time and possibly text or phonetic words, displayed on the horizontal axis and (b) PRs (TSM rates) displayed on the vertical axis. Graphical Display 2300 receives as input from UIP 2200, data which provide a graphical screen display image. In response, Graphical Display 2300 displays a two dimensional representation of the input MW (the input audio or audio-visual work) with text or phonetic labels. For example, it is well known to those of ordinary skill in the art that text and/or phonetic information may be displayed as an overlay on top of a graphical representation of a speech waveform on a computer screen. Then, in accordance with embodiment 2000, the Audience member (user) can highlight regions of the text displayed on Graphical Display 2300 using, for example a cursor under the control of UI 2100 to identify specific portions of the input MW (the input audio or audio-visual work) that are associated with the highlighted text. Next, using UI 2100 in a manner that is well known to those of ordinary skill in the art, the Audience member (user) selects and/or specifies a PR (TSM rate or playback rate) for the specific portion of the input MW (the input audio or audio-visual work) associated with the highlighted text. In another embodiment of this second aspect of the present invention, UIP 2200 comprises a text editor that displays a transcript of an MW (an audio work or the audio portion of an audio-visual work). In response, using UI 2100 in a manner that is well known to those of ordinary skill in the art, the Audience member (user) selects regions of text and selects and/or specifies a PR (TSM rate or playback rate) for the selected regions of text. Next, samples or segments of the input MW (the input audio or audio-visual work) that correspond to boundaries of the selected regions of text are determined and used to construct the Speed Contour. FIG. 6 shows, in graphical form, a two dimensional graph that displays a speech waveform and corresponding text for an MW (an audio or audio-visual work). As shown in FIG. 6, the Audience member (user) has highlighted region 6100 of the input MW (the input audio or audio-visual work) that which contains a telephone number. The user then used slider bar 6200 to indicate the desired TSM rate for the selected region of the input audio or audio-visual work. Lastly, FIG. 6 shows Speed Contour 6300 that is generated on the basis of TSM rates requested by the user. FIG. 7 shows a display of a transcript of an audio or audio visual work. As shown in FIG. 7, the user has highlighted region 7100 of the transcript of the input audio or audio-visual work that contains a telephone number.

UIP 2200 constructs a Speed Contour using the same method (or a method similar to the method) described above for Speed Contour 500 (in conjunction with FIG. 2). Lastly, UIP 2200 stores the Speed Contour, for example, on Digital Storage Device 2075 or on some other storage medium or transmits the Speed Contour to another system using an MWCT (for example, via a transmission device such as a modem).

Although FIG. 5 shows embodiment 1000 to be comprised of separate modules, in a preferred embodiment, UI 2100 and UIP 2200 are embodied as software programs or modules which run on a general purpose computer such as, for example, a personal computer. Furthermore, Digital Storage Device 2075 is embodied as a disk drive or Random Access Memory. It should be well known to one of ordinary skill in the art, in light of the detailed description above, how to implement these programs or modules in software. Further, the MW (the audio or audio visual work) may be stored in analog form on Digital Storage Device 2075 and translated to digital form in accordance with many methods that are well known to those of ordinary skill in the art.

In accordance with the first and second aspects of the present invention described above, a Speed Contour is temporal in nature, i.e., a PR (a TSM rate or playback rate) is associated with each time interval of an MW (an audio or audio-visual work). This characterization of the Speed Contour requires some sort of preview of the MW (the audio or audio-visual work), either by the Audience member (listener) or an editor to determine the Speed Contour for the work. To eliminate this, in an embodiment of a third aspect of the present invention, a Conceptual Presentation Rate Association data structure ("CPRA" data structure) is generated for use in creating an altered MW (an LIF work).

In accordance with the present invention, embodiments of a third aspect of the present invention generate a CPRA data structure, which CPRA data structure is optionally stored for later use. The embodiments that generate a CPRA data structure represent a specific embodiment of the method and apparatus described above in conjunction with FIG. 23. After describing the embodiments that generate the CPRA data structure, a description of the correspondence to the method and apparatus shown in FIG. 23 will be set forth.

As set forth in the Definitions above, in general, a CPRA data structure comprises Media Work Content Information ("MWCI") and associated Media Work Presentation Rate Information ("MWPRI") and, optionally, one or more of the following: (a) Presentation Rate Rule Information ("PRRI") and (b) Time-Stamp Information ("TSI"). In a simple embodiment, a CPRA data structure is, for example, a series of pairings of lists of Media Work Concept Information ("MWConcI") and lists of PR (Speed Value identifiers), and, the simple form of the CPRA data structure is stored as a list of these pairs of sub-lists. In a simpler embodiment thereof, the MWConcI comprises concept information such as Concept identifiers. For example, a Concept identifier comprises a keyword, a string of words, or a phrase that expresses a concept such as "stock market," "wall street," and "financial." These Concept identifiers are paired with PRs (Speed Value identifiers that represent a TSM rate or playback rate) desired by an Audience member (a user) while perceiving a presentation of (listening to) an MW (an audio or audio-visual work) which contains the Concept identifiers.

Embodiments of the third aspect of the present invention may utilize detection apparatus that detects conceptual information in a particular portion of an MW (an audio or audio-visual work), and retrieval apparatus that uses the conceptual information to retrieve PRs (TSM rate or playback rate information) from the CPRA data structure, which retrieved information is used to determine the PR (TSM rate or playback rate) to be utilized for the particular portion. In accordance with one embodiment of the present invention, the detection apparatus comprises speech recognition equipment which is well known to those of ordinary skill in the art. In accordance with another embodiment of the present invention, the detection apparatus comprises apparatus which detects conceptual information contained within Media Work Content Data ("MWCD") (for example, closed captioning information) which accompanies many TV broadcasts or is available on, for example, movie tapes. Such detection apparatus for detecting MWCD (closed captioning information) is well known to those of ordinary skill in the art.

Figure 8:
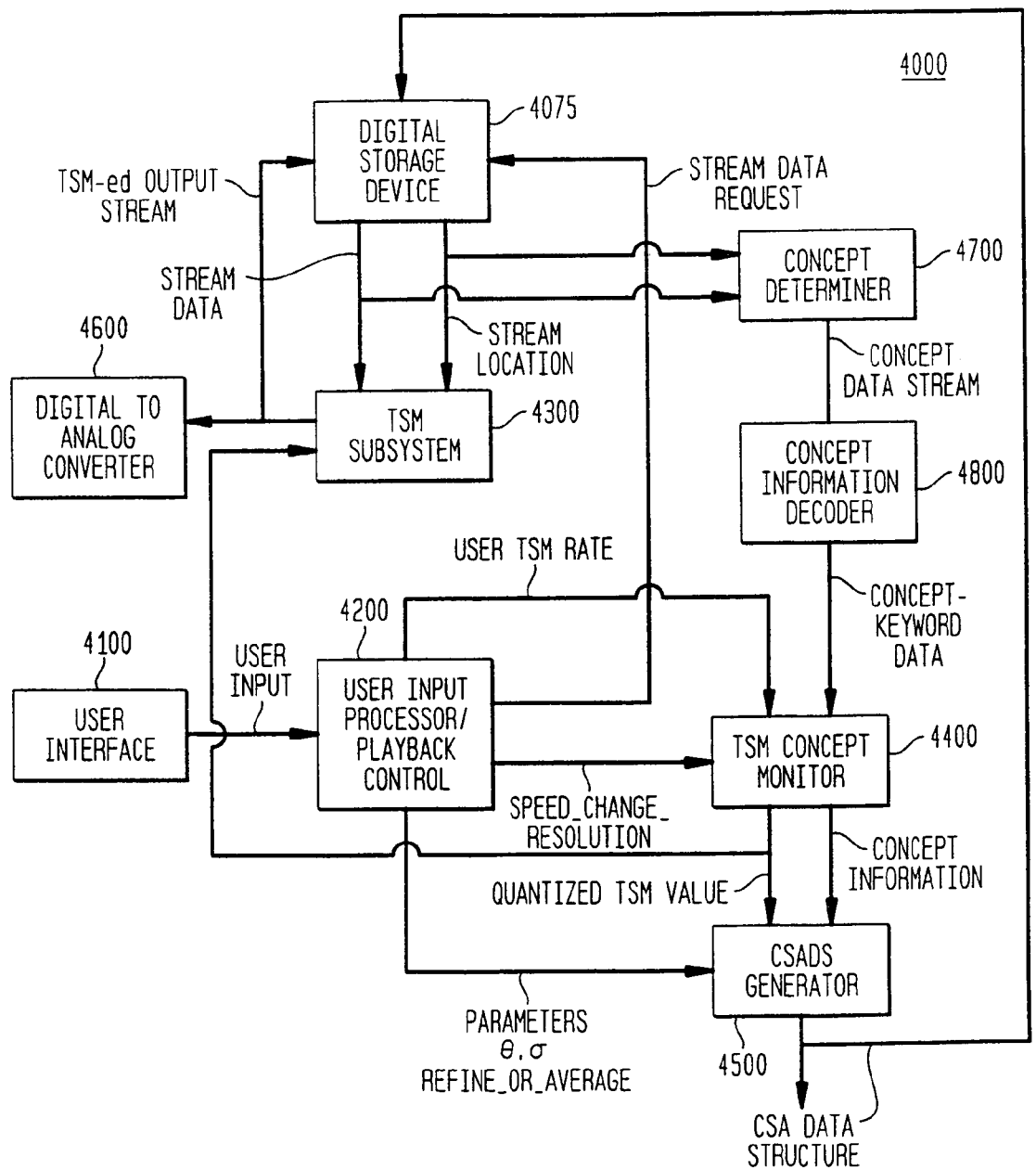
FIG. 8 shows a block diagram of an embodiment of a third aspect of the present invention which generates a Conceptual Presentation Rate Association data structure ("CPRA" data structure") for an audio or audio-visual work.

FIG. 8 shows a block diagram of embodiment 4000 of a third aspect of the present invention which generates a CPRA data structure for an MW (an audio or audio-visual work). As shown in FIG. 8, embodiment 4000 comprises User Interface 4100 ("UI 4100") which receives input from an Audience member (a user). An embodiment of UI 4100 is the same as UI 100 described above with respect to FIG. 1. UI 4100 provides output signals which indicate input from the Audience member (the user). The Audience (user) input is interpreted by User Input Processor/Playback Control 4200 ("UIP/PC 4200") to indicate the following options selected by the Audience member (user): (a) select a file to play, which file corresponds to a particular MW (audio or audio-visual work) (the selected file can be input to embodiment 4000 directly or it can be a file that has been stored by embodiment 4000); (b) initiate presentation (playback) of the selected file; (c) halt presentation (playback) of the selected file; (d) pause presentation (playback) of the selected file; (e) modify the PR (TSM rate or playback rate) of a portion of the MW (the audio or audio-visual work) being presented (this may also be referred to as played); or (f) specify parameters Refine_or_Average, Theta, and Sigma that are used by the apparatus in a manner that will be explained in detail below in generating a CPRA data structure.

UIP/PC 4200 receives input from UI 4100 and (a) converts the Audience member (the user) input to numeric values; (b) interprets Audience member (the user) input to set the values of parameters and to control the creation, use, modification or overriding of the CPRA data structure; and (c) directs accessing and loading of a data stream from an MW (an audio or audio-visual work) by sending stream data requests to Digital Storage Device 4075 (to perform presentation (playback) control). In the case of Digital Storage Device 4075, UIP/PC 4200 may request access to a file of digital data representing an MW (an audio or audio-visual work) stored in a file-system on the device. To direct accessing and loading of a data stream from an MW (an audio or audio-visual work), UIP/PC 4200 interprets Audience member (the user) input and the location of digital samples representing the MW (the audio or audio-visual work) stored on Digital Storage Device 4075 to compute presentation (playback) positions for the selected file at a particular sample.

Digital Storage Device 4075 receives the following as input: (a) stream data requests from UIP/PC 4200; and optionally (b) Time-Scale Modified output from TSM Subsystem 4300; and optionally (c) a stream of data representing the CPRA data structure from CPRA Data Structure Generator 4500 ("CPRADS Generator 4500"). Digital Storage Device 4075 produces the following as output: (a) a stream of data representing an MW (an audio or audio-visual work); and (b) a stream of location information, for example position in a file, of the data stream being output. There are many methods well known to those of ordinary skill in the art for utilizing digital storage devices, for example a "hard disk drive", to store and retrieve general purpose data. Embodiments of the present invention include storing information on local or distributed devices and retrieving information therefrom using MWCT in the broadest sense.

The MW (the audio or audio-visual work) is typically stored in digital form on Digital Storage Device 4075. An embodiment of Digital Storage Device 4075 is the same as Digital Storage Device 75 described above with respect to FIG. 1. Digital storage device 4075 receives data requests from UIP/PC 4200 in accordance with methods which are well known to those of ordinary skill in the art to provide a stream of digital samples representing the MW (the audio and/or audio-visual work. In alternative embodiments, the MW (the audio or audio-visual work) is stored in analog form on an analog storage device. In such an alternative embodiment, a stream of analog signals is input to an apparatus, not shown, for transforming the analog samples into digital samples. There exist many commercially available apparatus which are well known to those of ordinary skill in the art for receiving an input analog signal such as a voice signal and for sampling the analog signal at a rate which is at least the Nyquist rate to provide a stream of digital signals which may be converted back into an analog signal without loss of fidelity. The digital samples are then transmitted to TSM Subsystem 4300.

TSM Subsystem 4300 receives as input: (a) a stream of samples representing portions of the MW (the audio or audio-visual work) from Digital Storage Device 4075; (b) stream location information from Digital Storage Device 4075 used to identify the position in the data stream of the samples being sent, for example, a sample count or time value; and (c) a desired PR (TSM rate or playback rate) from Time-Scale Modification Concept Monitor 4400 ("TSM Concept Monitor 4400"). Output from TSM Subsystem 4300 is applied as input to: (a) Digital to Analog Converter/Audio and/or Audio-Visual Playback Device 4600 ("DA/APD 4600") and, optionally, to (b) Digital Storage 4075 for storage of the Time-Scale Modified output, i.e. the altered MW (the LIF work), if desired. DA/APD 4600 is apparatus which is well known in the art for receiving digital samples and constructing an MW (an audio or audio-visual work). In accordance with the present invention, the output of TSM Subsystem 4300 is a stream of digital samples representing an MW (an audio or audio-visual work) whose PR (playback rate) is supplied from TSM Concept Monitor 4400 to provide feedback to the Audience member (the user) about his/her current PR (TSM rate) specification. The Audience member (the user) listens to the altered presentation (the Time-Scale Modified output) and can change the PR (TSM rate or playback rate) by providing further input using UI 4100. Further, if the Audience member (the use)r wishes to speed up or slow down a portion of the MW (the audio or audio-visual work) just presented (played) (or speed up or slow down other portions having a similar Concept identifier that have not yet been presented (played)), the Audience member (the user) can provide input using UI 4100 to rewind the MW (the audio or audio-visual work) to a desired portion and re-present (replay) it again with a modified PR (TSM rate or playback rate) (or specify the desired PR (TSM rate or playback rate) for the other portions). In this manner, the Audience member (the user) determines a desired PR (TSM rate or playback rate) for each portion of the MW (the audio or audio-visual work). Embodiments of TSM Subsystem 4300 and DA/APD 4600 are the same as TSM Subsystem 300 and DA/APD 600 described above with respect to FIG. 1. As one of ordinary skill in the prior art can readily appreciate, whenever embodiment 4000 presents (provides playback for) an MW (an audio-visual work), TSM Subsystem 4300 speeds up or slows down visual information to match the audio in the MW (the audio-visual work). To do this in a preferred embodiment, the video signal is "Frame-sub-sampled" or "Frame-replicated" in accordance with any one of the many methods known to those of ordinary skill in the prior art to maintain synchronism between the audio and visual portions of the MW (the audio-visual work). Thus, if one speeds up the audio and samples are requested at a faster rate, the frame stream is subsampled, i.e. frames are skipped.

Concept Determiner 4700 accepts, as input, different sets of data depending on certain options. In accordance with option 1, the input data comprises Media Work Content Data ("MWCD") (for example, a stream of data representing text or concepts, for example, closed-captioning data or textual annotation) that is stored with the current segment of the input MW (the input audio or audio-visual work) being supplied to TSM Subsystem 4300. For the case of option 1, Concept Determiner 4700 passes the incoming MWCD (the incoming stream of data representing text or concepts) through as output to Concept Information Decoder 4800. In accordance with option 2, the input data comprises: (a) a stream of samples representing portions of the MW (the audio or audio-visual work) from Digital Storage Device 4075 and (b) current stream location information from Digital Storage Device 4075 used to identify the position in the stream of the samples being sent, for example, a sample count or time value of the beginning of the group of samples transferred from Digital Storage Device 4075. For the case of option 2, Concept Determiner 4700 provides, as output, MWCD (for example, a stream of data representing concepts contained in the current portion) of the MW (the audio or audio-visual work) being supplied to TSM Subsystem 4300. The MWCD (the concepts and/or textual transcript of spoken passages) are determined by extracting closed-captioning information from the MW (the audio or audio-visual work), or by use of speech recognition algorithms to obtain a stream of text from the input MW (the input audio or audio-visual work). Many methods are well known to those of ordinary skill in the art for extracting closed-captioning information and many methods are well known to those of ordinary skill in the art for extracting text using speech recognition algorithms.

Concept Information Decoder 4800 accepts as input from Concept Determiner 4700 the MWCD (a stream of data which represents conceptual information). In accordance with the present invention, and without limitation, the MWCD (the conceptual information) comprises: written transcript, raw text, keywords, phrases, or other representations of conceptual information which are well known to those of ordinary skill in the art. In response, Concept Information Decoder 4800 generates as output a stream of data representing keywords and concepts for the current portion of the input MW (the input audio or audio-visual work) being sent to TSM Subsystem 4300.

Concept Information Decoder 4800 processes the input to form concept data representations of the input data stream. For example, Concept Information Decoder 4800 may simply remove articles and adjectives from input which represents a transcript to provide output comprised only of nouns and noun phrases. Alternatively, Concept Information Decoder 4800 may employ natural language processing to extract conceptual content from a stream of spoken words. Many methods of implementing Concept Information Decoder 4800 are well known to those of ordinary skill in the art. For example, there exist many systems which utilize techniques known as clustering to develop data sets of multidimensional vectors in which each element of a vector represents a particular property or value associated with attributes of the overall data set. Clustering allows for the classification and grouping of concepts based on the N-dimensional Euclidean distance between vectors. It is often the case that objects in a clustered data set may not belong explicitly to any one cluster in which case the object could be associated with more than one cluster. In such situations the Euclidean distance may be used to represent the probability that an object is a member of each possible cluster. See for example, a Ph.D. Dissertation submitted to Mississippi State University, Mississippi by Rajeev Agarwal 1995 entitled "Semantic Feature Extraction from Technical Texts with Limited Human Intervention."

TSM Concept Monitor 4400 receives the following as input to guide embodiment 4000 in generating a CSA data structure: (a) Audience (user) input that has been translated by UIP/PC 4200 to a desired PR (TSM rate or playback rate), which desired PR (TSM rate or playback rate) may indicate a change of PR (TSM rate or playback rate) for a portion of the input MW (the input audio or audio-visual work) being perceived; (b) data from Concept Information Decoder 4800 that represents concepts for the current portion of the input MW (the input audio or audio-visual work) being sent to TSM Subsystem 4300; and (c) the Speed_Change_Resolution parameter from UIP/PC 4200.

TSM Concept Monitor 4400 processes the conceptual information and the PR (TSM rate or playback rate) requested by the Audience member (the user) and derives a single PR (TSM rate) for the concept presented at its input. For example, the concept which is output from Concept Information Decoder 4800 may remain unchanged for several seconds due to the fact that an input concept such as "financial markets" may represent several words or phrases in the MW (the audio or audio-visual work) being presented (played). Because of this, the Audience member (the user) may request a number of PRs (TSM rates) over the interval of the input MW (the input audio or audio-visual work) associated with a single concept. In accordance with the present invention, TSM Concept Monitor 4400 creates a single PR (TSM rate) for a concept by, for example, performing a mathematical average of the PRs (TSM rates) over the interval of the input MW (the input audio or audio-visual work) associated with that single concept. For example, a weighted average which emphasizes the most recent PRs (TSM values) obtained during the interval in which a particular concept was present at the input to TSM Concept Monitor 4400 could be used. It should be understood that these are merely examples of many different methods which could be used.

TSM Concept Monitor 4400 uses the parameter Speed_Change_Resolution to determine appropriate PRs (TSM rates) to pass to TSM Subsystem 4300 and to CPRADS Generator 4500. The TSM rate determined for a particular concept is converted to one of the quantized levels in a manner which is well known to those of ordinary skill in the art. This means that the output PR (TSM rate or playback rate) can change only if the input desired PR (desired TSM rate) changes by an amount that exceeds the difference between quantized levels, i.e., Speed_Change_Resolution and the number of possible PRs (TSM rates) is limited for efficient representation in data structures. The Speed_Change_Resolution parameter can be set as a predetermined parameter for embodiment 4000 in accordance with methods which are well known to those of ordinary skill in the art or they can be entered and/or varied by receiving Audience member (user) input through UI 4100 in accordance with methods which are well known to those of ordinary skill in the art. However, the manner in which these parameters are set and/or varied are not shown for ease of understanding the present invention.

TSM Concept Monitor 4400 produces as output: (a) a single PR (TSM rate) value and (b) concept information. The PR (TSM rate) is applied as input to TSM Subsystem 4300 and Conceptual Presentation Rate Association Data Structure Generator 4500 ("CPRADS Generator 4500") and the concept information is applied as input to CPRADS Generator 4500. It should be clear to those of ordinary skill in the art that the following will describe an embodiment that utilizes an average to determine a single PR (TSM rate) for a concept only for ease of understanding the present invention. However, it should also be clear that embodiments of the present invention are not limited to any one algorithm for determining a PR (a TSM rate) to associate with a concept and that embodiments of the present invention are not limited to associating a single PR (a single TSM rate) with a concept. For example, the PR (the TSM rate) associated with a concept can change, for example, to speed up during a presentation (replay) to reflect the fact that the Audience member (the listener) becomes more familiar with the concept and does not need as much time to comprehend the information as the concept is repeated during presentation (replay) of the work.

CPRADS Generator 4500 accepts the following as input from TSM Concept Monitor 4400: (a) concept information; (b) the PR (TSM rate or playback rate) for that concept; and (c) parameters (Refine_or_Average, Theta, and Sigma) values from UIP/PC 4200 used to control the process which creates the CPRA data structure. Many methods are well known to those of ordinary skill in the art for implementing this data structure.

For example, the CPRA data structure may be implemented as a series of related keywords phrases, or concepts followed by the appropriate PR (TSM value).

(("stock", "bonds", "stock market", "wall street", "currency") 0.8)

(("Hollywood", "actor", "movie") 1.5)

where the PR (TSM rate) for the first group of concepts is 0.8 and the PR (TSM rate) for the second group of concepts is 1.5. Note that this data structure represents the desire of the Audience member (the listener) to hear information about stock market and other financial concepts at a reduced PR (TSM rate or playback rate), i.e., 0.8, and specifies that information about Hollywood movies and actors should be presented at a more rapid PR (TSM rate or playback rate), 1.5 times the normal PR (TSM rate or playback rate).

Figure 9:
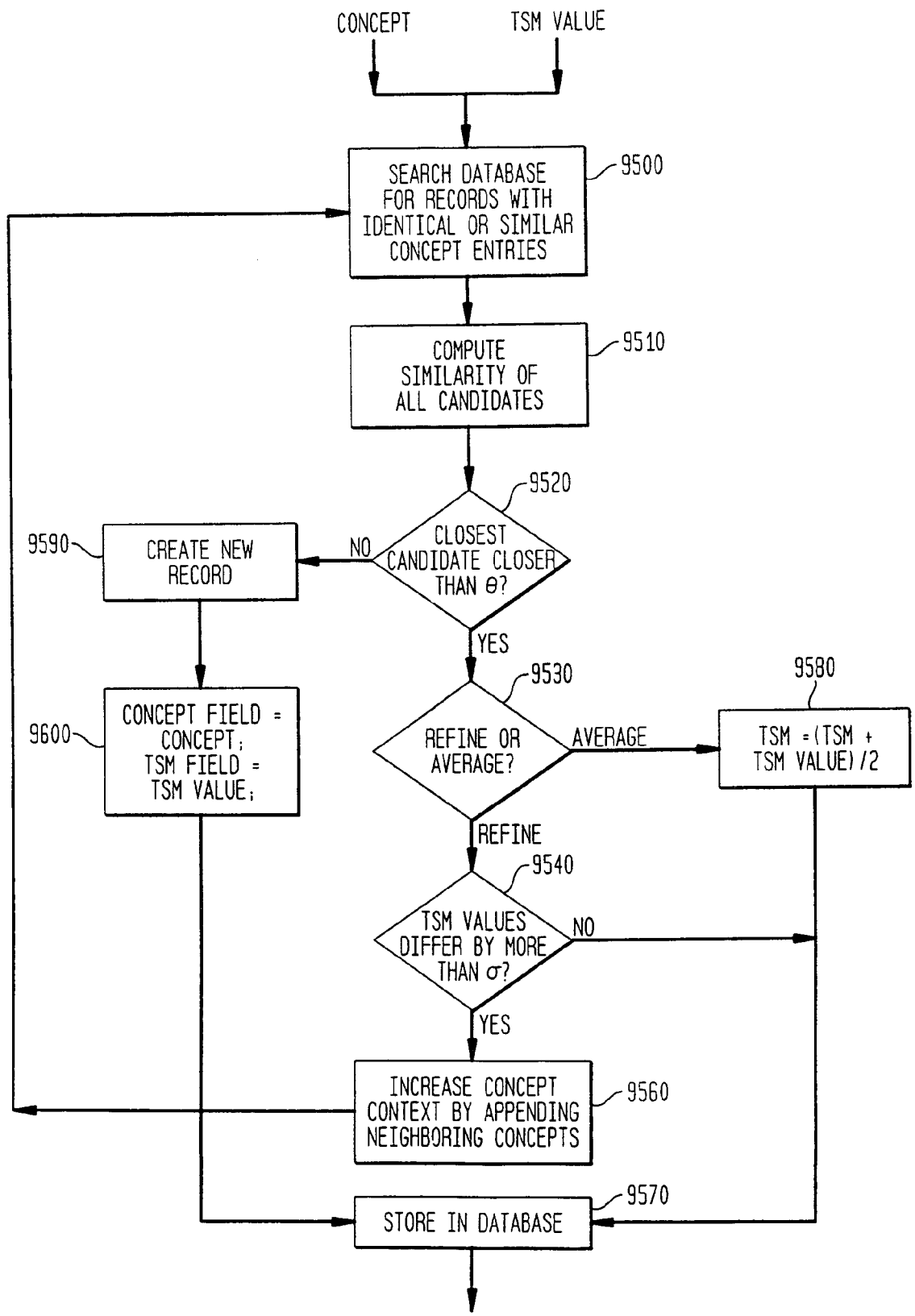
FIG. 9 shows a flowchart of an algorithm used in one embodiment of a CPRADS Generator shown in FIG. 8 to generate a CPRA data structure.

CPRADS Generator 4500 uses a database or scratch-pad memory to maintain a list of records in which each record stores information pertaining to concepts and PRs (TSM Rates) associated with those concepts. FIG. 9 shows a flowchart of an algorithm used in one embodiment of CPRADS Generator 4500 to generate the CPRA data structure.

As shown in FIG. 9, concept information and PR (TSM rate) are applied as input to box 9500. At box 9500, a search is performed to locate any records in a database that contain identical or similar concept information; then, control is transferred to box 9510. At box 9510, a numeric value is determined that reflects the similarity of the list of potential matches for the concept, if any, that were found at box 9500. A conceptual distance between two words or data values representing concepts can calculated using any number of methods known to those skilled in the arts. For example, in the simplest form a list of synonyms or other reference data may be employed for computing the distance. In another method a Euclidean distance may be used to gauge the similarity of multi-dimensional vector objects in a data set which employs clustering algorithms to classify concepts. In still another method, a "head-driven phrase structured grammar" is commonly used to parse sentences and word phrases for meaning. Control is then transferred to box 9520.

At box 9520, a decision is made to determine if the record with the closest match is within an amount given by a parameter Theta. If the closest match is within the amount given by Theta, control is transferred to box 9530, otherwise control is transferred to box 9590.

At box 9530, a decision is made to determine if a parameter Refine_or_Average is equal to "Refine" or "Average." If Refine_or_Average equals "Refine," control is transferred to box 9540. If Refine_or_Average equals "Average," control is transferred to box 9580.

At box 9580, the stored PR (TSM rate) value for a particular concept is updated by computing a mathematical average of the existing PR (TSM rate) value in the CPRA data structure and the currently stored PR (TSM rate). Control is then transferred to box 9570.

At box 9590, a new record in the database is created; then, control is transferred to box 9600. At box 9600, values in the CPRA data structure are installed as follows: (a) the current concept is stored in the concept field and (b) the current PR (TSM rate) is stored in the TSM field. Control is then transferred to box 9570.

At box 9540, a decision is made which compares the difference between the PR (TSM rate) in the record with the closest match and the current PR (TSM rate). If the difference is greater than a parameter Sigma, control is transferred to box 9560, otherwise control is transferred to box 9570. At box 9560, the current concept or keyword phrase is narrowed by appending previous concepts to the current concept in an attempt to further particularize and narrow the concept so that it is distinguished from existing concepts in the CPRA data structure. For example, in one embodiment of the present invention, the concept or keyword "bond" may be included in the CPRA data structure record corresponding to financial information, i.e., the concept field corresponding to financial information may comprise ("money", "stock", "bond"). If the input audio or audio-visual work contained the phrase "actor James Bond" and the listener consistently speeds up playback during this phrase such that the PR (TSM rate) differs by more than Sigma from the value in the TSM field corresponding to the financial information concept field, then the concept or keyword "bond" would be prefixed with the existing concept or keyword, in this case "James." Then the database would be searched again using this new concept, "James Bond", as indicated by the transfer of control to box 9500. In accordance with this embodiment of the present invention, different entries are created for the keyword "bond." One entry would correspond to its use in the context of financial reports and another entry would correspond to its use when paired with the name "James." At box 9570, the newly created or updated record is stored in the database.

In a further embodiment of the present invention the CPRA data structure may be generated without using embodiment 4000 described above. Instead, the CPRA data structure may generated by entering the data into a structure using, for example, a text editor or by filling out a questionnaire about concepts that are of interest. This CPRA data structure can be used create an altered MW (an LIF work) from an MW (an audio or audio-visual work) without having the Audience member (the user) obtain a presentation of (listen to) it previously. In a similar manner, the CPRA data structure can be constructed using keywords and phrases of the type that are typically presented to "on-line" search engines and used to control data retrieval.

A CPRA data structure can also be used to control the PR (playback rate) of MWs (audio or audio-visual works) retrieved by a search engine to create altered MWs (LIF works) from previously unpresented MWs (unheard audio or audio-visual works) that are retrieved by the search engine. In one such embodiment, the CPRA data structure is obtained by use of Audience member specified (user specified) search criteria that were input to the search engine. For example, Audience member (user) input to a search engine requesting "all boats excluding yachts" would create altered MWs (LIF works) that play information about boats at a normal rate but exclude or speed through items about yachts. In light the detailed description, it should be clear to those of ordinary skill in the art how to create a CPRA data structure using information transferred from, for example, a search engine.

In a still further embodiment of the present invention, the CPRA data structure may contain predetermined PR (TSM rate) entries, for example, of "infinity" for particular concepts or keywords. In this embodiment of the present invention, a PR (TSM rate) of "infinity" (or some other indicium that will be similarly translated) directs the presentation (playback) system to skip sections of an MW (an audio or audio-visual work) whose concept has a corresponding PR (TSM rate) of infinity. In accordance with this embodiment, Audience members (users) can specify "no interest" in particular concepts or keywords when obtaining presentations of (listening to) or searching MWs (audio or audio-visual works). For example an Audience member (a user) may specify the following CPRA data structure for use in listening to a nightly news broadcast:

(("weather", "partly cloudy", "weather forecast", "temperatures", "dew point")

("infinity")

(("stock", "bonds", "stock market", "wall street", "currency") 0.8)

(("Hollywood", "actor", "movie") 1.5)

This CPRA data structure directs the presentation (playback) to: (a) skip over weather forecasts and the reporting of temperatures during the broadcast; (b) present (playback) financial information at 0.8 of the normal presentation (playback) speed; and (c) speed through information regarding Hollywood movies, and actors by increasing the PR (TSM) rate to 1.5 times the normal presentation (playback) rate.

Note that embodiments of the present invention are not limited to static CPRA data structures, in that, as will be described below, an Audience member (a user) may supply input during presentation (playback) to refine the PRs (TSM rates). For example if the CPRA data structure contained entries as follows:

(("stock", "bond", "stock market", "wall street", "currency") 0.8)

(("Hollywood", "actor", "movie") 1.5)

and the Audience member (the user) consistently intervened to speed up the PR (the playback rate) whenever the phrase "actor, James Bond" occurred in the input, as was explained above, embodiment 4000 of the present invention may make changes or refinements to the CPRA data structure by adding a new entry so that the modified data structure would be:

(("stock", "bond", "stock market", "wall street", "currency") 0.8)

(("Hollywood", "actor", "movie") 1.5)

(("actor James Bond") 2.0)

In this manner, the CPRA data structure can be continually refined to reflect the Audience member's (the user's) interests while listening to new material and new concepts using an existing CPRA data structure.

As one can readily appreciate, the use of a CPRA data structure is not limited to PRs (TSM rates), and in fact, as was described above, the first derivative of the PR (TSM rate) may also be used to effect the same result. For example, if an Audience member (a user) consistently slows down when hearing the words "free sample" then a CPRA data structure which stores the PR (TSM rate) changes rather than the PRs (TSM rates) themselves would be equally useful for controlling the PR (playback rate) during previously unperceived (unheard) material.

Although FIG. 8 shows embodiment 4000 to be comprised of separate modules, in a preferred embodiment, UI 4100, UIP/PC 4200, TSM Subsystem 4300, TSM Concept Monitor 4400, Concept Determiner 4700, Concept Information Decoder 4800, and CPRADS Generator 4500 are embodied as software programs or modules which run on a general purpose computer such as, for example, a personal computer. Furthermore, Digital Storage Device 4075 is embodied as a disk drive or Random Access Memory and Digital to Analog Converter 4600 is embodied as a typical accessory to a general purpose computer such as a soundcard on a personal computer. It should be well known to one of ordinary skill in the art, in light of the detailed description above, how to implement these programs or modules in software.

Embodiment 4000 shown in FIG. 8 may be modified to convert a previously generated Speed Contour for a particular MW (audio or audio-visual work) to a CPRA data structure for that work. In this modification, PRs (TSM rates) are obtained from the Speed Contour (to replace Audience member PRs (User TSM Rate values) output from UIP/PC 4200) and provided as input to TSM Concept Monitor 4400. In light of the detailed discussion herein, it should be clear to those of ordinary skill in the art how to input the Speed Contour and obtain the PRs (TSM rates). Similarly, embodiment 1000 shown in FIG. 1 may be modified to convert a previously generated CPRA data structure for a particular MW (audio or audio-visual work) to a Speed Contour for that work. In this modification, PRs (TSM rates) are obtained from the CPRA data structure (to replace Audience member PRs (User TSM Rate values) output from UIP/PC 200) and provided as input to TSM Monitor 400. The PRs (TSM rates) are obtained from CPRA data structure in accordance with embodiment 6000 (to be described in detail below), i.e., the PRs (the TSM rates) are output from TSM Concept Look-Up 6500 of embodiment 6000.

The following describes how embodiment 4000 shown in FIG. 8 corresponds to embodiment 11000 shown in FIG. 23. TSM Subsystem 4300 and Digital to Analog Converter 4600 correspond to Presentation Engine 10400; Concept Determiner 4700, Concept Information Decoder 4800, and TSM Concept Monitor 4400 correspond to Analysis Engine 10200 and Rate Arbiter 10300; and CPRADS Generator 4500 corresponds to PR/Content Correlator 11500.

For ease of understanding, the embodiments described herein refer to PRs (TSM rates). However, the present invention is not so limited. It should be understood that embodiments of the present invention can use anything from which a PR (TSM rate) can be determined for use in fabricating or carrying out embodiments of the present invention, referred to herein as affinity information. For example, an indication of user interest or user information retrieval level could be used in place of TSM rate. Then, in order to provide a replay, a conversion is made between the user interest or user information retrieval level and the TSM rate. In such an embodiment, a conversion function would be used to map the user interest or user information retrieval levels to TSM rates. In some such embodiments, for example, the conversion function can be modified without changing the Speed Contour or CSA data structure.

For ease of understanding, the embodiments herein refer to a Speed Contour which makes a correspondence between PR (TSM rate) and associated temporal positions and a CPRA data structure which makes a correspondence between PR (TSM rate) and associated concepts. However, the present invention is not so limited. It should be understood that embodiments of the present invention refer to a Speed Contour or a CPRA data structure which makes a correspondence between anything from which a PR (TSM rate) can be determined and anything from which one or more portions of a work with which the PR (TSM rate) is associated can be identified.

Further, it should be understood that embodiments of the present invention refer to a Speed Contour or a CPRA data structure wherein the identifier of the PR (TSM rate) and the identifier of the portion can have a functional dependence for determining the PR (TSM rate) to be used for a particular portion identifier. For example, in embodiments in which concepts are used to identify some portion of a work, the PR (TSM rate) associated with a particular concept could be computed as a function of the number of times a concept has appeared in a work so that the first playing of the concept uses a slower PR (TSM rate) and subsequent occurrences of the same concept are presented with increased PRs (TSM rates) for faster presentation (playback).

Still further, it should be understood that Presentation Rate Guidance Information ("PRGI"), a Speed Contour is a subset of PRGI, and a CPRA data structure may comprise, optionally, one or more of the following: (a) Presentation Rate Rule Information ("PRRI") and (b) Time-Stamp Information ("TSI"). Further, the PRRI and/or TSI may be used to determine PRs by also being incorporated directly into an Analysis Engine, or they may be obtained by the Analysis Engine from local or distributed data bases, where distribution includes distribution over webs of interconnected computer or communication networks.

Application of Speed Contours and Conceptual Presentation Rate Association Data Structures to Produce an Altered Media Work (Listener-Interest-Filtered Work)

In accordance with embodiments of a fourth aspect of the present invention, a Speed Contour is utilized in conjunction with an MW (an audio or audio-visual work) to produce an altered MW (an LIF work) wherein segments of the MW (the audio or audio-visual work) are presented (played back) in accordance with PRs (TSM rates or playback rates) specified by the Speed Contour. In addition, some of such embodiments also store the altered MW (the LIF work) for later presentation (replay) by the same embodiment or by other presentation (replay) devices. The embodiments that generate the altered MW (the LIF work) using a Speed Contour represent a specific embodiment of the method and apparatus described above in conjunction with FIG. 22. After describing the embodiments that generate the altered MW (the LIF work) using a Speed Contour, a description of the correspondence to the method and apparatus shown in FIG. 22 will be set forth.

As one of ordinary skill in the prior art can readily appreciate, embodiments of the present invention which provide an altered MW (an LIF work) for the audio portion of an MW (an audio-visual work) can also speed up or slow down visual information to match the audio in the MW (the audio-visual works) as well. To do this in a preferred embodiment, the audio is processed using TSM methods as described above and the video signal is "Frame-subsampled" or "Frame-replicated" in accordance with any one of the many methods known to those of ordinary skill in the prior art to achieve the desired PR (TSM rate) and to maintain synchronism between the audio and visual portions of the MW (the audio-visual work). Thus, if one speeds up the audio and samples are requested at a faster rate, the frame stream is subsampled, i.e. frames are skipped.

Figure 10:
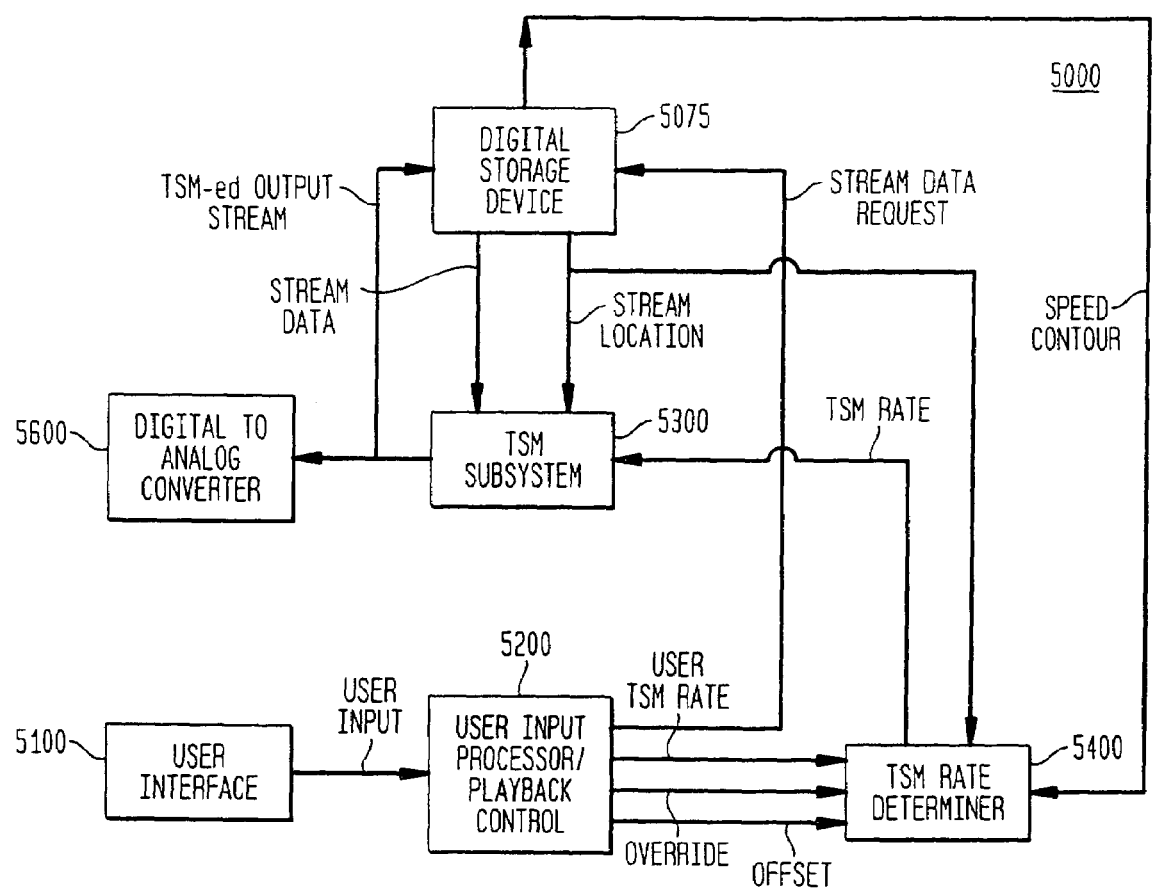
FIG. 10 shows a block diagram of an embodiment of a fourth aspect of the present invention which utilizes a Speed Contour in conjunction with an audio or audio-visual work to produce an LIF work.

FIG. 10 shows a block diagram of embodiment 5000 of the fourth aspect of the present invention which utilizes a Speed Contour in conjunction with an MW (an audio or audio-visual work) to produce an altered MW (an LIF work). As shown in FIG. 10, embodiment 5000 comprises User Interface 5100 ("UI 5100") which receives input from an Audience member (a user). An embodiment of UI 5100 is the same as UI 100 described above with respect to FIG. 1. UI 5100 provides output signals which indicate input from the Audience member (the user). The Audience member (user) input is interpreted by User Input Processor 5200/Playback Control 5200 ("UIP/PC 5200") to indicate the following options selected by the Audience member (the user): (a) select a file to play, which file corresponds to a particular MW (audio or audio-visual work) (the selected file can be input to embodiment 5000 directly or it can be a file that has been stored by embodiment 5000); (b) select a Speed Contour to control the PR (the TSM rate or playback rate); (c) initiate presentation (playback) of the selected file; (d) halt presentation (playback) of the selected file; (e) pause presentation (playback) of the selected file; (f) modify or override the PR (the TSM rate or playback rate) obtained from the Speed Contour for a portion of the MW (the audio or audio-visual work) being presented (played); or (g) specify parameters Offset and Override which are used by the apparatus in a manner that will be explained in detail below.

As shown in FIG. 10, UIP/PC 5200 receives the Audience member input (the user input) from UI 5100 and (a) converts the Audience member input (the user input) to numeric values; (b) interprets the Audience member input (the user input) to set the values of parameters and to control the use, modification or overriding of the Speed Contour; (c) directs accessing and loading of a data stream from an MW (an audio or audio-visual work) by sending stream data requests to Digital Storage Device 5075 (to perform presentation (playback) control); and (d) directs accessing and loading of a data stream from a Speed Contour by sending stream data requests to Digital Storage Device 5075. In the case of Digital Storage Device 5075, UIP/PC 5200 may request access to a file of digital data representing an MW (an audio or audio-visual work) stored in a file-system on the device. To direct accessing and loading of a data stream from an MW (an audio or audio-visual work), UIP/PC 5200 interprets the Audience member input (the user input) and the location of digital samples representing the MW (the audio or audio-visual work) stored on Digital Storage Device 5075 to compute presentation (playback) positions for the selected file at a particular sample. In a preferred embodiment, the data requests for the MW (the audio or audio-visual work) and the data requests for the Speed Contour are issued such that data from the same temporal locations of each is provided as output from Digital Storage Device 5075.

Digital Storage Device 5075 receives the following as input: (a) stream data requests from UIP/PC 5200; and optionally (b) Time-Scale Modified output from TSM Subsystem 5300. Digital Storage Device 5075 produces the following as output: (a) a stream of data representing an MW (an audio or audio-visual work); (b) a stream of location information, for example position in a file, of the data stream being output; and (c) a stream of data representing the Speed Contour. There are many methods well known to those of ordinary skill in the art for utilizing digital storage devices, for example a "hard disk drive", to store and retrieve general purpose data.

The MW (the audio or audio-visual work) is typically stored in digital form on Digital Storage Device 5075. An embodiment of Digital Storage Device 5075 is the same as Digital Storage Device 75 described above with respect to FIG. 1. Digital storage device 5075 is accessed by UIP/PC 5200 in accordance with methods which are well known to those of ordinary skill in the art to provide a stream of digital samples representing the MW (the audio or audio-visual work). In alternative embodiments, the MW (the audio or audio-visual work) is stored in analog form on an analog storage device. In such an alternative embodiment, a stream of analog signals is input to an apparatus, not shown, for transforming the analog samples into digital samples. There exist many commercially available apparatus which are well known to those of ordinary skill in the art for receiving an input analog signal such as a voice signal and for sampling the analog signal at a rate which is at least the Nyquist rate to provide a stream of digital signals which may be converted back into an analog signal without loss of fidelity. The digital samples are then transmitted to TSM Subsystem 5300.

TSM Rate Determiner 5400 receives as input: (a) a Speed Contour selected by the Audience member (the user) which is applied as input from Digital Storage Device 5075; (b) a PR (a TSM rate) specified by the Audience member (the user) which is applied as input from UIP/PC 5200; (c) Offset, an offset PR (TSM rate) specified by the Audience member (the user) which is applied as input from UIP/PC 5200; (d) Override, a Boolean parameter specified by the Audience member (the user) which is applied as input from UIP/PC 5200; and (e) current stream location information from Digital Storage Device 5075 used to identify the position in the stream of the samples being sent; for example, a sample count or time value of the beginning of the group of samples transferred from Digital Storage Device 5075. In response, TSM Rate Determiner 5400 produces as output a PR (a TSM rate) that is received by TSM Subsystem 5300.

TSM Rate Determiner 5400 uses the stream location information to select the closest corresponding temporal position in the Speed Contour in order to determine the associated PR (TSM rate) specified in the Speed Contour. This approach allows Speed Contours created with different Interval_Size values, or TSM sampling frequencies, to be used for any MW (audio or audio-visual work), and insures a one-to-one temporal correspondence between data stream position and PRs (TSM rates) obtained from the Speed Contour.

TSM Rate Determiner 5400 determines the output PR (TSM rate or playback rate) using any one of the following modes of operation:

1. Speed Contour Driven Playback: In this mode, the outputs from TSM Rate Determiner 5400 are PRs (TSM rates) obtained from the Speed Contour for the corresponding portions of the input MW (audio or audio-visual work) to be presented (played). This mode outputs PRs (TSM rates) that are identical to those specified by the Speed Contour.
2. Speed Contour Offset Playback: In this mode, the Audience member (the user) specifies, via UI 5100, Offset, an offset parameter that is used to adjust the PRs (TSM rates) specified by the Speed Contour. In this mode, the PR (TSM rate) output is given by the following formula:

*TSM_rate=PR (TSM rate) from Speed Contour\*(1+ Offset)*

For example, if an Audience member (a user) specifies an offset factor of −0.4, TSM Rate Determiner 5400 will add the −0.4 offset value to the number 1.0 (resulting in the value 0.6) and scale each of the PRs (TSM rates) specified in the Speed Contour to achieve a uniform decrease (slow down) in the PR (the TSM rate or playback rate) for the output signal produced. Similarly a positive offset would increase (speed up) the PR (the TSM rate or playback rate) for the output signal produced. Note that an offset value of zero has no effect on the PR (TSM rate). As one can readily appreciate different offset strategies may be employed to achieve non-linear and linear scaling of the PRs (TSM rates).
3. Audience Member (User) Override of Speed Contour: In this mode, the Audience member (the user) can override the Speed Contour and manually control the PR (TSM rate or playback rate) over portions of the MW (the audio or audio-visual work). When the override is released by the user, the PR (TSM rate) used to determine the PR (TSM rate or playback rate) of the output signal is taken from the corresponding location in the Speed Contour.

As shown in FIG. 10, TSM Subsystem 5300 receives as input: (a) a stream of samples representing portions of the MW (the audio or audio-visual work) from Digital Storage Device 5075; (b) stream location information from Digital Storage Device 5075 used to identify the position in the data stream of the samples being sent, for example, a sample count or time value; and (c) the PR (the TSM rate) from TSM Rate Determiner 5400. As described above, the input can be an analog which is transformed into a series of digital samples in accordance with method and apparatus which are well known to those of ordinary skill in the art. Output from TSM Subsystem 5300 is applied as input to: (a) Digital to Analog Converter/Audio and/or Audio-Visual Playback Device 5600 ("DA/APD 5600") and, optionally, to (b) Digital Storage 5075 for storing the presentation (replay) at the PR (the TSM rate) if desired. DA/APD 600 is apparatus which is well known in the art for receiving digital samples and providing a presentation (replay) of an MW (an audio or audio-visual work). The output from TSM apparatus 4300 is a stream of digital samples which comprise a digitized audio or audio-visual stream that is a Time-Scaled Modified version of the input MW (audio or audio-visual work) and, in accordance with the present invention, reflects the PRs (TSM rates or playback rates) specified by the Speed Contour and/or Audience (user) input. This output represents the altered MW (LIF work).

In some embodiments, the altered MW (LIF work) is stored for later presentation (replay) by the same embodiment or by other presentation (replay) devices. In addition, the digital output can be transformed to analog form for storage on analog devices. There are many apparatus which are well known to those of ordinary skill in the art for receiving a digitized input signal, such as a 16-bit Pulse Code Modulation, and for providing an analog signal output therefrom. For example, it is well known to those of ordinary skill in the art that commercially available equipment exists for receiving a stream of digitized samples representing a signal and for converting those samples to an analog signal without loss of fidelity. Embodiments of TSM Subsystem 5300 and DA/APD 5600 are the same as TSM Subsystem 300 and DA/APD 600 described above with respect to FIG. 1. As one of ordinary skill in the prior art can readily appreciate, whenever embodiment 5000 provides presentation (playback) for an MW (audio-visual work), TSM Subsystem 5300 speeds up or slows down visual information to match the audio in the MW (audio-visual work). To do this in a preferred embodiment, the video signal is "Frame-subsampled" or "Frame-replicated" in accordance with any one of the many methods known to those of ordinary skill in the prior art to maintain synchronism between the audio and visual portions of the MW (the audio-visual work). Thus, if one speeds up the audio and samples are requested at a faster rate, the frame stream is subsampled, i.e. frames are skipped.

Although FIG. 10 shows embodiment 5000 to be comprised of separate modules, in a preferred embodiment, UI 5100, UIP/PC 5200, TSM Subsystem 5300, and TSM Rate Determiner 5400 are embodied as software programs or modules which run on a general purpose computer such as, for example, a personal computer. Furthermore, Digital Storage Device 5075 is embodied as a disk drive or Random Access Memory and Digital to Analog Converter 5600 is embodied as a typical accessory to a general purpose computer such as a soundcard on a personal computer. It should be well known to one of ordinary skill in the art, in light of the detailed description above, how to implement these programs or modules in software.

As one can readily appreciate, in the absence of Audience (user) input, the time-scale of an altered MW (LIF work) is fully determined by the Speed Contour. Furthermore the data fetch rate of the input signal is also determined by the Speed Contour: higher rates are required for speed-up, slower rates for slow-down. Since the Speed Contour has a temporal correspondence with the input signal, the data fetch rate, or read-rate, for the Speed Contour is identical to that of the input signal. In many embodiments, it is desirable to reduce the number of devices with variable read rates. In accordance with the present invention, variable read rates can be eliminated in the following manner.

The data contained in the Speed Contour will be read at the rate specified by the previous values of the Speed Contour. By performing a time-scale modification of the input Speed Contour using the Speed Contour itself, a new Speed Contour is obtained. This Time-Scale Modified Speed Contour will share a temporal correspondence with the output signal created by applying the original Speed Contour to the input signal. Because the output is generated at a fixed rate regardless of the time-scale modification performed, the Time-Scale Modified Speed Contour values will be accessed at a fixed rate.

The following describes how embodiment 5000 shown in FIG. 10 corresponds to embodiment 10000 shown in FIG. 22. TSM Subsystem 5300 and Digital to Analog Converter 5600 correspond to Presentation Engine 10400; and TSM Rate Determiner 5400 corresponds to Analysis Engine 10200 and Rate Arbiter 5400.

In accordance with embodiments of a fifth aspect of the present invention, a CPRA data structure is utilized in conjunction with an MW (an audio or audio-visual work) to produce an altered MW (LIF work) wherein portions of the MW (the audio or audio-visual work) are presented (played back) in accordance with PRs (TSM rates or playback rates) specified by the CPRA data structure. In addition, some of such embodiments also store the altered MW (LIF work) for later presentation (replay) by the same embodiment or by other presentation (replay) devices. The embodiments that generate the altered MW (the LIF work) using a CPRA data structure represent a specific embodiment of the method and apparatus described above in conjunction with FIG. 22. After describing the embodiments that generate the altered MW (the LIF work) using a CPRA data structure, a description of the correspondence to the method and apparatus shown in FIG. 22 will be set forth.

Figure 11:
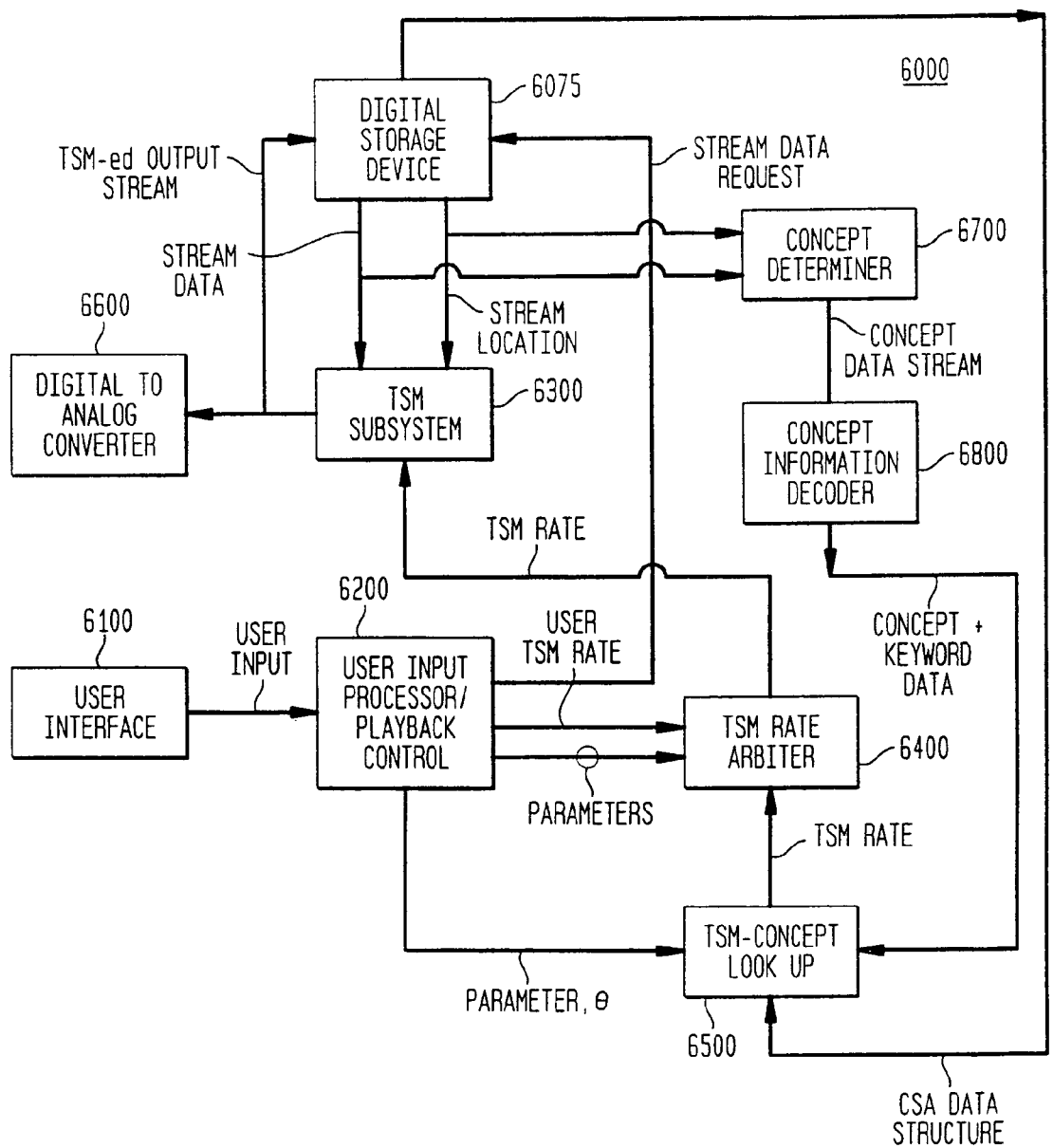
FIG. 11 shows a block diagram of an embodiment of a fifth aspect of the present invention which utilizes a CPRA data structure in conjunction with an audio or audio-visual work to produce an LIF work.

FIG. 11 shows a block diagram of embodiment 6000 of the fifth aspect of the present invention which utilizes a CPRA data structure in conjunction with an MW (an audio or audio-visual work) to produce an altered MW (LIF work). As shown in FIG. 11, embodiment 6000 comprises User Interface 6100 ("UI 6100") which receives input from an Audience member (a user). An embodiment of UI 6100 is the same as UI 100 described above with respect to FIG. 1. UI 6100 provides output signals which indicate input from the Audience member (the user). The Audience member input (the user input) is interpreted by User Input Processor/Playback Control 6200 ("UIP/PC 6200") to indicate the following options selected by the Audience member (the user): (a) select a file to play, which file corresponds to a particular MW (audio or audio-visual work) (the selected file can be input to embodiment 6000 directly or it can be a file that has been stored by embodiment 6000); (b) select a CPRA data structure to control the PR (the TSM rate or playback rate); (c) initiate presentation (playback) of the selected file; (d) halt presentation (playback) of the selected file; (e) pause presentation (playback) of the selected file; (f) modify or override the PR (TSM rate or playback rate) obtained from the CPRA data structure for a portion of the MW (audio or audio-visual work) being presented (played); or (g) to specify parameters Theta, Offset, Slew-Limit, and Override that are used by the apparatus in a manner that will be explained in detail below. In addition, embodiment 6000 can also receive an MW (an audio or audio-visual work) that is input directly from, for example, TV or over the Internet. In that case, the audio portion is converted to digital format in the manner described above for analog input, and the close-captioning information, if any, can also be converted to an appropriate digital format in accordance with any one or the many methods which are well known to those of ordinary skill in the art.

As shown in FIG. 11, UIP/PC 6200 receives input from UI 6100 and (a) converts the Audience member input (the user input) to numeric values; (b) interprets the Audience member input (the user input) to set the values of parameters and to control the use, modification or overriding of the PRs (TSM rates) from the CPRA data structure; and (c) directs accessing and loading of a data stream from an MW (an audio or audio-visual work) by sending stream data requests to Digital Storage Device 5075 (to perform presentation (playback) control). In the case of Digital Storage Device 6075, UIP/PC 6200 may request access to a file of digital data representing an MW (an audio or audio-visual work) stored in a file-system on the device. To direct accessing and loading of a data stream from an MW (an audio or audio-visual work), UIP/PC 6200 interprets the Audience member input (the user input) and the location of digital samples representing the MW (the audio or audio-visual work) stored on Digital Storage Device 6075 to compute presentation (playback) positions for the selected file at a particular sample.

Digital Storage Device 6075 receives the following as input: (a) stream data requests from UIP/PC 5200; and optionally (b) Time-Scale Modified output from TSM Subsystem 5300. Digital Storage Device 5075 produces the following as output: (a) a stream of data representing an MW (an audio or audio-visual work); (b) a stream of location information, for example position in a file, of the data stream being output; and (c) a stream of data representing the CPRA data structure. There are many methods well known to those of ordinary skill in the art for utilizing digital storage devices, for example a "hard disk drive", to store and retrieve general purpose data.

The MW (the audio or audio-visual work) is typically stored in digital form on Digital Storage Device 6075. An embodiment of Digital Storage Device 6075 is the same as Digital Storage Device 75 described above with respect to FIG. 1. Digital storage device 6075 is accessed by UIP/PC 6200 in accordance with methods which are well known to those of ordinary skill in the art to provide a stream of digital samples representing the MW (audio and/or audio-visual work). In alternative embodiments, the MW (the audio or audio-visual work) is stored in analog form on an analog storage device. In such an alternative embodiment, a stream of analog signals is input to an apparatus, not shown, for transforming the analog samples into digital samples. There exist many commercially available apparatus which are well known to those of ordinary skill in the art for receiving an input analog signal such as a voice signal and for sampling the analog signal at a rate which is at least the Nyquist rate to provide a stream of digital signals which may be converted back into an analog signal without loss of fidelity. The digital samples are then transmitted to TSM Subsystem 6300.

Concept Determiner 6700 accepts, as input, different sets of data depending on certain options. In accordance with option 1, the input data comprises Media Work Content Data ("MWCD") (for example, a stream of data representing text or concepts, for example, closed-captioning data or textual annotation) that is stored with the current segment of the input MW (the input audio or audio-visual work) being supplied to TSM Subsystem 6300. For the case of option 1, Concept Determiner 6700 passes the MWCD (the incoming stream of data representing text or concepts) through as output to Concept Information Decoder 6800. In accordance with option 2, the input data comprises: (a) a stream of samples representing portions of the MW (the audio or audio-visual work) from Digital Storage Device 6075 and (b) current stream location information from Digital Storage Device 6075 used to identify the position in the stream of the samples being sent, for example, a sample count or time value of the beginning of the group of samples transferred from Digital Storage Device 6075. For the case of option 2, Concept Determiner 6700 provides, as output, MWCD (for example, a stream of data representing concepts contained in the current portion) of the MW (the audio or audio-visual work) being supplied to TSM Subsystem 6300. The MWCD (the concepts and/or textual transcript of spoken passages) are determined by extracting closed-captioning information from the MW (the audio or audio-visual work), or by use of speech recognition algorithms to obtain a stream of text from the input MW (the input audio or audio-visual work). Many methods are well known to those of ordinary skill in the art for extracting closed-captioning information and many methods are well known to those of ordinary skill in the art for extracting text using speech recognition algorithms.

Concept Information Decoder 6800 accepts as input from Concept Determiner 6700 the MWCD (a stream of data which represents conceptual information). In accordance with the present invention, and without limitation, the MWCD (conceptual information) comprises: written transcript, raw text, keywords, phrases, or other representations of conceptual information which are well known to those of ordinary skill in the art. In response, Concept Information Decoder 6800 generates as output a stream of data representing keywords and concepts for the current portion of the input MW (the input audio or audio-visual work) being sent to TSM Subsystem 6300.

Concept Information Decoder 6800 processes the input to form concept data representations of the input data stream. For example, Concept Information Decoder 6800 may simply remove articles and adjectives from input which is a transcript to provide output comprised only nouns and noun phrases. Alternatively Concept Information Decoder 6800 may employ natural language processing to extract conceptual content from a stream of spoken words. Many methods of implementing Concept Information Decoder are well known to those of ordinary skill in the art.

TSM Concept Look-Up 6500 accepts as input: (a) a CPRA data structure which is received from Digital Storage Device 6075; (b) data from Concept Information Decoder 6800 that represents concepts for the current portion of the input MW (the input audio or audio-visual work) being sent to TSM Subsystem 6300; and (c) parameter Theta from UIP/PC 6200. TSM Concept Look-Up 6500 uses a database or scratch-pad memory to maintain a list of records in which each record stores information pertaining to the PR (the TSM rate) and concept information for the PR (the TSM rate). TSM Concept Look-Up 6500 performs the follow steps in accordance with any one of the many methods which are well known to those of ordinary skill in the art. It searches the database containing the CPRA data structure for the closest matching concept entry. If the difference between the closest matching entry is within a range specified by a parameter Theta, the PR (TSM rate) associated with that entry is provided as output. If no concept entries in the database containing the CPRA data structure are within the distance specified by the parameter Theta, then the previously obtained PR (TSM rate) is provided as output which is received by TSM Rate Arbiter 6400.

TSM Rate Arbiter 6400 receives as input: (a) a TSM rate from User Input Processor 6200 that is specified by the Audience member (the user); (b) a PR (TSM rate) from TSM Concept Look-Up 6500; and (c) parameters Offset, Slew-Limit, and Override from UIP/PC 6200 that will be described in detail below. In response, TSM Rate Arbiter 6400 produces as output a single PR (TSM rate) that is transmitted to TSM Subsystem 6300.

TSM Rate Arbiter 6400 determines the PR (the TSM rate or playback rate) using any one of the following modes of operation:

1. CPRA data structure Driven Presentation (Playback): In this mode, the PR (TSM rate) used is the PR (TSM rate) provided by TSM-Concept Look-Up 6500.
2. CPRA data structure Offset Presentation (Playback): In this mode, the Audience member (the user) specifies, via UIP 6100, Offset, an offset parameter that is be used to adjust the PR (TSM rate) specified in the CPRA data structure. The PR (TSM rate) output is given by the following formula:

$TSM\_rate = PR$ ($TSM$ rate) from $TSM$-Concept Look-Up*(1+Offset)

For example, if an Audience member (a user) specifies an offset of −0.4, TSM Rate Arbiter 6400 will add the −0.4 offset to the number 1 (resulting in the value 0.6) and scale each of the PRs (TSM rates) specified by TSM-Concept Look-Up 6500 to achieve a uniform decrease (slow down) in the PR (TSM rate or playback rate) for the output signal produced. Similarly a positive offset would increase (speed up) the PR (TSM rate or playback rate) for the output signal produced. Note that an offset value of zero has no effect on the PR (TSM rate). As one can readily appreciate different offset strategies may be employed to achieve non-linear and linear scaling of the PRs (TSM rates).
3. Audience Member (User) Override of CPRA data structure: In this mode, the Audience member (the user) can override a PR (TSM rate) obtained from the TSM-Concept Look-Up 6500 and manually control the PR (TSM rate or playback rate) for portions of the MW (the audio or audio-visual work). When the override is released by the Audience member (the user), the PR (TSM rate) used to determine the PR (playback rate) of the output signal is taken from the TSM-Concept Look-Up 6500 which utilizes the CPRA data structure entry corresponding to the conceptual information in the current segment of the MW (the audio or audio-visual work).

TSM Rate Arbiter 6400 uses a slew-rate parameter specified by the Audience member (the user) to limit the rate of change of the PR (TSM rate) at its output in order to create smooth transitions between different PRs (TSM rates). TSM Arbiter 6400 may also scan ahead in the input stream to predict the appropriate rate of change over the MW (the audio or audio-visual work) being presented (played). In this manner, the time-lag associated with changes in PR (TSM rate) is reduced as described below.

As one can readily appreciate, the PRs (the TSM rates or playback rates) output from TSM Concept Look-Up 6500 can vary rapidly. The input parameter Slew_Limit is used to control the rate of change of the PR (the playback rate). Slew_Limit filters out large transients in the PR (the TSM rate or playback rate) by forcing a gradual change in the PR (the playback rate) by insuring that the magnitude of any transition in PR (TSM rate) is below the amount specified in the Slew_Limit parameter. It is important to note, however, that when a small value of Slew_Limit is selected, the amount of time necessary to transition to a new PR (TSM rate or playback rate) is lengthened. This can have an undesirable side effect of causing the presentation (playback) rate response to seem sluggish. For example, consider what happens if the input is being played back at twice the normal speed and an item of interest is encountered which causes TSM Concept Look-Up 6500 to output a PR (TSM rate or playback rate) of one-half normal speed. In this case, input parameter Slew_Limit may impose such a long transition time, that the word of interest will not be played back at the PR determined from the CPRA data structure entry. One way to avoid this undesirable side effect is for TSM Concept Look-Up 6500 to scan ahead in the MW (the audio or audio-visual work) input stream and obtain future values of PRs (TSM rates or playback rates) that can be used to determine the target PR (TSM rate) for upcoming sections of the MW (the audio or audio visual work). When the target PR (TSM rate) for an upcoming segment differs such that the Slew_Limit would prevent the PR (TSM rate) from adjusting quickly enough, TSM Rate Arbiter 6400 could initiate an earlier transition in the PR (TSM rate or playback rate) by adjusting the PR (the TSM rate) for current segments in a direction toward the future PRs (TSM rates) specified. Another way to avoid the undesirable effect of long transition times due to small values for the Slew_Limit is to delay the MW (the audio or audio-visual work) input stream by buffering it by a fixed amount equal to the amount that TSM Concept Look-Up 6500 would read ahead. This shifts the PR (TSM rate) transitions slightly earlier in the MW (the audio or audio-visual work) input stream, resulting in an output stream in which speed changes occur early enough that the concepts are played at the rate specified from TSM Concept Look-Up 6500 and the speed transitions adhere to the Slew-Limit.

Figure 12:
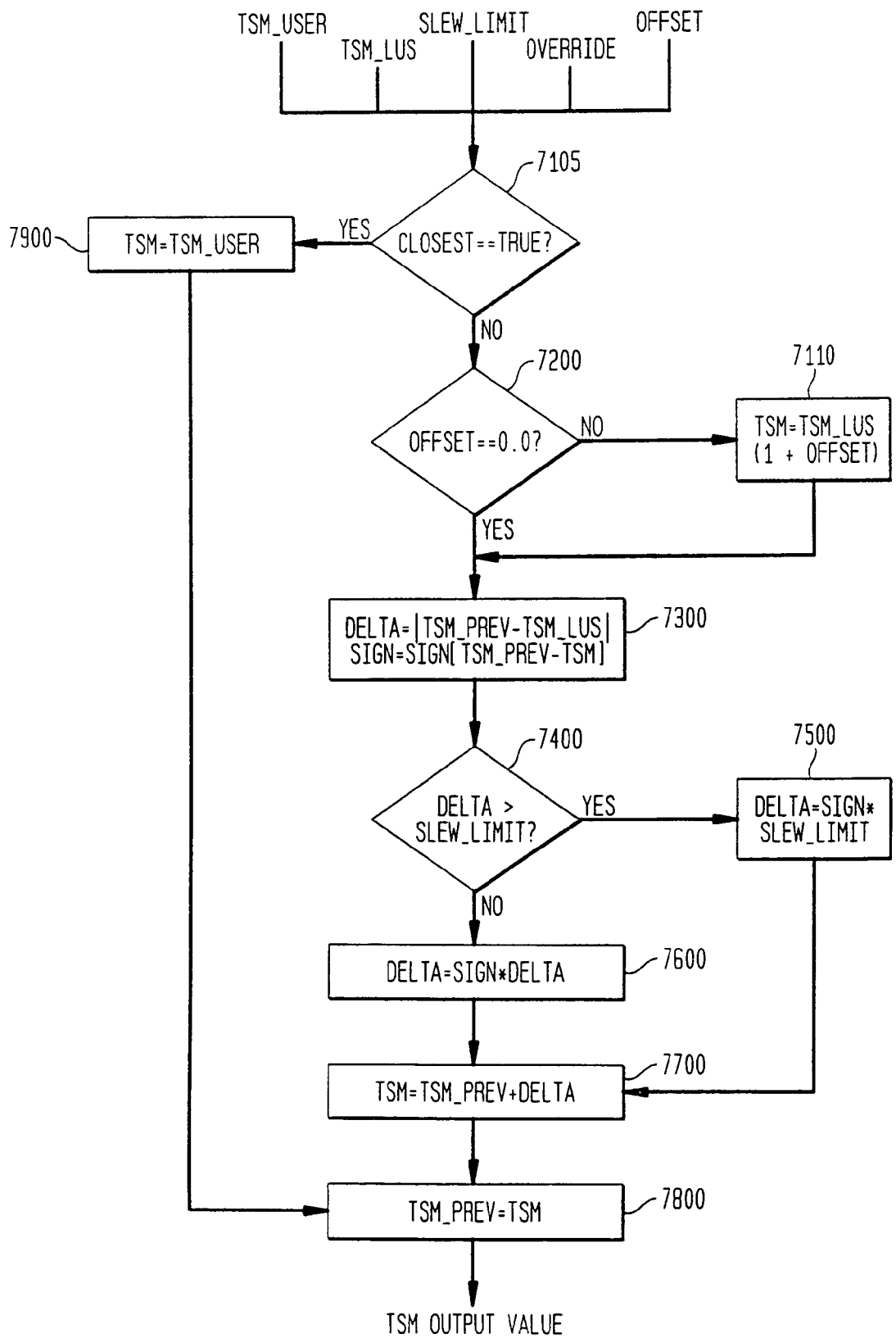
FIG. 12 shows a flowchart of an algorithm used in one embodiment of a TSM Rate Arbiter shown in FIG. 11 to provide a TSM rate, or playback rate.

FIG. 12 shows a flowchart of an algorithm used in one embodiment of TSM Rate Arbiter 6400 to provide a PR (TSM rate or playback rate).

As shown in FIG. 12, the following are applied as input to box 7105: (a) a PR (TSM rate) specified by the Audience member (the user) (TSM_USER) which is received from UIP/PC 6200; (b) a PR (TSM rate) output by TSM Concept Look-Up 6500 (TSM_LUS); (c) a slew limit parameter (Slew_Limit) specified by the Audience member (the user) which is received from UIP/PC 6200; (d) an override flag (Override) specified by the Audience member (the user) which is received from UIP/PC 6200; and (e) an offset value (Offset) specified by the Audience member (the user) which is received from UIP/PC 6200.

At box 7105 a decision is made to determine whether Override is true. If so, control is transferred to box 7900; otherwise, control is transferred to box 7200. At box 7200 a decision is made to determine whether Offset is equal to 0.0. If so, control is transferred to box 7300, otherwise, control is transferred to box 7110.

At box 7300, the following variables are computed: Delta=|TSM_Prev−TSM_LUS| and Sign=sign[TSM_Prev−TSM_LUS], where TSM_Prev is the TSM rate previously determined. Control is then transferred to box 7400.

At box 7400, a decision is made based on a comparison between Delta and Slew_Limit. If Delta is greater than Slew_Limit, control is transferred to box 7500; otherwise, control is transferred to box 7600.

At box 7600, Delta is set equal to Sign*Delta and control is then transferred to box 7700. At box 7500, Delta is set equal to Sign*Slew_Limit and control is then transferred to box 7700. At box 7700, TSM_Prev is set equal to TSM_Prev+Delta and control is then transferred to box 7800. At box 7800, TSM_Prev is set equal to TSM and the value TSM is provided as output.

At box 7900, TSM is set equal to TSM_User and control is then transferred to box 7800. Finally, at box 7110, TSM is set equal to TSM_LUS*(1+Offset) and control is then transferred to box 7300.

Combinations of the above-described modes of operation are also within the scope of the present invention. For example, an Audience member (a user) may elect to combine a user offset with the use of a CPRA data structure for close-captioning information embedded in the MW (the audio or audio-visual work) to be presented (played) to determine the PR (the TSM rate) desired for the output signal.

The output from embodiment 6000 is a stream of digital samples which comprise a digitized audio or audio-visual stream which is a Time-Scaled Modification of the input MW (the input audio or audio-visual work) and, in accordance with the present invention, reflects the PRs (the TSM rates or playback rates) specified by the CPRA data structure and/or Audience input (user input). This output represents the altered MW (LIF work).

In some embodiments, embodiment 6000 also stores the altered MW (LIF work) for later presentation (replay) by the same embodiment or by other presentation (replay) devices. In addition, the digital output can be transformed to analog form for storage on analog devices. There are many apparatus which are well known to those of ordinary skill in the art for receiving a digitized input signal, such as a 16-bit Pulse Code Modulation, and for providing an analog signal output therefrom. For example, it is well known to those of ordinary skill in the art that commercially available equipment exists for receiving a stream of digitized samples representing a signal and for converting those samples to an analog signal without loss of fidelity. As one of ordinary skill in the prior art can readily appreciate, whenever embodiment 6000 provides playback for an MW (an audio-visual work), TSM Subsystem 6300 speeds up or slows down visual information to match the audio in the MW (the audio-visual work). To do this in a preferred embodiment, the video signal is "Frame-sub-sampled" or "Frame-replicated" in accordance with any one of the many methods known to those of ordinary skill in the prior art to maintain synchronism between the audio and visual portions of the MW (the audio-visual work). Thus, if one speeds up the audio and samples are requested at a faster rate, the frame stream is subsampled, i.e. frames are skipped.

Although FIG. 11 shows embodiment 6000 to be comprised of separate modules, in a preferred embodiment, UI 6100, UIP/PC 6200, TSM Subsystem 6300, TSM Rate Arbiter 6400, TSM Concept Look-Up 6500, Concept Determiner 6700, and Concept Information Decoder 6800 are embodied as software programs or modules which run on a general purpose computer such as, for example, a personal computer. Furthermore, Digital Storage Device 6075 is embodied as a disk drive or Random Access Memory and Digital to Analog Converter 6600 is embodied as a typical accessory to a general purpose computer such as a soundcard on a personal computer. It should be well known to one of ordinary skill in the art, in light of the detailed description above, how to implement these programs or modules in software.

The following describes how embodiment 6000 shown in FIG. 11 corresponds to embodiment 10000 shown in FIG. 22. TSM Subsystem 4300 and Digital to Analog Converter 4600 correspond to Presentation Engine 10400; Concept Determiner 6700, Concept Information Decoder 6800, and TSM Concept Look Up 6500 correspond to Analysis Engine 10200; and TSM Rate Arbiter 6400 corresponds to Rate Arbiter 10300.

In accordance with embodiments of a sixth aspect of the present invention, a pair comprised of a Conceptual Affinity Association data structure ("CAffA" data structure) and an Affinity Presentation Rate Association data structure ("AffPRA" data structure) or a pair comprised of a Conceptual Aptitude Association data structure ("CAptA" data structure) and an Aptitude Presentation Rate Association data structure ("AptPRA" data structure) is utilized in conjunction with an MW to produce an altered MW wherein portions of the MW are presented in accordance with PRs specified by the respective pairs. FIGS. 20-21 show representations of an AptPRA data structure and a CAptA" data structure. As one of ordinary skill in the art can readily appreciate, similar representations can be created for an AffPRA data structure and a CAffA data structure.

In accordance with this aspect of the present invention, the portions of the altered MW reflect affinities and/or aptitudes of an Audience for concepts, content, and/or properties (for example, grammatical constructs). In addition, some of such embodiments also store the altered MW for later presentation by the same embodiment or by other presentation devices. The embodiments that generate the altered MW using the above-specified pairs represent a specific embodiment of the method and apparatus described above in conjunction with FIG. 22. After describing the embodiments that generate the altered MW using the above-specified pairs, a description of the correspondence to the method and apparatus shown in FIG. 22 will be set forth. Advantageously, in accordance with the present invention, such altered MWs serve as an aid to learning since they reduce boredom associated with listening to and/or viewing redundant or previously mastered material, while preserving one or more predetermined comprehension rates for new material. Additionally, such altered MWs aid in productivity by tailoring the PR of information contained in the MW to the aptitude (skill level) of the Audience (listener and/or viewer) of the material and reducing the amount of time spent presenting redundant material during training.

Figure 24:
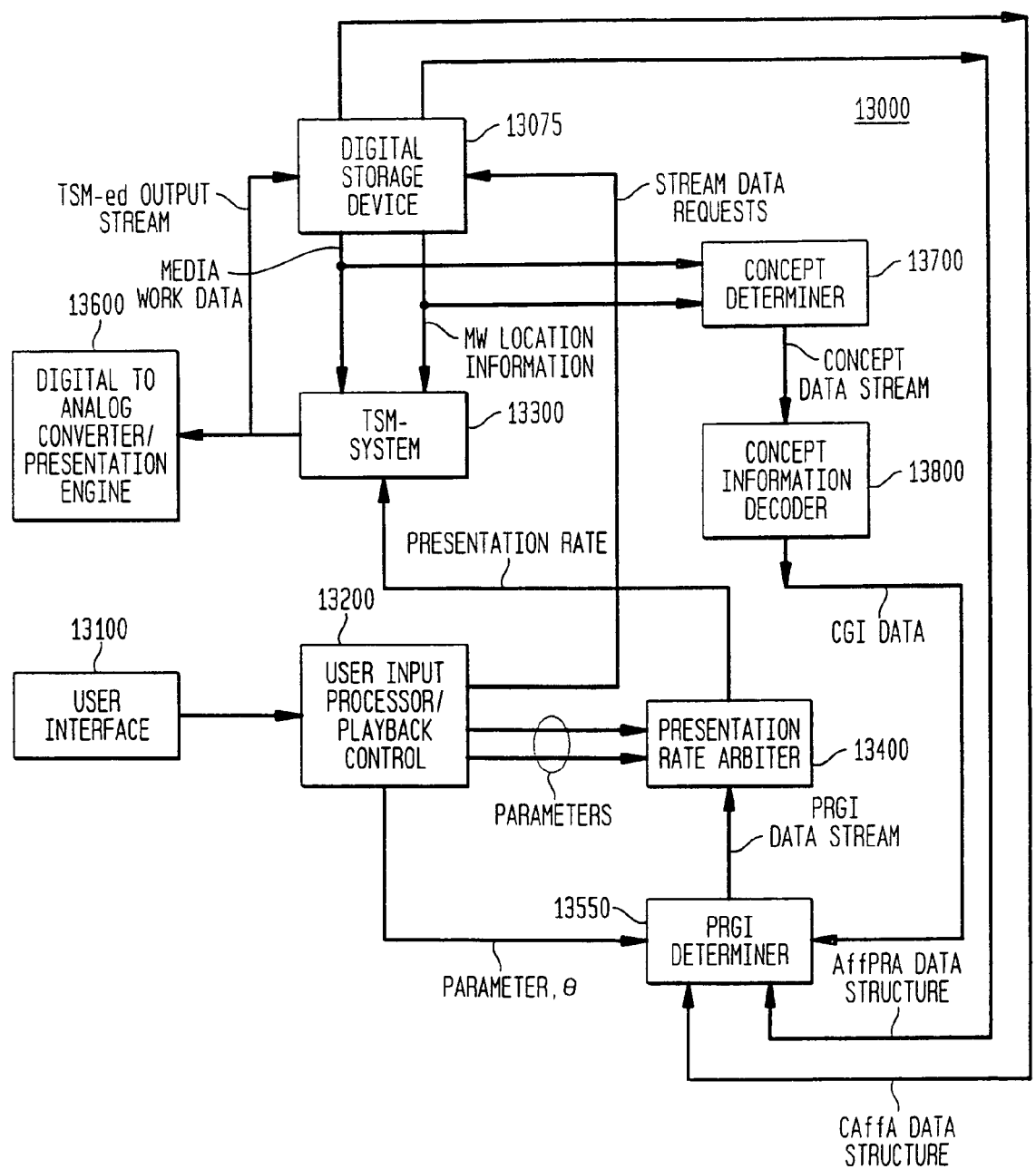
FIG. 24 shows a block diagram of an embodiment of the present invention that interprets concept, keyword and corresponding work location information received from a data source and presents all or portions of an MW at PRs that match the Audience's affinity or aptitude, respectively.

FIG. 24 shows a block diagram of embodiment 13000 of the present invention which advantageously interprets concept, keyword and corresponding work location information received from a data source and presents all or portions of an MW at PRs that match, for example and without limitation, the Audience's affinity or aptitude, respectively, depending on which pair of data structures are utilized. Embodiment 13000 shown in FIG. 24 is similar to embodiment 6000 shown in FIG. 11. As such, User Interface 13100 ("UI 13100") is the same as UI 6100; User Input Processor/Playback Control 13200 ("UIP/PC 13200") is substantially the same as UIP/PC 6200 (the differences will be explained in detail below); Digital Storage Device 13075 is substantially the same as Digital Storage Device 6075 (the differences will be explained in detail below); TSM Subsystem 13300 is the same as TSM Subsystem 6300; Presentation Rate Arbiter 13400 is the same as TSM Rate Arbiter 6400; Concept Determiner 13700 is the same as Concept Determiner 6700; and Concept Information Decoder 13800 is substantially the same as Concept Information Decoder 6800 (the differences will be explained in detail below). As shown in FIG. 24, Present Rate Guidance Information Determiner 13550 ("PRGI Determiner 13550") replaces TSM-Concept Lookup 6500 of FIG. 11.

UIP/PC 11200 of FIG. 24 differs from UIP/PC 6200 of FIG. 24 in that UIP/PC 13200 of FIG. 24 interprets Audience input, among other things, to select a pair comprised of a CAffA data structure and an AffPRA data structure or a pair comprised of a CAptA data structure and an AptPRA data structure instead of a CPRA data structure as is the case for UIP/PC 6200 of FIG. 11. UIP/PC 13200 of FIG. 24 also differs from UIP/PC 6200 of FIG. 11 in that UIP/PC 13200 of FIG. 24 interprets the Audience input, among other things to control the use, modification or overriding of PRs (TSM rates) obtained using the pair comprised of a CAffA data structure and an AffPRA data structure or the pair comprised of a CAptA data structure and an AptPRA data structure instead of the CPRA data structure as is the case for UIP/PC 6200 of FIG. 11.

Digital Storage Device 13075 of FIG. 24 differs from Digital Storage Device 6075 of FIG. 11 in that Digital Storage Device 13075 of FIG. 24 provides, as output, streams of data representing the pair comprised of a CAffA data structure and an AffPRA data structure or the pair comprised of a CAptA data structure and an AptPRA data structure instead of the CPRA data structure as is the case for Digital Storage Device 6075 of FIG. 11.

Concept Information Decoder 13800 of FIG. 24 differs from Concept Information Decoder 6800 of FIG. 11 in that Concept Information Decoder 13800 of FIG. 24 provides output to PRGI Determiner 13550 instead of TSM Concept Look-Up 6500 of FIG. 11 as is the case for Concept Information Decoder 6800 of FIG. 11.

As shown in FIG. 24, PRGI Determiner 13550 receives, as input: (a) a pair comprised of a CAffA data structure and an AffPRA data structure or a pair comprised of a CAptA data structure and an AptPRA data structure from Digital Storage Device 13075; (b) data from Concept Information Decoder 13800 that represents concepts/keywords for the current portion of the MW being sent to TSM Subsystem 13300; and (c) parameter Theta from UIP/PC 13200. PRGI Determiner 13550 searches the CAffA data structure or the CAptA data structure, respectively, for a matching concept/keyword and extracts the associated affinity or aptitude indicium, respectively. Then, using the associated affinity or aptitude indicium, PRGI 13550 searches the AffPRA data structure or AptPRA data structure, respectively, for a matching affinity indicium or aptitude indicium and extracts the associated PR. Alternatively, if an exact match for, the affinity or aptitude indicium is not found in the AffPRA data structure or AptPRA data structure, respectively, PRGI 13550 may determine a close affinity or aptitude value by applying techniques such as interpolation, or inferring expected values based on affinity or aptitude values contained in subnodes of hierarchical subclasses. For example, one may use a technique called "Conceptual Indexing" to organize into hierarchical subclasses all of the words and phrases of a body of material into a conceptual taxonomy that explicitly links each concept to its most specific generalization. "Conceptual Indexing" is described in a book entitled "Conceptual Indexing: A Better Way to Organize Knowledge" by W. A. Woods, Sun Microsystems Laboratories, a division of Sun Microsystems, Inc., 1997. PRGI Determiner 13550 produces, as output: (a) information representing the PR (this is applied as input to Presentation Rate Arbiter 13400). The other functionality of PRGI Determiner 13550 matches that of TSM-Concept Lookup 6500 described above in conjunction with FIG. 11.

Another method for representing Audience Aptitude Information or Audience Affinity Information, is to construct a data structure with pairings of Concept and Affinity/Aptitude organized in hierarchical sub-trees. The sub-trees are hierarchical in the sense that concepts at a root node are more general and encompass the more specific concepts of the leaf-nodes. Furthermore, the affinity or aptitude value at a root-node is a function (generally the expected value defined as: $\Sigma x_i f(x_i)$) of the affinity or aptitude values of entries which comprise the leaf-nodes or sub-tree nodes and the entries contribution to the root. The benefit of such organization becomes apparent when subject matter is organized in a manner in which the more general material is hierarchically closer to the root-node of the tree, with more specific information at the leaf-nodes. The following text illustrates such a hierarchical organization of concepts:

Automobiles Cars trucks Luxury economy import domestic

By organizing data in this format, affinity information for broad categories of information can be obtained by analyzing the information or more specific information. For example, if an Audience member was interested in luxury cars, but not economy cars, and there was no entry in a CPRA data structure for automobiles, an entry representing the Audience member's affinity may be obtained by averaging the entries in all sub-categories of automobiles to determine a value. The value thus obtained would represent the probability that the Audience member has an affinity in a more general subject based on the values of the sub-categories. For example, if Audience member A liked Luxury cars and had no interest in economy cars, or trucks, the value obtained for automobile would be ¼. If a different Audience member B liked import trucks, domestic trucks and economy cars, the value obtained for automobile would be ¾.

It should be understood that the process for organizing and creating hierarchical sub-trees by concept can be complex and time consuming. Therefore, it is anticipated that several of the embodiments of this aspect of the present invention would make use of pre-constructed hierarchical sub-trees which have been fabricated with specific criteria for the organization. For instance, in the text example above, a hierarchical sub-tree structure may be provided by automobile manufacturers for use among Audiences which are researching the purchase of an automobile. Audience members may employ the prefabricated data structure to filter information (using any of the number of methods described above for creating Listener Interest Filtered works or Listener Aptitude Filtered works) to direct the viewing of material specific to automobiles. Furthermore the Audience members may agree to share the information collected using the hierarchical sub-trees with manufacturers to receive information specific to said Audiences interest.

In one embodiment of the sixth aspect of the present invention, Presentation Rate Rule Information ("PRRI") may be used advantageously. For example, one PRRI may comprise a Restoring Interval algorithm which may be used to return a PR to a default value after a predetermined or specified interval if no new presentation rate data is derived from the concept information stream and the paired data structures. In accordance with this embodiment, for example, if a "slower than normal" PR for a one (1) minute segment of the MW is derived by a match in the paired data structures, but no further matches occur for the next five (5) minutes of the MW, then the PR may return to the default rate. The inventive use of the Restoring Interval alleviates the need for the Audience member to correct a PR when material is presented for which there is no match in the paired data structure. The Restoring Interval is applied as input to TSM Rate Arbiter 13400 (from Digital Storage Device 13075) which notes the value and initiates a change in PR toward a default presentation rate in the absence of new PRGI from PRGI Determiner 13550.

One example of the use of embodiments of the sixth aspect of the present invention entails the use of a CAptA data structure wherein the keywords comprise words that are familiar to the Audience (user) (similarly for embodiments of the fifth aspect of the present invention and the use of a CPRA data structure). Using such a CAptA data structure and the apparatus of embodiment 13000, a user can create an altered MW (LIF work) that will play all words known to an Audience at, for example, a predetermined PR (for example, faster than normal). Words not known to the Audience, or not familiar to the Audience, would be presented at a normal, or a slower, PR using the "Offset Playback" mode for Presentation Rate Arbiter 13400 (this was described in detail above with respect to TSM Rate Arbiter 6400). As a result, and in accordance with the present invention, embodiment 13000 would present an MW at a comfortably accelerated rate, and automatically slow the PR for words that are unfamiliar to the Audience. Such a system would be valuable for learning a new language such as a foreign language, or to those learning a language for the first time such as young children.

Another example of use of embodiments of the sixth aspect of the present invention entails the use of a CAptA data structure wherein the keywords form a dictionary of words (for example, one entry in the CAptA data structure for each word) such that the PR is determined by the phonetic complexity of the word (similarly for embodiments of the fifth aspect of the presentation and the use of a CPRA data structure). For example, the number of syllables in the word could be used determine the PR, for example, increased PRs being assigned to single syllable words and slower presentation rates being assigned to multiple syllable words. In a further example, the number and similarity of adjacent syllables in a word may be used to determine the PR, for example, words with similar adjacent syllables may be assigned reduced PRs. In this way, Audience members practicing comprehension of foreign languages would be given more time to comprehend phonetically complex words (i.e. words with many syllables). The identification of the categories can be done by use of a CAptA data base or by having Concept Information Decoder 13800 decode the input into categories by, for example, counting syllables.

Still another example of use of embodiments of the sixth aspect of the present invention entails the use of a CAptA data structure wherein the indicium of aptitude would use different metrics to determine the PR depending on a transcription method (similarly for embodiments of the fifth aspect of the presentation and the use of a CPRA data structure). For example, there are various methods for transcribing text or other information in an MW: (a) a pencil and long-hand; (b) a pencil and short-hand; (c) a keyboard and long-hand; (d) a keyboard and short-hand; (e) sign language for the hearing impaired; and (f) so forth. In each case, the work required to perform the transcription or recordation varies, as does the maximum transcription rate achievable. Further, the maximum rates and complexity of the transcribing are based on different properties of the MW in each case, for example: (a) the number of letters for pencil and long-hand; (b) the number of syllables for pencil and shorthand; (c) the number of keystrokes and the location of the keys typed for keyboard and longhand; (d) the location and chording of several keystrokes for keyboard and shorthand; and (e) arm and finger movements for sign language. Advantageously, embodiments of the present invention enable one to transcribe material using a uniform level of effort. Further, such embodiments provide a PR that does not exceed a desired maximum rate or complexity for a given Audience using a particular method of transcription. For example, in training for shorthand methods of transcribing, the number of handwritten characters differ for different words, and may not correspond to the number of characters or syllables in the word. Additionally, for touch typing, the number of keystrokes, the combination of keystrokes (such as numeric digit, alphabetic digit, numeric digit), or the complexity of a "chorded keystroke" (Control-key and "L", or "Shift-key" and letter) may be used in conjunction with aptitude information for such keystrokes or handwritten characters to obtain an altered MW (LIF work) with uniform demand, or with non-uniform demand in order to re-enforce learning. For example, an Audience practicing short-hand would use a CPRA data structure which selected PRs based on the number of short-hand symbols required to represent a keyword. In addition, in accordance with the present invention, embodiment 13000 would employ an CAptA data structure containing aptitude information regarding keystroke or handwritten characters as described above, and concept or transcript information to determine the keystroke or handwritten character requirements of a segment (for example a word or phrase) of an MW and adjust the PR so that a constant transcription rate would be required by users transcribing the material. For example, such a system would present (play back) MWs (audio and audio-visual works) at a normal speed for words of standard complexity such as the words: "the", "these", "geese", "cat", "plum" whereas words of high transcriptional complexity such as: "thorough", "phonetic", "ought", and "throughout"; would be presented (played) at a reduced rate.

Additionally, the use of transcription aptitude may be applied to instructional MWs that contain lecture portions and written derivations, for example a class lecture in mathematics or physics. In such applications, the PR may be slowed when the instructor writes material on a chalkboard, so that students may transcribe at a comfortable rate without having to review materials to verify proper transcription of formulae or other material written on a chalkboard. In particular, an embodiment of this aspect of the present invention is substantially similar to embodiment 13000 shown in FIG. 24 and contains: (a) a Lecture/Transcription Detector 13005 ("LTD" 13005) (contained in Concept Information Decoder 13800, or which provides input to Presentation Rate Arbiter 13400), or (b) CGI (output from Concept Information Decoder 13800); either of which indicate when a lecturer is talking and when a lecturer is transcribing on a chalk board, white board, overhead projector, or paper visible to the camera. In this case, the PR is slowed during segments of a lecture that are transcribed, and returns to a comfortable rate for a particular Audience during typical lecturing or descriptions. It should be understood that the above embodiment may be combined with other aspects of the present invention such as Audience Aptitude/Affinity Analysis to provide a desired PR for various MWS. It should also be understood that numerous techniques for determining when a lecturer is writing on the board may be used to delineate transcription portions from free-form discussion portions, for example, there are many techniques well known to those of ordinary skill in the art for determining the presence of a face in a video segment and for detecting different faces in a video segment.

LDT 13005 provides, as output, information that provides an indication of the probability that a speaker is in a lecturing state or transcribing state, or both. In a preferred embodiment, LDT 13005 receives, as input, information from a camera, microphone, or other detection device, and performs an analysis (in accordance with any one of a number of methods that are well known to those of ordinary skill in the art) necessary to track a person and the person's pose, including location and orientation of hands, head and feet. One such technique is described in an article entitled "Active Face Tracking and Pose Estimation in an Interactive Room" by T. Darrell, B. Moghaddam, and A. Pentland, *IEEE Conf. On Computer Vision & Pattern Recognition*, San Francisco, Calif. June 1996. Using location and pose information in conjunction with audio information, LDT 13005 makes a determination of the likelihood that a lecturer is transcribing information, and provides this information as output to Presentation Rate Arbiter 13400 or encoded in the MW.

In additional embodiments, LDT 13005 may be implemented using techniques, such as, for example and without limitation: (a) a pressure sensitive chalk board, white-board or paper pad to detect writing of a lecturer on such a device; (b) a motion and/or position detector attached to the wrist which the lecturer uses to write; (c) a motion and/or position detector attached to the writing instrument used by the lecturer; and (d) a device which detects motion in close proximity to the writing surfaces used by the lecturer.

It should also be understood that although the preceding description applied the Lecture/Transcription information as being input to Presentation Rate Arbiter 13400 directly, embodiments of the present invention are not thusly limited, and information representing the presence of transcription taking place may be treated as MWContP and used in conjunction with a CAptA data structure representing transcription ability and optionally other methods used to control PR as have been described above and below.

Yet still another example of use of embodiments of the sixth aspect of the present invention entails the use of a CAptA data structure that will aid an Audience in "word parsing" while listening to or engaging in the study and learning of a foreign language (similarly for embodiments of the fifth aspect of the presentation and the use of a CPRA data structure). In this example, the CAptA data structure contains entries for words, in a dictionary form, for a particular language, entries for silence between word boundaries, and entries for words or phonemes appearing in specific contexts. All word entries would be associated with an indicium that provides a normal presentation, while entries for silence between word boundaries would be associated with an indicium that provides reduced PRs. In this way, words would be presented at normal PR, but silence between words would be presented at an increased rate to aid a novice speaker in parsing words of a spoken passage. Additionally, the entries in the CAptA data base containing entries for words and/or phonemes appearing in specific contexts may be used to further enhance the ability to parse and comprehend spoken passages by non-native speakers of a language.

Yet again still another example of use of embodiments of the sixth aspect of the present invention entails the use of a CAptA data structure that will aid listener comprehension of complex sentences (similarly for embodiments of the fifth aspect of the presentation and the use of a CPRA data structure). Complex sentences can be difficult to process, and a listener may fall behind or fail to comprehend subsequent passages of the work. In accordance with this embodiment of the present invention, Concept Determiner 13700 and Concept Information Decoder 13800 (or, similarly Concept Determiner 6700 and Concept Information Decoder 6800 for embodiment 6000) may develop information representing the "reading level" of a spoken passage or sentence. This information may be developed from a transcript of the MW, MWCD, or may be developed by processing the MW itself using techniques such as speech recognition, and natural language parsing. The information representing the reading level is then applied as input to PRGI Determiner 13550 (or similarly to TSM Concept Look-Up 6500 for embodiment

6000). PRGI Determiner 13550 (or similarly TSM Concept Look-Up 6500 for embodiment 6000) uses the reading level information to access the appropriate "key" of the CAptA data structure (or similarly the CPRA data structure for embodiment 6000) and obtain PRs for each reading level. PRs would change to reflect the complexity and comprehensibility of the current material in the MW. For example, sentences with higher "reading levels" would be presented more slowly than sentences with lower "reading levels". Such an apparatus would enable listeners to listen to the MW at an increased PR, but would reduce the PR during complex sentences or sentences at higher "reading levels" and eliminate cumbersome rewind/replay requests from the user during material containing sentences of higher "reading levels." One should appreciate that although the preceding description was given with an example of spoken sentences, the inventive technique is not thusly limited and applications in which text of sentences appears on a computer screen or the video portion of an MW (audio-visual work), are also possible. In such embodiments the PR can be controlled to provide a uniform scrolling or cursor advance through written text based on the Audience reading ability.

The following describes how embodiment 13000 shown in FIG. 24 corresponds to embodiment 10000 shown in FIG. 22. TSM Subsystem 11300 and Digital to Analog Converter 11600 correspond to Presentation Engine 10400; Concept Determiner 11700, Concept Information Decoder 11800, and PRGI Determiner 11550 correspond to Analysis Engine 10200; and Presentation Rate Arbiter 11400 corresponds to Rate Arbiter 10300.

Figure 27:
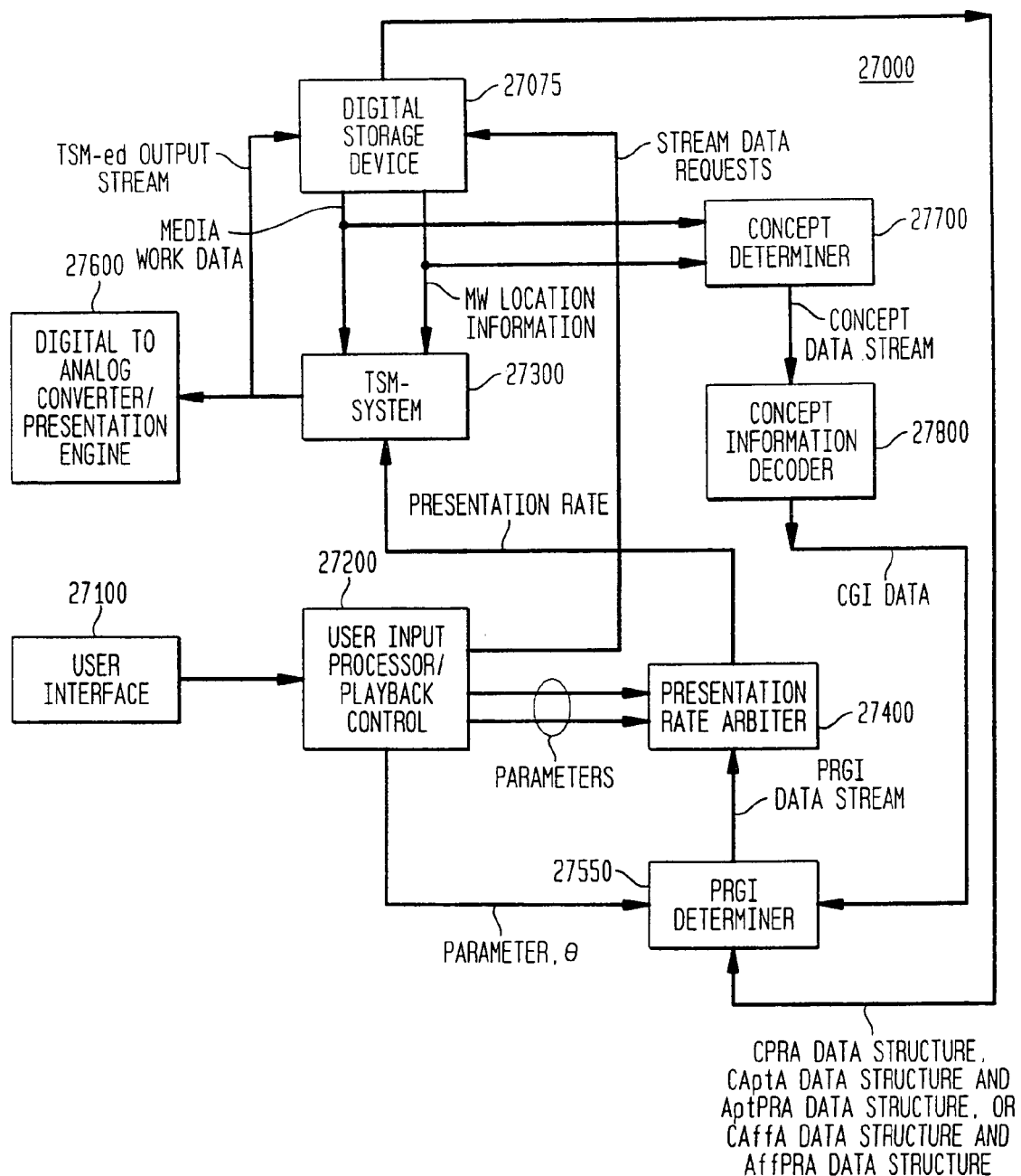
FIG. 27 shows a block diagram of an embodiment that is a generalization of the embodiment shown in FIG. 11.

FIG. 27 shows a block diagram of embodiment 27000 which is a generalization of embodiment 6000 shown in FIG. 11. In particular, the output from Concept Information Decoder 27800 shown in FIG. 27 is Concept Guidance Information ("CGI") which, in accordance with the definitions set forth above, is a generalization of Concept and Keyword Data shown in FIG. 11. In further particular, PRGI Determiner 27550 shown in FIG. 27 is a generalization of TSM/Concept Lookup 6500 shown in FIG. 11 in that it accepts CGI as input, and outputs Presentation Rate Guidance Information ("PRGI") which, in accordance with the definitions set forth above, is a generalization of TSM Rate. In still further particular, Presentation Rate Arbiter 24400 is a generalization of TSM Rate Arbiter 6400 which outputs PR.

Figure 25:
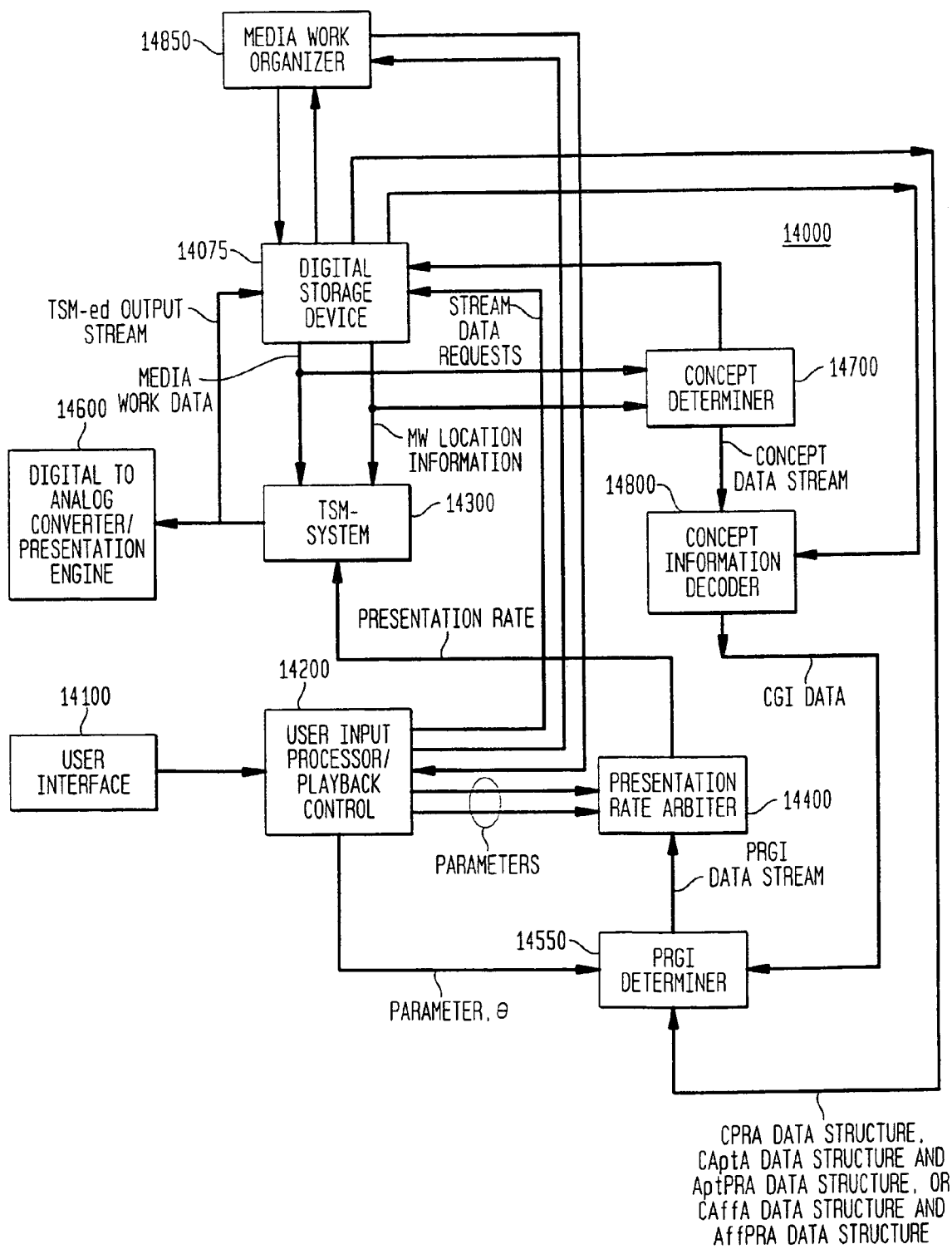
FIG. 25 shows a block diagram of an embodiment of a seventh aspect of the present invention for organizing the presentation order (playback order) of MWs according to Audience aptitude or affinity.

FIG. 25 shows a block diagram of embodiment 14000 of a seventh aspect of the present invention for organizing the presentation order (playback order) of MWs according to Audience aptitude or affinity. For example, embodiment 14000 may be used to organize voice messages, e-mail messages, or search results according to Audience aptitude or affinity. For the specific case of voice mail messages, a first pass is made through the voice mail messages to create Media Work Content Data ("MWCD"). To do this, Concept Determiner 14700 accepts as input: (a) a stream of samples representing portions of the MW (the voice messages) from Digital Storage Device 14075 and (b) current stream location information from Digital Storage Device 14075 used to identify the position in the stream of the samples being sent, for example, a sample count or time value of the beginning of the group of samples transferred from Digital Storage Device 14075, and optionally, (c) information about particular voice messages, such as time, date, and the message originator's information, such as a phone number or other identifier. Concept Determiner 6700 provides, as output, MWCD. The MWCD comprises a stream of data representing concepts and/or textual transcript of spoken passages contained in the current portion of the MW (voice mail message) along associated Media Work Location Information ("MWLI"). The MWCD are determined by use of speech recognition algorithms to obtain a stream of text from the input MW (the input voice mail messages). In this aspect, Concept Determiner 14700 is the same as Concept Determiner 6700 of embodiment 6000. In addition, Concept Determiner 14700 applies the MWCD as output to Digital Storage Device 14075 for storage thereon so that it is associated with the voice mail message from which it was derived (this means that the MWCD can be retrieved together with the voice mail message).

Then, a second pass is made through the voice mail messages to order them. In accordance with the present invention, once MWCD is available for each voice mail message stored on Digital Storage Device 14075, the messages are analyzed according to a Conceptual Order Association data structure ("COA" data structure). A COA data structure comprises Media Work Content Information ("MWCI") and associated Presentation Order Information ("POI") and, optionally, one or more of the following: (a) Presentation Order Rule Information ("PORI") and Time-Stamp Information ("TSI"); where POI comprises information that can be used to obtain an order for presenting information in a Media Work ("MW") comprised of several MWs (voice mail messages and where PORI comprises information that is used to process POI.

As shown in FIG. 25, in the second pass, Concept Information Decoder 14800 accepts as input from Digital Storage Device 14075, the MWCD. Concept Information Decoder 14800 is the same as Concept Information Decoder 6800 of embodiment 6000, and Concept Information Decoder 14800 processes the input to form concept data representations of the input data stream.

As shown in FIG. 25, MWS Organizer 14850 receives as input: (a) a COA data structure which is received from Digital Storage Device 14075; (b) data output from Concept Information Decoder 14800 stored in Digital Storage Device that represents concepts for the voice mail message; and (c) Audience member input from User Input Processor/Playback Control 14200 ("UIP/PC 14200"). MWS Organizer 14850 identifies concepts for the voice mail message in the same way that TSM Concept Look-Up 6500 of embodiment 6000 operates. MWS Organizer 14850 assigns a ranking of the voice mail message according to one or more of rule sets and algorithms (specified, for example, by PORI), and Audience input. For example, in one embodiment, MWS Organizer 14850 utilizes the COA data structure to identify concepts and extract the POI for the detected concepts. Then, MWS Organizer 14850 develops a ranking by computing a score for a particular message. For example, the score can be computed as the average of all of the identified POIs, or the highest of the identified POIs, and so forth. Then, MWS Organizer 14850 stores the ranking for each message, either in a scratch-pad memory or on Digital Storage Device 14850, and analyzes the ranking to develop a presentation list that is used to present information to the Audience member. The Audience input may be used to enable the user to input further concepts, or to override the COA data structure. As a result of this pass of the voice mail messages, MWS Organizer 14850 may arrange to have voice mail messages containing the phrases: "call me at once, I need to talk with you" presented first when voice mail messages are retrieved. For example, if a COA data structure indicates a high POI for conference calls, then voice mail messages whose transcripts contain the keywords "conference call" would receive a high score, and be moved to the front of the presentation list. Additionally, MWS Organizer 14850 may arrange message presentation according to the sender identification and/or a priority assigned by the sender or receiver of the message. Finally, the presentation list is stored on Digital Storage Device 14075.

Lastly, voice mail messages are presented to the Audience member. Here, the presentation list is accessed in response to Audience member input from UIP/PC 14200, and the voice mail messages are retrieved, along with the associated MWCD, in accordance with the list by Concept Information Decoder 14800. The remainder of embodiment 14000 operates in the same way that embodiment 13000 does to present the voice mail messages to the Audience member: (a) at the as-received PR; or (b) at a PR determined using a pair comprised of a CAffA data structure and an AffPRA data structure or a pair comprised of a CAptA data structure and an AptPRA data structure together with Audience input. Optionally, the remainder of embodiment 14000 operates in the same way that embodiment 27000 does to present the voice mail messages to the Audience member: (a) at the as-received PR; or (b) at a PR determined using a CPRA data structure together with Audience input.

An advantage of the seventh aspect of the present invention is that the MWCD (transcript) obtained from Concept Determiner 14700 need only contain concept and/or keyword information. Thus spurious errors in voice recognition would not significantly reduce the effectiveness of the overall system.

It should be understood that although the previous description provided an example in which messages in a series of voice mail messages are sorted and possibly re-ordered before playback, the inventive technique is not thusly limited. For example, MWS rather than entire messages may be sorted to provide a new MW consisting of only the portions of all messages containing action items. Thus the Audience (voice-mail user) would be presented with a series of action items such as: "call me with new project cost" . . . "give me the latest completion date estimate" etc. In this particular embodiment the voice of the speaker would serve as an identifier of the message originator. In further embodiments, the MWS played may also be preceded with information, for example time, date, originator, message number, etc.; about the message from which it was excerpted.

In an alternative of the seventh aspect of the present invention, text in electronic documents, for example, e-mail messages, is processed using COA data structures in the manner described above with respect to voice mail messages. That is, the analysis of the MWCD of voice mail messages is equivalent to analysis of text in e-mail messages. The e-mail messages are then presented to an Audience member in an order that is determined in accordance with the Audience member's specification in the COA data structure. In a further aspect of this embodiment, using text to speech and/or text to a screen, the e-mail messages themselves can be presented at rates specified in, for example, specified rate, users can receive all the information contained in the text message using PRs based a pair comprised of a CAffA data structure and an AffPRA data structure or a pair comprised of a CAptA data structure and an AptPRA data structure, or a CPRA data structure. Advantageously, the messages will be presented at PRs determined by affinity or aptitude to aid in transcription, comprehension, and efficient use of time.

An eighth aspect of the present invention involves the use of grammatical information to determine PRs for MWs. An embodiment of this aspect is obtained from embodiment 27000 shown in FIG. 27 wherein the CGI output from Concept Information Decoder 27800 comprises grammatical information. In one such embodiment, Concept Information Decoder 27800 is a grammatical decoder that outputs information representing a part of speech, or sentence structure, in a portion of an MW. Concept Information Decoder 27800 can be fabricated using any one of the many methods that are well known to those of ordinary skill in the art for providing a grammatical decoder. For example, if the input to the grammatical decoder is the sentence, "This method, as described in Paragraph 3.1 above, and the previous method, described in Chapter 1 Section 2, can be combined to form a third method which provides enhanced functionality", then the output of the grammatical decoder would be:

INPUT STREAM: This method, as described in Paragraph 3.1 above,
OUTPUT: subject parenthetical
INPUT STREAM: and the previous method, described in Chapter 1
OUTPUT: Conjunction compound subject parenthetical
INPUT STREAM: Section 2, can be combined to form a third method
OUTPUT: Verb phrase object
INPUT STREAM: which provides enhanced functionality
OUTPUT: parenthetical In accordance with the present information, the output information is sent to PRGI 27550 searches a Conceptual Presentation Rate Association data structure ("CPRA" data structure) for a matching grammatical construct and extracts the associated PR for the corresponding portion of the MW. As set forth above, a CPRA data structure comprises Media Work Content Information ("MWCI"), which MWCI may be comprised of Media Work Content Properties ("MWContP"). Finally, MWContP may comprise information such as, without limitation: (a) a number of syllables in words spoken in a Media Work ("MW"); (b) a number of letters in a word; (c) a number of letters present in one syllable; (d) a number of distinct items, for example, the number of people or objects, in, for example, a frame of presentation material such as a video frame; (e) an aptitude metric determined, for example, by a criterion such as complexity; (f) grammatical structure of portions of the MW, and (g) an indicium of the rate of occurrence, temporal proximity, or time-interval of any of the previous items. As a result, and in accordance with the present invention, embodiment 27000 enables playback of grammatically complex sentences at PRs that makes them easier to comprehend. For example, the input sentence set forth above would be played back so that the parenthetical phrases "as described in Paragraph 3.1 above"; "described in Chapter 1 Section 2"; and "which provides enhanced functionality" are presented at an increased rate.

Advantageously, embodiment 27000 is useful when reading complex sentences of the type often found in legal contracts. For example, by increasing the PR rate for parenthetical expressions, and slowing the PR for action verbs, nouns, and objects of speech, the basic meaning is conveyed rapidly, and without omissions. Further, the modified output is easier to comprehend since the subject, object and verbs appear closer together and require less retention in the Audience's mind as the sentence is parsed. As one can readily appreciate, this embodiment of the eighth aspect of the present invention produces output similar to that of a native speaker's reading or paraphrasing a complex sentence to a listener, student or client.

Another example of the use of embodiments of the eighth aspect of the present invention relates to construction of voice prompts used to guide users through telephone voice response menus at call centers. Those who create voice prompt scripts balance the amount of information presented to listeners with the amount of time a caller must spend listening for an item of interest. A typical voice prompt can take a considerable amount of time to play to listeners. For example, "For home products, including telephones, televisions, computer screens, and microwave ovens, press 2. For portable products, including pagers, cell phones, hand-held devices, and organizers, press 3." In addition, long messages engender high costs since the company providing the service pays for the time used when toll-free numbers are given to consumers. In accordance with the present invention, a CPRA data structure having appropriate MWContP can be used to specify that all parenthetical expressions (for example, those beginning with the word "including" in the example above) be speeded up, while other portions of the voice prompt are played at a normal rate. In this way, listeners need only recognize a word in the parenthetical expression to confirm the particular prompt of interest. Thus, the expressions "For home products"; "press 2. For portable products"; and "press 3" are played at normal rates whereas the expressions "including telephones, televisions, computer screens, and microwave ovens" and "including pagers, cell phones, hand-held devices, and organizers" are sped up.

Still another example of the use of embodiments of the eighth aspect of the present invention relates to detection of portions of voice mail messages that are generally transcribed by listeners. For example, in a typical voice mail message the caller's message may be "Hello Bob, I got the copies of the contract you sent me and we need to modify two items. First I need you to change the effective date to October. Second, we need to remove the transferability clauses. Please call me if you have any questions." In accordance with the eighth aspect of the present invention, Concept Information Decoder 27800 would analyze the input to identify verbs, subjects, and objects of messages. Then, PRGI 27550 would, using Presentation Rate Rule Information ("PRRI") in a CPRA data structure as a guide to carrying out the analysis, determine that a word phrase corresponds to an "action item" for the message recipient by analyzing the verb, subject and object of the word phrase identified by Concept Information Decoder 27800. Next, PRGI Determiner 27550 would search the CPRA data structure for a matching grammatical construct and extract the associated PR. Additionally, PRGI Determiner 27550 may, using the PRRI as a guide to carrying out the analysis, search for the occurrence of certain noun phrases such as: report, data, statistics, sales figures, and the like. These "action items" are generally transcribed by the message recipient for future reference before the message is deleted. In accordance with the present invention, the "action items" are presented at a reduced PR to make it easier for the listener to transcribe the contents. Similarly, in accordance with the present invention, numbers in voice mail messages could be played at a reduced PR rate since numbers are generally transcribed by the message recipient. Similarly, in accordance with the present invention, names and/or addresses in voice mail messages could be played at a reduced PR since they are often transcribed by the message recipient.

Yet still another example of the use of embodiments of the eighth aspect of the present invention relates to presentation of grammatically correct input. For example, PRGI Determiner 27550 would identify: (a) grammatically correct sentences; and (b) grammatically incorrect sentences. In accordance with the present invention, PRGI Determiner 27550 would do this using PRRI as a guide to carrying out the analysis, or PRRI could comprise a grammar checker program, or PRGI Determiner 27550 could comprise a grammar checker program; grammar checker programs being well known to those of ordinary skill in the art. Then, PRGI Determiner 27550 would search a CPRA data structure for matching grammatical constructs (i.e., grammatically correct or incorrect sentences) and extract the associated PR. For example, grammatically correct sentences may be associated with an accelerated PR whereas grammatically incorrect sentences may be associated with a reduced PR to call attention to the error. In addition, the amount of slowdown could be used to reflect the degree of the error as specified by the grammar checker. Advantageously, such an embodiment may be used in a dictation machine to review the input by the speaker and call attention to grammatical errors without requiring a screen. In such an embodiment, Concept Determiner 27700 would include a speech recognition engine and a grammar decoder and concept data stream would comprise grammar information.

A generalization of the above, relates to the use of changes in PR to indicate specific properties in an MW presented to an Audience member. For example, after spell-checking a document (the MW in this case) in a word-processing program, portions of the document which contain grammatical or spelling errors may be presented to the user. In this embodiment, correct portions (for example, as to spelling or grammar) of a portion of the MW segment may be read at a higher than normal PR, and incorrect portions (for example, as to spelling or grammar) may be presented at a lower than normal PR to draw attention to them. Additionally, the PR may be altered to reflect the level of correctness (for example, as to spelling or grammar) of all, or portions of, the document during proof reading. For example, PRGI Determiner 27550 would identify: (a) grammatically correct sentences; (b) grammatically incorrect sentences; or (c) spelling errors. In accordance with the present invention, PRGI would do this using PRRI as a guide to carrying out the analysis, or PRRI could comprise a grammar and/or spell checker program, or PRGI Determiner 27550 could comprise a grammar and/or spell checker program; grammar and spell checker programs being well known to those of ordinary skill in the art. Then, PRGI Determiner 27550 would search a CPRA data structure for matching grammatical and/or spelling constructs (i.e., grammatically correct or incorrect sentences and/or correctly or incorrectly spelled words) and extract the associated PR. The document would be converted to speech by a text to speech converter.

A ninth aspect of the present invention involves the use of speaker information for example voice or face recognition to determine PRs for MWs. FIG. 27 shows a block diagram of embodiment 27000 which is fabricated in accordance with the ninth aspect of the present invention wherein the CGI output from Concept Information Decoder 27800 comprises speaker identification information. In accordance with the present invention, for such an embodiment, Concept Information Decoder 27800 includes apparatus which is well known to those of ordinary skill in the art for determining speaker identification. For example, for MWs containing audio, a speaker identification method described in a book entitled "Digital Processing of Speech Signals" by L. R. Rabiner and R. W. Schaffer, Prentice-Hall 1978 can be used. For further example, for MWs containing video a speaker identification method described in an article entitled "Beyond Eigenfaces: Probabilistic Matching for Face Recognition" by B. Moghaddam, W. Wahid, and A. Pentland, *International Conference on Automatic Face & Gesture Recognition*, Nara, Japan, April 1998 may be used.

In one embodiment, Concept Information Decoder 27800 outputs speaker identification information in the form of concepts and/or keywords which identify a speaker for each portion of the MW. PRGI Determiner 27550 uses the speaker identification information output from Concept Information Decoder 27800 as a key to retrieve a PR from a CPRA data structure. In accordance with the present invention, an Audience member can listen to an interview or debate and focus on the words of a particular speaker by playing the utterances of the particular speaker at a reduced PR and the utterances of others at an increased PR.

In a further embodiment of the ninth aspect of the present invention, increased efficiency is provided for security, monitoring, and surveillance of audio materials. For example, these embodiments can be used to increase the efficiency with which listeners can monitor audio content such as, without limitation, recorded conversations, telephone and cell phone conversations, and the like. In accordance with this embodiment, keywords of interest, such as "bomb", "terrorist", or "drugs" are placed in: (a) a CPRA data structure; (b) a pair comprised of CAffA data structure AffPRA data structure; or (c) a pair comprised of CAptA data structure AptPRA data structure. The audio content is then presented at an increased PRs as a default until a match is detected in the MWCD (for example, a transcript obtained by applying speech recognition techniques well known to those of ordinary skill in the art). When a match is detected, the PR is slowed so that a listener may monitor the conversation more closely.

In a yet again still further embodiment of the ninth aspect of the present invention, wherein CGI comprises MWContP that contains information such as, for example and without limitation, the number of items in a video frame, the number of moving items in a video frame, or other similar information. For example, in the case of surveillance cameras placed in entryways to record or monitor the entrance of individuals, the number of people appearing in a particular frame may be used to determine the PR for frames containing people. In this way, embodiments of the present invention enable a technician, or other security personal monitoring a camera, to be presented with a fixed number of faces to recognize in a given time-frame which reflects the ability of such individuals to perform accurate analysis, detection, or recognition. It should be noted that this embodiment will not allow the video data to be detection in real time at all times, but after a possible delay. During time periods in which there are no people/faces to monitor or recognize, the PR would be increased until presentation reached the most recent data available.

This embodiment can be used in a straight forward manner to alter the PR according to the following properties, for example, without limitation: the number of actors on a screen, the number of airplanes in a scene, the number of sports players in a scene or game play, the number of animals, such as fish, birds, or lions, in a particular video sequence. It is well-known to those of ordinary skill in the art how to determine any of the preceding properties from image data.

In another embodiment of the ninth aspect of the present invention, a multiplicity of conversations may be monitored using embodiments previously described with the addition of a Presentation Volume Association data structure ("PVA" data structure) that specifies the volume, as well as PR, to be used for a particular keyword. In this embodiment, a number of conversations may be scanned, and particular conversations are presented with increased volume and decreased PRs when they contain keywords which match items in CAffA data structures and PVA data structures.

In a tenth aspect of the present invention, a PR/Content Correlator ("PR/CC") determines which aspects of a particular MW are appealing so that this information can be used: (a) to aid in the determination of affinity (interest) and, thereby, in the selection of MWs (for example, affinity for a particular actor or actress derived from PR/CC may be used to suggest or select previously unperceived MWs for viewing); (b) in the determination of PRs for future MWSs (for example, updating data structures which determine PR with the results produced by PR/CC so that they may be used on subsequent MWSs in the MW); and (c) in the creation of Audience PR Preference Information, such as CPRA data structures. For example, the use of a transcript containing information about the speaker in each scene may be used to determine an Audience's affinity for a particular news-anchor, interviewer, actor, or actress. In such embodiments of this aspect of the present invention, PR/Content Correlator 28017 (PR/CC 28017) is an aspect of PR/Content Correlator 11500 of embodiment 11000, with the following which add to the functionality of PR/CC 28017.

Figure 28:
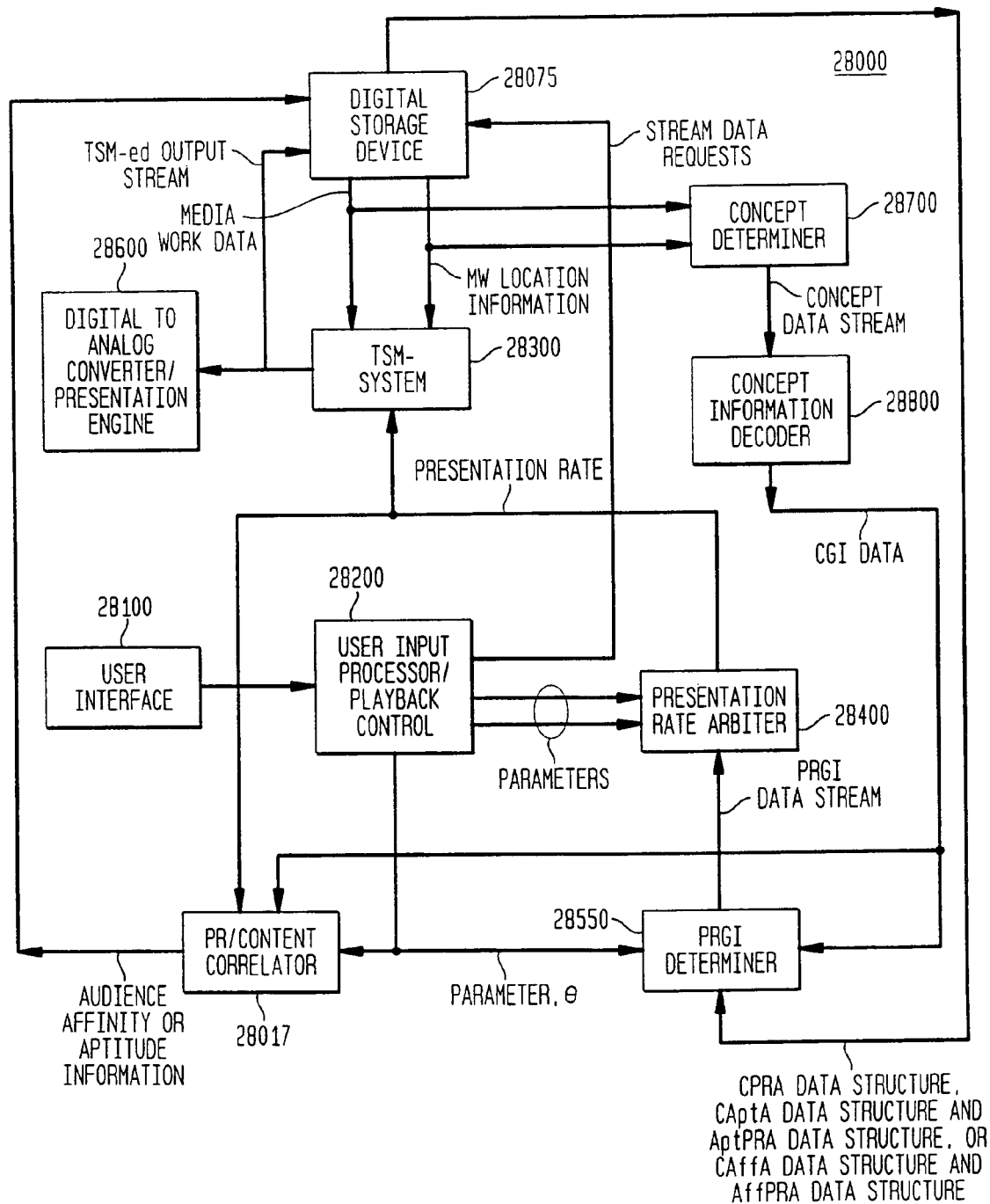
FIG. 28 shows an embodiment of the tenth aspect of the present invention that infers Audience affinity or aptitude.

FIG. 28 shows embodiment 28000 which is one possible embodiment of the tenth aspect of the present invention. The components of embodiment 28000 are substantially similar to the corresponding components of embodiment 27000. In the preferred embodiment of this aspect of the present invention, PR/CC 28017 accepts, as input, (a) CGI relating to the MW (contained within the Media Work, obtained from Concept Information Decoder 28800, or obtained from other sources and logically associated with Media Work); (b) Audience Input via User Input Processor 28200; and (c) an arbitrated PR from Presentation Rate Arbiter, if present. It should be understood that, in accordance with one embodiment, when Presentation Rate Arbiter 28400 is present and employed in the determination of a PR, a lack of Audience Input may be inferred as agreement from the Audience with the presented PR, and such PR may be used in the analysis. It should also be understood that Audience Input may comprise PRs, control information (for example and without limitation, a command indicating that PRs should not be used in correlations), and information about system parameters and the like. PR/CC 28017 uses any of a number of numerical and statistical methods for analyzing the CGI, Audience Input, and PR to infer the reason the Audience made particular PR Requests or preferred a particular PR. For example and without limitation, the reasons may include: (a) an affinity or aversion for particular subject matter being presented; (b) an affinity or aversion for some particular person appearing in the MW; (c) an aptitude or lack thereof for particular subject matter being presented due to the complexity thereof; and (d) so forth. There are many methods that are well known to those of ordinary skill in the art for determining a correlation between two sets of inputs, including, for example and without limitation, the use of neural networks, principal component analysis, and unbiased estimators. The performance of such methods is influenced by the amount of data presented as input. For example, the more detailed the CGI provided, the more accurate the hypothesized cause of the PR Request, and thereby, the estimate of Audience affinity or aptitude. For example, if the CGI contained merely a transcript of dialogue, the estimate of Audience affinity or aptitude would be limited to concepts discussed in the transcript, or properties of the words, for example, the number of times the letter "r" was contained in a word. If the CGI contained additional information such as, for example, the speaker's identity, then PR/CC 28017 would be able to derive a correlation between PR Requests and a particular speaker. Such information would be valuable in determining the affinity of a particular Audience for actors in a movie, or speakers in an interview, or television news magazine. In yet another example, if the CGI contained additional information detailing the duration of silences, the presence of laughter, types of background music, typical tone of a scene (such as suspense, romantic, comedic, violent and the like), then PR/CC 28017 would be able to develop metrics for Audiences affinity/aptitude for such qualities. For example, if PR/CC 28017 was presented with CGI that contained information about the presence of laughter and dialogue in a MWS, and PR Requests which followed a pattern of requesting increased PRs during scenes with no dialogue, and decreased PRs in scenes with laughter, PR/CC 28017 would be able to infer that the Audience enjoyed the comedic MWS and was less interested in the non-dialogue portions of that MW. Similarly for CGI information containing additional information such as "special effect," "battle scene," or "dance sequence," PR/CC 28017 would be able to infer an Audience's preference for such materials. In still further particular, when CGI containing detailed information about the content of a scene is: (a) supplied with a MW; or (b) derived from a MW using scene recognition techniques (which scene recognition techniques are well known to those of ordinary skill in the art); such data may be used to determine a correlation between the presence of animals for example dogs in a scene and the PR selected by an Audience.

In one particular embodiment of PR/CC 28017, first-order derivatives of PR Requests are computed. Derivatives and/or second-order derivatives with a magnitude above a particular threshold are used to delineate affinity (interest) changes in the Audience. The linear timeline of interest changes are then correlated with the CGI containing MWLI to determine possible correlations. A simple sliding window cross-correlation at various time-offsets may be used to determine a lag in response time or to aid in the discovery of affinity changes due to boredom. For example, using this method, it may be determined that an Audience begins to lose interest in a particular speaker when his or her answers last longer than four minutes. Additionally, it may be inferred that a particular interviewer in a talk show or television news magazine asks questions which are uninteresting to a particular Audience by noting that PR Requests are increased after each question regardless of the person being interviewed. Additionally, PR/CC 28017 may compute the most likely cause of each PR Request change by computing a temporal distance from the PR Request change to various information contained in the CGI. Using this technique, a series of potential causes with probabilities can be computed for each candidate cause of the PR change. As output, PR/CC 28017 produces information containing a list of pairs of probabilities for each possible cause of each PR change which is sent to Digital Storage Device 28075.

In a still further example, an Audience's affinity for a particular actor or actress in a particular role may be inferred by applying the previously described analysis to various combinations of information contained in CGI. In this way, preferences for a particular actress in a romantic role may be determined and used to direct selections of future MWs, or to provide information for CPRA data structures that will direct PRs for unseen MWS. Advantageously then, the affinity information can be used to create: (a) data structures for use by various Audiences, the particular structure being directed to Audience sampling from which the pertinent data was derived; and (b) altered MWs which have been altered using data structures created in part (a).

It should be understood that although the previous discussions have been described in terms of a process which takes place in the embodiment described, the process may often be performed offline using apparatus which processes the PRGI, for example a Speed Contour, obtained by an Audience and CGI which is not necessarily made available to the public.

In a further embodiment of the tenth aspect of the present invention, a determination is made of a candidate's aptitude (skill level). In this embodiment of the present invention, a candidate is presented with a lecture or instructional material required for a particular task, and the PR Requests made by the candidate are monitored. After correlating the candidate's PR Requests with the content of the material (derived from CGI) in the corresponding segments, the candidate's perceived aptitude with respect to the material is obtained. For example, the correlation information thusly obtained would be comprised of MWCI and MWPRI and could be sorted by the MWPRI entries to obtain a ranking of aptitude (familiarity) with concepts and/or content in the MW. This embodiment operates under the assumption that material familiar to the candidate would preferably be presented at an increased PR, or skipped. The correlation information (the candidate's perceived aptitude) may then be used to select or direct more probing questions in areas the candidate perceived he/she was proficient. Additionally, the correlation information (the candidate's perceived aptitude) may be used to more thoroughly test areas in which the candidate believed he/she was not proficient to obtain information about the limit of the candidate's knowledge in these areas.

It should be understood that the output produced by one of several possible embodiments of PR/CC 28017 is valuable to advertising designers, program writers, examination creators, and MW content creators. As such, it should be understood that the businesses of collecting, analyzing, and publishing such output are covered by embodiments of the present invention. For example, commercial creators may be willing to pay for information collected from the application of PR/CC 28017 to determine a particular Audience's affinity for a particular animal, special effect, and the like. Casting directors would pay for information about the appeal of certain actors in certain situations to Audiences, which appeal can be determined using the techniques previously outlined. Further, the output of PR/CC 28017 can be stored on a computer or presentation device and transferred periodically to central repositories for further analysis or resale. There are many methods well-known to those of ordinary skill in the arts for storing information on a computer and transferring, uploading, or emailing such information to a central repository for analysis.

An eleventh aspect of the present invention involves the use of the inventive method and apparatus in conjunction with MW presentation (media playback) systems that track: (a) Audience member use of the ability to change PR for portions of MWs; and (b) Audience member's ability to change portions of presented MWs. For example, broadcasters and/or advertisers may supply multiple commercials to be played during commercial breaks in regular programming. By tracking the PR selected by an Audience during the commercials, the broadcasters and/or advertisers can determine which commercials provide the greatest Audience affinity (interest) for various segments of the Audience. The affinity information thusly obtained can be used to select which commercial from a pool of commercials will have the highest Audience affinity. In a preferred embodiment, information relating to which of the available commercials was selected for presentation (playback) by Audience members PR input would be sent to broadcasters/advertisers: (a) for billing purposes and (b) to provide valuable feedback about the Audience affinity (Audience interest). Then, using this information, the broadcasters can provide prepare data structures to select automatically commercials having the greatest Audience affinity from a pool of commercials that are: (a) stored locally; or (b) broadcast simultaneously from a broadcaster or supplier of the MW.

A twelfth aspect of the present invention involves the use of the inventive method and apparatus in conjunction with MW presentation (media playback) systems wherein broadcasters may selectively allow for increased PRs during presentation of commercials. This involves systems in which Audience members (the users) are allowed restricted access to increased PR (fast-forwarding) through certain segments of an MW, or streaming media broadcast, for example, commercial advertisements, or segments that are uninteresting to the Audience member (the user). In particular, in an Internet-based system, the ability to fast-forward through material is regulated by the number of commercial advertisements viewed, or the number of commercial "banner ads" clicked through. This may be accomplished through the use of "speed tokens" which provide authorization for an Audience member to increase PRs during presentation of commercials. A counter is used to store information about the number of advertising banner ads or advertising links the Audience member (the user) has clicked through, and this information is used to create "speed tokens" which are consumed by fast-forwarding through material. The "speed-tokens" may be allocated or sub-divided in numerous ways, for example, by the material the Audience member (the user) may wish to fast-forward through. There are numerous examples of applications for "speed-tokens." For example, "speed-tokens" may be allocated for use during commercials ("commercial speed-tokens"), or they may be allocated for use during portions of material based on content ("content speed-tokens").

Figure 26:
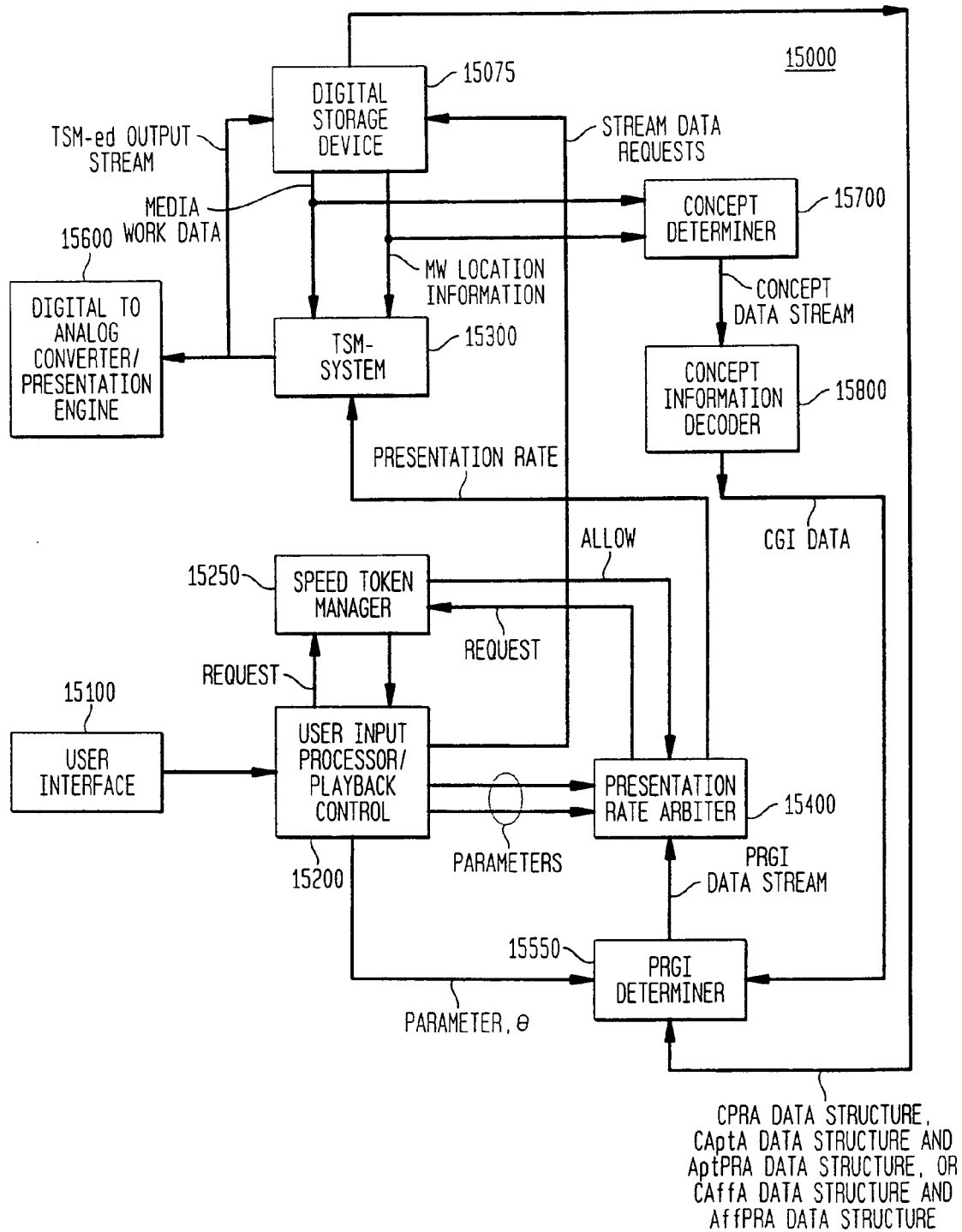
FIG. 26 shows a block diagram of an embodiment of a twelfth aspect of the present invention wherein broadcasters may selectively allow for increased PRs during presentation of commercials.

Monitoring the use of "speed tokens" provides information from which to infer Audience affinity for (listener interest in) the content of the commercial and/or the general programming (for example a high PR might indicate either lack of interest in the commercial or high interest in the programming and a great desire to return to it rapidly). In accordance with the present invention, information relating to use of "speed tokens" may contain Audience member identification information as well as commercial identification information and, optionally, MW identification information relating to portions preceding and succeeding the commercials being presented. FIG. 26 shows a block diagram of embodiment 15000 which is fabricated in accordance with this aspect of the present invention. As shown in FIG. 26, "Speed Token Manager" 15350 communicates with Presentation Rate Arbiter 15400 to enable or disable Audience member PR change requests in light of "speed tokens" the Audience member has acquired and to store track the use of the "speed tokens."

In another use of the twelfth aspect of the present invention, the use of "speed-tokens" enhances computer-based training by allowing Audience members (users) to speed through material in which they have demonstrated mastery, and restricting speed-up in areas of less aptitude. The "speed-tokens" may be obtained from test scores, for example, and used to prevent Audience members (the users) from fast-forward through material pertaining to questions answered incorrectly. In addition, the Audience members (the users) who correctly answer questions related to particular content, may receive "speed-tokens" for use during material addressing said particular content. For example, after demonstrating mastery of parts-disassembly on a written test, a candidate or student would be allowed to fast-forward through segments of an MW whose content contained instructional material for parts-disassembly.

A thirteenth aspect of the present invention involves the use of the inventive method and apparatus in conjunction with limiting the duration of presentation (playback) of interesting excerpts of a much longer MW to fit the needs of Audience members. This refers to the ability to determine the duration of an altered MW (LIF Work) obtained from application of, for example, a CPRA data structure and to create a time-limited altered MW (LIP). Advantageously, use of this aspect of the present invention can be used to limit the presentation time of an altered MW (LIF) to a fixed interval.

In accordance with the present invention, as was described in detail above, during creation of an altered MW (LIF), PRs are obtained using, for example, a CPRA data structure and a stream representing concept information comprising the original work. As further described above, a CPRA data structure may be obtained from a Speed Contour and vice-versa. Thus, in accordance with this aspect of the present invention, a Speed Contour is created using the CPRA data structure and the concept information. The Speed Contour is plotted, for example, graphically, with time on a horizontal axis and a logarithm of PR on a vertical axis. Using this Speed Contour, one can set a PR threshold that specifies an "Affinity Threshold" that one wishes to apply to the altered MW (the LIF work). Then, regions of the altered MW (LIF work) that fall below or above the "Affinity Threshold" can be excluded when creating an altered "thresholded" MW. Note that the duration of a particular "thresholded" MW for any particular "Affinity Threshold" value can be computed in a manner which will be described below.

The playback time of a "thresholded LIF is computed as follows:
1. a Speed Contour is obtained from a CPRA data structure and concept data in an MW, or via a Speed Contour editor.
2. the Speed Contour is converted so that its PRs are represented on a time axis which represents that of the MW.
3. a threshold is used to determine which time-scale modified segments of the MW will be presented (those above or below the threshold are presented or rejected as appropriate).
4. segments selected for presentation are abutted, and the duration of the abutted/joined segments computed.

In a further aspect of the above-described inventive method, a "duration matched" MW can be constructed by determining the threshold value that creates an MW of a specified duration. In accordance with this method, a user specifies the amount of time desired for viewing the MW. In response, an embodiment of the inventive method constructs a thresholded MW whose duration closely matches that specified. Advantageously, in accordance with the inventive method, Audience members can scan MWs having different duration and different affinity using a single CPRA data structure, and create thresholded MWs having equal duration.

Similarly, the presentation time of an MW may be unknown when material and concepts in the original work are not know, as is often the case when searching MWs (audio or audio/visual works). Use of the inventive method enables presentation duration of altered MWs, for example altered MW obtain by the application of the method "Audience Affinity/Aptitude Application" which have been generated from different MWs (different audio and audio/visual works) to be displayed before the Audience member chooses to initiate presentation. Thus, the total time required to play an altered MW, for example a Time Scale Modified MW ("TSMed MW"), may be displayed while editing a Speed Contour for the work. Additionally, the total time required to play an altered MW derived from an original MW, for example by the method "Audience Affinity/Aptitude Application" may be displayed while a user changes values in a CPRA data structure which will be applied to the original MW.

Figure 29A:
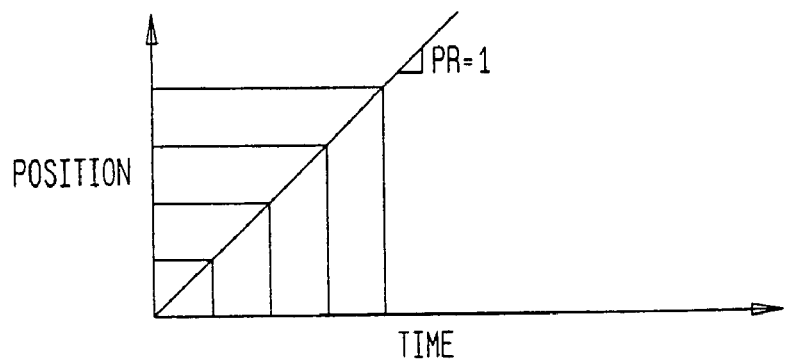
FIG. 29 shows three graphs of PRs displayed with a horizontal time axis and the time-offset position in the original MW being displayed on the vertical axis.
Figure 29B:
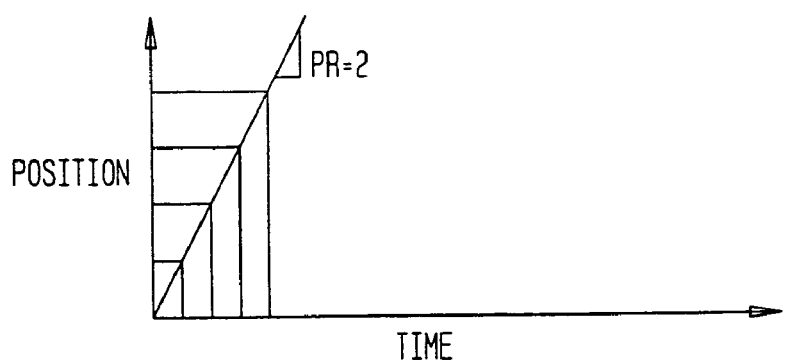
Figure 29C:
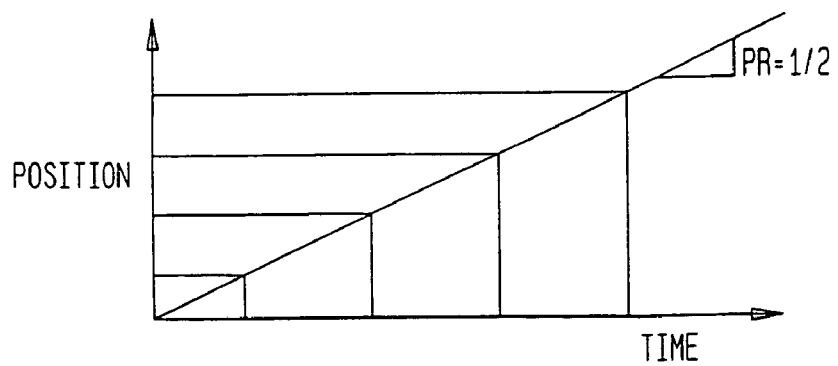
Figure 30:
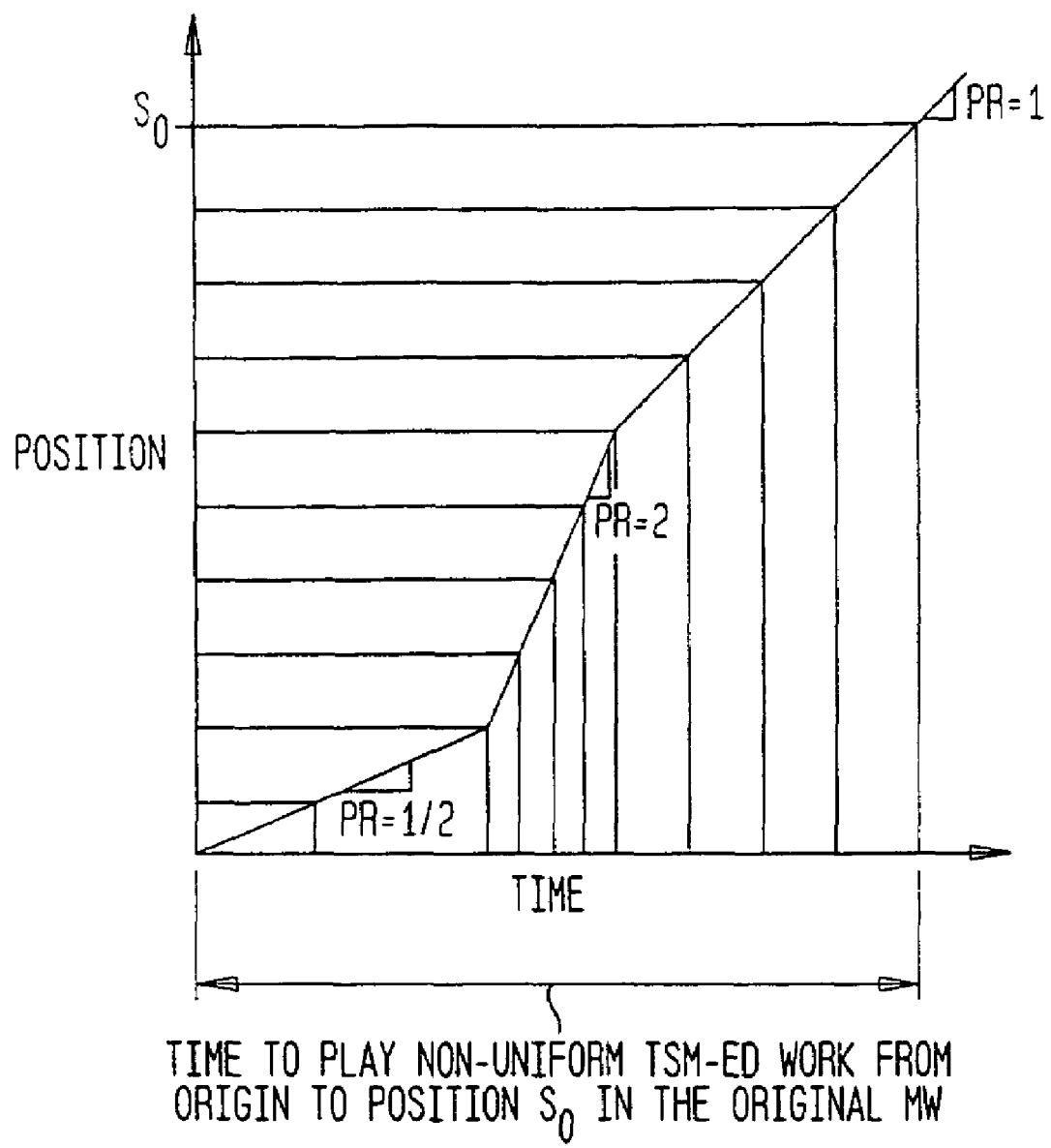
FIG. 30 shows an embodiment of a method of the present invention for determining the total duration of time required to play an altered MW.

FIG. 29 shows three graphs of PRs displayed with a horizontal time axis and the time-offset position in the original MW being displayed on the vertical axis. In "A" the PR is 1.0 (no TSM) and the time-offset position in the original MW equals the playback time position in the unmodified work. In "B" the PR is 2.0 (time-compressed or speeded-up") and the time-offset positions in the original work are played at times equal to ½ of their original values. Thus the time to playback the entire file is ½ the time to play the original MW. In "C" the PR is 0.5 (time-expanded or slowed-down") and the time-offset positions in the original work are played at times equal to 2 times their original values. Thus the time to playback the entire TSMed MW is 2 times the time to play the original MW. FIG. 30 shows an embodiment of a method of the present invention for determining the total duration of time required to play an altered MW (sometimes referred to as a Listener Interest Filtered MW). As shown in FIG. 30, the durations of time required to playback individual segments of the LIFed MW are computed using piece-wise linear segments. This corresponds to an algorithmic computation as follows:

1. Segment the MW into segments with a single PR as determined by the application of CPRA data structures and the like.
2. Determine the length of the MWS.
3. Compute the duration of the altered MWS using corresponding PR.
4. Add the duration computed in step 3 to the running total time previously accumulated.

A fourteenth aspect of the present invention involves the use of Time Scale Modification in conjunction with systems that collect or download MWs from vast storage facilities or various MW warehouses, for example the global Internet or World-Wide-Web, which MWs are then optionally aggregated and transferred to MWCTs, or to TSM-Enabled Presentation Devices for presentation to an Audience. For example, the collected MWs may be presented at a later time, or different location, such as in a vehicle, airplane, and the like. Audience interest, obtained from applications of embodiments of the present invention, questionnaires, or other means, are used to determine the preferred PR for the material before being transferred to the MWCT or to the TSM-Enabled Presentation Device. When the MWs requested by an Audience are collected, the PR rates are applied to create an altered MW, and the resulting altered MW (a Listener Interest Filtered work ("LIF") or a Listener Aptitude Filtered work ("LAF")) is transferred to the MWCT. Creating the altered MW prior to storage enables the altered MW (LIF/LAF work) to be presented by presentation devices that do not contain TSM apparatus, and will advantageously conserve memory or storage requirements when increased PRs are specified for material, as is often the case.

In a further refinement of this embodiment of the thirteenth aspect of the present invention, the process of creating the altered MW is advantageously divided between a TSM enabled Presentation Device and the embodiments of the present invention that create an altered MW (Listener Interest Filtered/Listener Aptitude Filtered work) so as to maximize storage efficiency, minimize presentation device complexity, and minimize transfer time to MWCT. This division of work advantageously reduces the complexity and functionality required for the TSM enabled Presentation Device, and minimizes the amount of storage required for the concatenated MWS. In this refinement, an aggregated work is created by concatenating or juxtaposing several works preselected by Audience members from sites on the Internet, Media Broadcasts of all types, or other Media Warehouses. In accordance with this embodiment, all increased PRs which result in time-scale compressed (speeded-up) output are processed before the transfer to MWCT or TSM-Enabled Presentation Device. This processing reduces the amount of storage required. PRs specifying lower than normal rates are not performed, but rather stored as PRGI in the altered MW. The altered MW created using this embodiment will always have a smaller duration, and thus require less storage (ignoring the storage required for PRGI).

It should be understood that the process of applying POI to order a collection of MWs or MWS may be combined with the above-described method to produce an aggregate work whose contents are ordered according to various criteria, for example and without limitation, all financial news first, or all headlines first, before applying the PR alteration step.

In a specific example of the above, a data structure is created which comprises several entries each of which is comprised of associations of a MW identifier, a time value used to specify when to access or download the MW, and a CPRA data structure. Upon downloading each of the MWs specified in the data structure, each of the MWs' PR is altered by applying the corresponding CPRA data structure in a manner discussed in detail above. The altered MWs thusly obtained would be concatenated to form a single work comprised of the individual altered MWs, which altered MWs were created by application of the CPRA data structure using the methods previously described.

The following pertains to an MW (an audio or audio/video) journal system that includes one or more of the following: indexes, tables of contents, time markers, transcripts, annotations, and hyperlinks. In systems that provide hyperlinks into MWs, hyperlinks often serve as both CGI and MWLI. For example, hyperlinks may contain content summaries, or descriptive words or phrases that reflect the content to which they refer. Additionally, hyperlinks typically contain location information in the form of a file offset, a file marker (such as a section, a sentence or a footnote), or a location of information on the World-Wide-Web.

In accordance with the present invention, hyperlinks and annotations may contain objective information relating to the content of an MW that is useful by all Audiences, or subjective information about the content of the MW useful by an Audience made up of an individual or small group. In accordance with the present invention, the information in a hyperlink, or an annotation, are included within the definition of MWCI and, as such, may be used to organize the Presentation Order and PR of an MWS with which it is associated. For example, if a teacher wished to instruct students on the subject of plant fossils, he/she may view a work pertaining to fossils for possible presentation to the class. The work viewed may contain objective hyperlinks in an index or table of contents to allow quick access to particular MWS. In accordance with the present invention, the objective link labels may be used as data to which the teacher applies a rule, or search algorithm, to the link labels (text) to determine a PR for the corresponding MWS. For example, a CAffA data structure may be used. Once viewed, the teacher may choose to annotate the underlying work with subjective links, or create subjective links relating to a series of other objective or subjective hyperlinks. These subjective links may be constructed to contain keywords, tags, or other information that convey or delineate an MWS according to some criteria, for example relevance, or interest. Thus the subjective links, for example and without limitation hyperlinks, may be used as CGI since they contains information and location information. Further, the information in links, both subjective and objective, may be used in conjunction with POI to determine a Presentation order.

Furthermore, systems of subjective links or comments (such as the "comment" fields used in popular word processors such as Microsoft Word) may be used to further annotate the MWS. In such word processors, the user may choose to select certain "comments" and have the MWS to which the comments refer, presented using a PR determined by the user directly or by aptitude, affinity, or other such criteria. In text-to-speech systems which read electronic text, the PR may be altered to indicate the presence of footnotes, hyperlinks, and subjective comments while the main body of the text document is being read.

Thus in such a system containing a Media Work, and optionally: (a) objective links, (b) subjective links; or (c) other annotations, the PR may be controlled by CGI comprising said links and annotations. For example, a series of links may be displayed on a screen or web-page in a vertical column. A user may then highlight using a mouse and screen cursor, of the type well-known to those of ordinary skill in the art, to select one of more links and specify a PR for the selected link or links. Additionally, the links may contain annotation information indicating their type, for example and without limitation, objective, subjective, parenthetical, summary, cross-reference, and the like, and said annotation information may be used as CGI in conjunction with any of the various embodiments and aspects herein described.

Further Applications of Embodiments of the Present Invention

The following describes examples of use of the inventive method and apparatus. A first example of use of the inventive method and apparatus is in conjunction with teaching using MWs (audio-visual works). The inventive apparatus allows the PR (the TSM rate or playback rate) of a particular MW (audio-visual work) to be controlled on a per Audience member (user) basis or on a common basis that is targeted to specific groups of perceivers (listeners). For example, assume an instructional MW (audio-visual work) is used to instruct Audience members (viewers) in the details of how to setup and use an order entry accounting system on a particular operating system to enter and report specific types of financial transactions. Further assume that the target Audience for the instructional MW (audio-visual work) comprises of two groups: (a) accountants who are novice computer users and (b) expert computer users who are unfamiliar with standard accounting practices. During presentation (playback) of the MW (audio-visual work), material is presented in following manner. A particular financial transaction is described along with appropriate actions in the user interface of the software program such as "select the pull-down menu and enter NEW"; then a demonstration of the actual process is performed. During presentation (playback) of this MW (audio-visual work) at normal speed, accounting experts who are novice computer users would become impatient with the description of the financial transactions (because they are already familiar with this material), but these same individuals might think the pace of the instruction was too fast during the demonstration of how entry in the software is performed since they are unfamiliar with the use of such interfaces. Similarly for those Audience members (viewers) who are expert computer users but novice accountants, the pace of the instruction (speaking rate) may seem too brisk during the discussion of particular financial transactions, but these same Audience members would become impatient with the slow methodical demonstration of the entry process which has already been described verbally. Embodiments of the present invention solve this problem in the following manner. Two Speed Contours are shipped (or transmitted or accessed using MWCT) with the MW (the audio-visual work). One Speed Contour is for expert computer users who are novice accountants (FastCompSlowAcc.spdcon) and another Speed Contour is for expert accountants who are novice computer users (FastAccSlowComp.spdcon). Speed Contour Fast-CompSlowAcc.spdcon specifies PRs (TSM rates) that cause a presentation of the MW to speed through the MW (audio-visual) segments containing the demonstrations, and cause the presentation of the MW to slow-down during the description of accounting transactions. Speed Contour FastAccSlowComp.spdcon specifies PRs (TSM rates) that cause a presentation of the MW to slow down during the demonstrations, and cause the presentation of the MW to speed through the MW (audio-visual) segments describing accounting transactions. By loading the appropriate Speed Contour, each target Audience can receive the information at a PR that suits their particular comprehension rate for appropriate segments of the MW (audio-visual work). As a result, embodiments of the present invention obviate the need to produce multiple versions of the same MW (audio-visual work) for different target Audiences.

In the example presented above, Audiences (viewers) of the MW (the audio-visual work) were divided into two specific groups. However, in many cases, the creators of an MW (an audio-visual work) are not familiar with the aptitude (comprehension rate) of the Audience that will be viewing the material presented in the work. In this case, each Audience member (user) may load a Conceptual Presentation Rate Association data structure that contains information about an ideal PR for particular concepts and passages with key words and phrases. The Conceptual Presentation Rate Association data structure enables Audience members (users) to view information at a PR that suits their own aptitude (comprehension rate) for different material.

A second example of use of the inventive method and apparatus is in conjunction with entertainment using MW (audio-visual works). It should be readily appreciated by those of ordinary skill in the art that embodiments of the present invention are not limited to the pairing of PR with aptitude (comprehension rates) during instructional MWs (audio-visual works). In fact, embodiments of the present invention also solves the problem of pairing PR with affinity (interest level or entertainment level) of a particular MW (audio-visual work) to provide greater enjoyment for an Audience (listener/viewers). For example, Audience members (listeners and movie viewers) may employ CPRA data structures or Speed Contours in accordance with the present invention to control the PR of an MW (an audio or audio-visual work) so that passages or scenes of violence and suspense are played at a faster rate to avoid undue anxiety. Similarly, those Audience members (listeners and movie viewers) interested in romantic dialog may elect to use CPRA data structures or Speed Contours in accordance with the present invention to have the PR reduced for these passages. As one can readily appreciate each user or family may utilize CPRA data structures which reflect their affinities (interests) to act as a "filter" and use embodiments of the present invention to create altered MWs (LIF works) for ordinary movies, television shows, and other entertainment MWs (audio or audio-visual works). Furthermore, as one can readily appreciate, a valuable service in accordance with the present invention would provide CPRA data structures or Speed Contours for specific MWs (audio or audio-visual works) that could be used to change the content of the work. For example, the Movie Rating could be changed from "R" to "PG-13" by use of a Speed Contour which eliminated certain passages containing adult language or concepts.

It should be noted that once a CPRA data structure is generated, it can be used thereafter to guide PRs for MWs (audio or audio-visual works) which were not previously heard by the Audience. Thus, pairings of concept and PR (TSM rate) that represent affinity (interest), aptitude (comprehension rate), and the like obtained by listening to various MWs (audio and audio-visual works) can be captured, stored and later used to guide the PR (the TSM rate or playback rate) for MWs (audio and audio-visual works) being presented (played), for the first time, to an Audience member (by a listener). Thus, a CPRA data structure can be used to control the PR (playback rate) or to create Speed Contours which are tailored to the affinity (interest) of an Audience member (a user) automatically for MWs that have never been heard by the Audience member (the user). This ability to control the PR, or to create Speed Contours, for unheard works, enables embodiments of the present invention to act as information filters that tailor the presentation rate of all MWs (audio and audio-visual works) presented to the Audience (the user) in accordance with the Audience member's (the user's) affinity (interest level) for concepts contain in the CPRA data structure.

A third example of use of the inventive method and apparatus is in conjunction with content production and advertising. In this example, a Speed Contour which captures the interest and maintains Audience (listener/viewer) attention may be determined by sampling a particular target Audience or market segment. For instance, if a commercial is targeted toward people who own a particular brand or model of computer, the commercial producers can shoot one commercial and adjust the Speed Contour to capture the attention of its target Audience by delivering the information at a PR appropriate for that target Audience. Furthermore, different Speed Contours could be developed and sent to different radio or television stations and/or time-slots depending on familiarity of the stations' Audience with the subject matter presented in the commercial. Thus, in accordance with the present invention, a particular commercial may be compressed to 20 seconds when it is played during a talk show on home-computer maintenance using a first Speed Contour, and the same commercial may be expanded to 30 seconds when played during the evening news using a second Speed Contour to allow for the slower comprehension rate of those Audience members (listeners/viewers) who are unfamiliar with computer terminology.

A fourth example of use of the inventive method and apparatus is the application of a CPRA data structure containing concept entries for numeric digits which are paired with PRs (TSM rates) specifying slow PRs. In this case, the inventive method could be applied to voice mail systems when Audience members (listeners) retrieve their voice-mail messages. For this example, Concept Determiner 6700 of embodiment 6000 shown in FIG. 11 would perform simple speech recognition to determine the presence of numeric digits in the message. In accordance with this method, all telephone-numbers and numeric amounts would be slowed down automatically, and ease the transcription process for the Audience member (the listener). Further embodiments of this method can also be used to specify PRs for concepts such as, without limitation, dates, addresses, and the like.

A fifth example of use of the inventive method and apparatus is in conjunction with instruction and learning of foreign languages. Students listening to an MW (an audio or audio-visual work) containing a foreign language would utilize embodiments of the present invention to create a Speed Contour while listening to various passages of the MW. The Speed Contour would reflect their aptitude (comprehension rate) for the material because passages that were requested to be played more slowly than others, or were repeated show lower aptitude. An analysis of the Speed Contour would highlight such passages. The Speed Contours could then be presented graphically or ordered by passage to allow instructors to grade individuals and/or to gauge the comprehension rate of each student or groups of students. For example, a high grade would be given to students having a small number of passages with reduced PR. The Speed Contour analysis could then be used to score students, and to direct their future study. For example, to direct their study, customized Speed Contours would be created so that the students could listen to MWs (audio or audio-visual works) using customized the Speed Contours that would provide further practice in listening to rapidly spoken passages to aid in developing word parsing skills. Similarly, identical MWs (audio or audio-visual works) could be presented to a class in which each student utilizes an embodiment of the present invention to obtain CPRA data structures which contain information about the comprehension rates for concepts in the material contained in the MWs. The CPRA data structures could then be presented graphically or ordered by concept to allow instructors to grade individuals and/or to gauge the comprehension rate of each student or groups of students. For example, a high grade would be given to students having a small number of passages with reduced PR. Further, one would develop a metric related to Audience (user) requested PR and comprehension or familiarity with subject matter embodied in concepts.

A sixth example of use of the inventive method and apparatus is in conjunction with a business model in which Audience member affinity information in the form of a CPRA data structure maybe sold to advertisers and creators of programming in order to better match the affinity of the Audience viewing an MW. Additionally, information, for example, Audience preferred PRs for certain commercial advertisements, may be exchanged with advertisers or media providers for value. Additionally in a system in which PRs are regulated by MW providers, broadcasters and the like, Audience members may receive speed tokens. Additionally, Audience members may use the information in a CPRA data structure derived from their input regarding PRs to guide selection of programming or advertisements presented to them from a pool of advertisements, MWs, or programs.

It should be clear to those of ordinary skill in the art that the MWs (the audio or audio-visual works) described herein can be input to embodiments of the present invention from a network of computers, whether local or non-local, including an Intranet or the Internet (all of which will be referred to for simplicity as the Internet). It should also be clear to those of ordinary skill in the art that embodiments of any of the data structures defined herein (for example, and without limitation, Speed Contours or CPRA data structures) may be used to filter information accessed on, for example, the Internet. Still further, it should be clear that embodiments of the present invention may be included as parts of search engines used to access MWs (audio or audio-visual works) on, for example, the Internet.

As a further example, in embodiments of the present invention, any of the data structures defined herein (for example, a Speed Contour) may contain PR entries, for example, of "infinity" for particular portions of an MW (an audio or audio-visual work). In such embodiments of the present invention, a PR of "infinity" (or some other indicium that will be similarly translated) directs a presentation (playback) system to skip sections of an MW (an audio or audio-visual work) associated with a PR of infinity. Thus, in accordance with such embodiments, users can specify "no interest" in particular portions when listening to or searching MW (audio or audio-visual works).

As a further example, it should be clear to those of ordinary skill in the art that embodiments of the present invention include: (a) computer-readable media encoded with one or more of the data structures defined herein; and (b) a computer-readable medium encoded with a Media Work together with one or more of the data structures defined herein.

Those skilled in the art will recognize that the foregoing description has been presented for the sake of illustration and description only. As such, it is not intended to be exhaustive or to limit the invention to the precise form disclosed.

What is claimed is:

1. A method of presenting media works which comprises:
accessing information identifying a media work and a time in the future to retrieve the media work;
retrieving the identified media work at the time;
accessing presentation rate information for use in altering the presentation rate of the media work;
altering the presentation rate of the media work; and
presenting the altered media work.

2. The method of claim 1 which further comprises:
concatenating at least two temporal segments of altered media works to form a concatenated media work; and
presenting the concatenated media work.

3. A method for analyzing playback information for one or more audio or audio-visual works, which method comprises steps of:
generating one or more average speed contours for one or more audio or audio-visual works for one or more categories of users;
converting the one or more average speed contours to one or more conceptual speed association data structures;
forming a listener-interest-filtered conceptual speed association data structure from the one or more conceptual speed association data structures;
converting the listener-interest-filtered conceptual speed association data structure to a listener-interest-filtered speed contour for an audio or audio-visual work;
using the listener-interest-filtered speed contour to create a listener-interest-filtered audio or audio-visual work;
obtaining a time interval from a user; and
altering presentation rates obtained from the listener interest filtered conceptual speed association data structure so that an uninterrupted presentation of the listener-interest-filtered audio-visual work substantially matches the time interval.

4. A method of presenting a media work which comprises:
detecting media work content properties in a portion of the media work;
associating a presentation rate of the portion with the detected media work content properties; and
presenting the portion at the presentation rate;
wherein the media work content properties comprise indicia of one or more of: a number of syllables in utterances, a number of letters in a word, complexity of grammatical structures in portions of the media work, arrival rate of newly presented objects, temporal proximity of between events in portions of the media work, or number of phonemes per unit of time in portions of the media work.

5. A method of presenting a media work which comprises:
detecting content or properties in portions of the media work;
associating a presentation order with the detected content or properties that is different from the order of detection;
reordering the portions according to the presentation order; and
presenting the media work in accordance with the presentation order;
wherein the presentation order information is distributed over computer networks, or is exchanged between user over webs of communication networks.

6. A method of presenting a media work which comprises:
detecting concept information in a portion of the media work;
associating the concept information with a presentation rate for the portion; and
presenting the portion at the presentation rate;
wherein detecting the concept information includes obtaining concept information from a close-captioning transcript.

7. A method for generating an audio or audio-visual work in conjunction with a conceptual speed association data structure which comprises:
generating one or more concepts for a portion of the audio or audio-visual work;
generating a time-scale modification ("TSM") rate responsive to the one or more concepts using the conceptual speed association data structure; and
generating a time-scale modified portion of the audio or audio-visual work responsive to the TSM rate;
wherein generating a TSM rate utilizes Presentation Rate Rule Information to establish a restoring interval which triggers a return to a default TSM rate if no new Presentation Rate Information is received after a restoring interval has lapsed.

8. The method of 7 wherein the default TSM rate is specified by user input.

9. A method for generating an audio or audio-visual work in conjunction with a conceptual aptitude association ("CaptA") data structure and an aptitude presentation rate association ("AptPRA") data structure which comprises:
generating one or more concepts for a portion of the audio or audio-visual work;
generating a time-scale modification ("TSM") rate responsive to the one or more concepts using the data structures; and
generating a time-scale modified portion of the audio or audio-visual work responsive to the TSM rate;
wherein the CAptA data structure encodes information relating to one or more of:
a listener's familiarity with a word or phrase, a measure of phonetic complexity of a word, a measure of difficulty in enunciating a word, or a measure of the difficulty in transcribing a representation of a word.

* * * * *